United States Patent
Ko et al.

(10) Patent No.: US 10,375,749 B2
(45) Date of Patent: Aug. 6, 2019

(54) MOBILE DEVICE AND METHOD OF PAIRING THE SAME WITH ELECTRONIC DEVICE

(71) Applicant: SAMSUNG ELECTRONICS CO., LTD., Suwon-si, Gyeonggi-do (KR)

(72) Inventors: Jae-woo Ko, Uiwang-si (KR); Jae-young Lee, Hwaseong-si (KR); Hyun-jung Kim, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/182,479

(22) Filed: Nov. 6, 2018

(65) Prior Publication Data

US 2019/0075610 A1 Mar. 7, 2019

Related U.S. Application Data

(63) Continuation of application No. 14/811,294, filed on Jul. 28, 2015, now Pat. No. 10,136,460.

(30) Foreign Application Priority Data

Jul. 29, 2014 (KR) .................. 10-2014-0096764
Mar. 11, 2015 (KR) .................. 10-2015-0034042

(51) Int. Cl.
*H04W 76/14* (2018.01)
*G06K 9/00* (2006.01)
(Continued)

(52) U.S. Cl.
CPC ........ *H04W 76/14* (2018.02); *G02B 27/0093* (2013.01); *G02B 27/017* (2013.01);
(Continued)

(58) Field of Classification Search
CPC ....... H04W 76/14; H04W 4/80; H04W 12/06; G06K 9/00597; G06K 9/78; G06F 3/013;
(Continued)

(56) References Cited

U.S. PATENT DOCUMENTS 6,619,799 B1   9/2003  Blum et al.
8,438,288 B2   5/2013  Garcia Jurado Suarez et al.
(Continued)

FOREIGN PATENT DOCUMENTS

CN   102625981   8/2012
CN   102763115   10/2012
(Continued)

OTHER PUBLICATIONS

International Search Report dated Oct. 5, 2015 issued in counterpart application No. PCT/KR0215/006831, 9 pages.
(Continued)

*Primary Examiner* — Ayodeji O Ayotunde
(74) *Attorney, Agent, or Firm* — Nixon & Vanderhye, P.C.

(57) ABSTRACT

Methods and devices are provided of pairing glasses with an electronic device is provided. The glasses store identification information and device information regarding a plurality of electronic devices, the device information being usable to pair the glasses with the plurality of electronic devices. The glasses obtain an image of at least one electronic device via a camera of the glasses. The glasses extract identification information of the at least one included in the image. The glasses select the electronic device based on the extracted identification information and the stored identification information. The glasses pair with the electronic device based on the device information of the electronic device.

20 Claims, 60 Drawing Sheets

(51) Int. Cl.

| | |
|---|---|
| H04N 21/845 | (2011.01) |
| H04N 21/442 | (2011.01) |
| H04N 21/4223 | (2011.01) |
| H04N 21/422 | (2011.01) |
| H04N 21/414 | (2011.01) |
| H04N 21/41 | (2011.01) |
| G02B 27/00 | (2006.01) |
| H04W 84/18 | (2009.01) |
| H04W 12/06 | (2009.01) |
| G02B 27/01 | (2006.01) |
| G06F 3/01 | (2006.01) |
| H04M 1/725 | (2006.01) |
| G06K 9/78 | (2006.01) |
| H04L 29/06 | (2006.01) |
| H04W 4/80 | (2018.01) |
| H04W 4/21 | (2018.01) |

(52) U.S. Cl.
CPC .............. *G06F 3/012* (2013.01); *G06F 3/013* (2013.01); *G06K 9/00597* (2013.01); *G06K 9/00671* (2013.01); *G06K 9/78* (2013.01); *H04L 63/0876* (2013.01); *H04M 1/7253* (2013.01); *H04M 1/72533* (2013.01); *H04N 21/4108* (2013.01); *H04N 21/41407* (2013.01); *H04N 21/4223* (2013.01); *H04N 21/42204* (2013.01); *H04N 21/42222* (2013.01); *H04N 21/44231* (2013.01); *H04N 21/8455* (2013.01); *H04W 4/21* (2018.02); *H04W 4/80* (2018.02); *H04W 12/06* (2013.01); *H04W 84/18* (2013.01); *G02B 2027/014* (2013.01); *G02B 2027/0138* (2013.01); *G02B 2027/0141* (2013.01); *G02B 2027/0178* (2013.01)

(58) Field of Classification Search
CPC ............. H04M 1/7253; G02B 27/0093; G02B 2027/0178
USPC ................................................ 455/41.1, 41.2
See application file for complete search history.

(56) References Cited

U.S. PATENT DOCUMENTS

| | | | |
|---|---|---|---|
| 9,202,443 | B2 | 12/2015 | Perez et al. |
| 2004/0162027 | A1 | 8/2004 | Chang |
| 2009/0011707 | A1 | 1/2009 | Ko et al. |
| 2011/0016405 | A1 | 1/2011 | Grob et al. |
| 2011/0138416 | A1 | 6/2011 | Kang et al. |
| 2011/0199460 | A1 | 8/2011 | Gallagher |
| 2011/0202427 | A1 | 8/2011 | Garcia Jurado Suarez |
| 2012/0154557 | A1 | 6/2012 | Perez et al. |
| 2012/0200679 | A1 | 8/2012 | Kawaguchi |
| 2013/0128017 | A1 | 5/2013 | Seo et al. |
| 2013/0160113 | A1 | 6/2013 | Yoon |
| 2013/0241805 | A1 | 9/2013 | Gomez |
| 2014/0053189 | A1 | 2/2014 | Lee et al. |
| 2014/0062854 | A1 | 3/2014 | Cho |
| 2014/0146124 | A1 | 5/2014 | Jang et al. |
| 2014/0197232 | A1 | 7/2014 | Birkler et al. |
| 2014/0327786 | A1 | 11/2014 | Grob |
| 2015/0156196 | A1 | 6/2015 | Kim et al. |
| 2015/0319554 | A1* | 11/2015 | Blanche .............. G06F 3/04842 455/41.2 |
| 2015/0379963 | A1* | 12/2015 | Holmanu ................. G09G 5/12 345/173 |
| 2015/0381609 | A1* | 12/2015 | Dadu ................. H04L 63/0861 726/9 |

FOREIGN PATENT DOCUMENTS

| | | |
|---|---|---|
| CN | 103033936 | 4/2013 |
| CN | 103139586 | 6/2013 |
| CN | 103563346 | 2/2014 |
| CN | 103812535 | 5/2014 |
| EP | 2226703 | 9/2010 |
| KR | 1020090002848 | 1/2009 |
| KR | 1020100001051 | 1/2010 |
| KR | 1020140017734 | 2/2014 |
| KR | 1020140029901 | 3/2014 |
| TW | 201110784 | 3/2011 |
| TW | 2012-29564 | 7/2012 |
| TW | 2012-128380 | 7/2012 |
| TW | M471013 | 1/2014 |
| TW | M480898 | 7/2014 |
| WO | 2008/038200 | 4/2008 |
| WO | 2011/009069 | 1/2011 |
| WO | 2013/066334 | 5/2013 |
| WO | 2013/154476 | 10/2013 |

OTHER PUBLICATIONS

European Search Report dated Nov. 4, 2015 issued in counterpart application No. 15177596.2-1959, 7 pages.
Taiwanese Search Report dated Jan. 29, 2016 issued in counterpart application No. 104122999, 27 pages.
Extended Search Report dated Feb. 19, 2016 in counterpart European Patent Application No. 15177596.2.
Notice of Allowance dated Jan. 23, 2017 in counterpart Taiwanese Patent Application No. 105118282 and English-language translation thereof.
Office Action and Search Report dated Feb. 21, 2018 in counterpart Taiwanese Patent Application No. 106106354 and English-language summary thereof.
Office Action and Search Report dated Apr. 3, 2018 in counterpart Chinese Patent Application No. 201510456032.7 and English-language translation thereof.
Office Action and Search Report dated Oct. 4, 2018 in counterpart Taiwanese Patent Application No. 106106354.
Second Office Action dated Nov. 16, 2018 in counterpart Chinese Patent Application No. 201510456032.7 and English-language translation thereof.
Decision of Rejection dated Apr. 15, 2019 in counterpart Chinese Patent Application No. 201510456032.7 and English-language translation thereof.

* cited by examiner

MOBILE DEVICE AND METHOD OF PAIRING THE SAME WITH ELECTRONIC DEVICE

CROSS-REFERENCE TO RELATED APPLICATIONS

This application is a continuation of U.S. application Ser. No. 14/811,294, filed on Jul. 28, 2015, which is based on and claims priority under 35 U.S.C. § 119 to Korean Patent Application No. 10-2014-0096764, which was filed in the Korean Intellectual Property Office on Jul. 29, 2014, and Korean Patent Application No. 10-2015-0034042, which was filed in the Korean Intellectual Property Office on Mar. 11, 2015. The contents of each of these applications are incorporated by reference herein in their entirety.

BACKGROUND OF THE INVENTION

1. Field of the Invention

Embodiments described herein generally to a network of electronic devices, and more particularly, to a method and an apparatus for pairing electronic devices.

2. Description of the Related Art

With technological developments involving the miniaturization and varying shapes of electronic devices, wearable devices, including, for example smart watches or glasses, are being developed. A smart watch generally refers to a wrist watch with an embedded system having more improved functions than a general wrist watches. Smart glasses generally refer to a wearable computer including a head mounted display (HMD). Wearable devices may be categorized into stand-alone devices and interworking devices. A stand-alone device includes an input/output unit, a processing unit, a storage unit, and a communication unit, and may be used alone. An interworking device refers to a device that may be used after being connected with a separate device, such as, for example, a smart phone.

SUMMARY

The embodiments described herein have been made to address at least the above problems and/or disadvantages and to provide at least the advantages described below. Accordingly, an aspect of the present disclosure provides a method of pairing with an electronic device included in an input image.

According to an embodiment, glasses provided to be paired with an electronic device. The glasses include a memory that stores identification information and device information regarding a plurality of electronic devices, the device information being usable to pair the glasses with the plurality of electronic devices. The glasses also include an image obtaining unit that obtains an image of at least one electronic device via a camera of the glasses. The glasses also include an identification information extracting unit that extracts identification information of the at least one electronic device included in the image. The glasses also include a pairing target selecting unit that selects an electronic device based on the extracted identification information and the stored identification information. The glasses also include a wireless communication unit that pairs the electronic device with the glasses based on the device information of the electronic device.

According to another embodiment, a method of pairing glasses with an electronic device is provided. The glasses store identification information and device information regarding a plurality of electronic devices, the device information being usable to pair the glasses with the plurality of electronic devices. The glasses obtain an image of at least one electronic device via a camera of the glasses. The glasses extract identification information of the at least one included in the image. The glasses select the electronic device based on the extracted identification information and the stored identification information. The glasses pair with the electronic device based on the device information of the electronic device.

According to another embodiment, glasses are provided to be paired with an electronic device. The glasses include a memory that stores identification information and device information regarding a plurality of electronic devices, the device information being usable to pair the glasses with the plurality of electronic devices. The glasses include a camera that obtains image data regarding at least one electronic device. The glasses include a display unit that displays the image data. The glasses include a processor that extracts identification information of the electronic device from the image data, searches for corresponding device information in the stored device information using the extracted identification information, and performs pairing between the glasses and the electronic device based on the corresponding device information.

According to another embodiment, a method for seamless content playback in an electronic device is provided. The electronic device receives iris information regarding a user of glasses, from the glasses. The electronic device identifies the user using the iris information. The electronic device receives device information regarding a previous electronic device used by the user, from the glasses. The electronic device pairs with the previous electronic device based on the device information. Content that is being played by the previous electronic device is played back.

According to another embodiment, an electronic device is provided that seamlessly plays back content. The electronic device includes a memory that stores iris information regarding at least one user of glasses. The electronic device also includes a communication unit that receives iris information regarding a user the glasses and receives device information regarding a previous electronic device used by the user, from the glasses. The electronic device also includes a processor that identifies the user by comparing the received iris information to the stored iris information, and pairs the electronic device with the previous electronic device based on the received device information. The electronic device also includes a display unit that displays content that is being played by the previous electronic device.

According to another embodiment, a method is provided for pairing an electronic devices by glasses. The glasses determine a first electronic device to pair with by tracking eyes of a user of the glasses. The glasses performs user authentication with the first electronic device based on feature points of irises of the user. The glasses determine a second electronic device to pair with by tracking the eyes of the user. The glasses performs user authentication with the second electronic device based on the feature points of the irises of the user. The glasses controls the first electronic device and the second electronic device, such that the first electronic device and the second electronic device pair with each other.

According to another embodiment, glasses are provided that includes an eye-tracking camera that obtains an image of eyes of a user of the glasses. The glasses also include a memory that stores device information of at least one device. The glasses also include a processor that tracks eyes of the user and extracts feature points of irises of the user based on the obtained image of the eyes of the user. The processor determine first and second electronic devices to pair with based on the eyes of the user, perform user authentication with the first and second electronic devices based on the feature points of the irises, and control the first and second electronic devices, such that the first and second electronic devices pair with each other.

BRIEF DESCRIPTION OF THE DRAWINGS

The above and/or other aspects, features, and advantages will become apparent and more apparent from the following detailed description when taken in conjunction with the accompanying drawings, in which.

DETAILED DESCRIPTION

Figure 1:
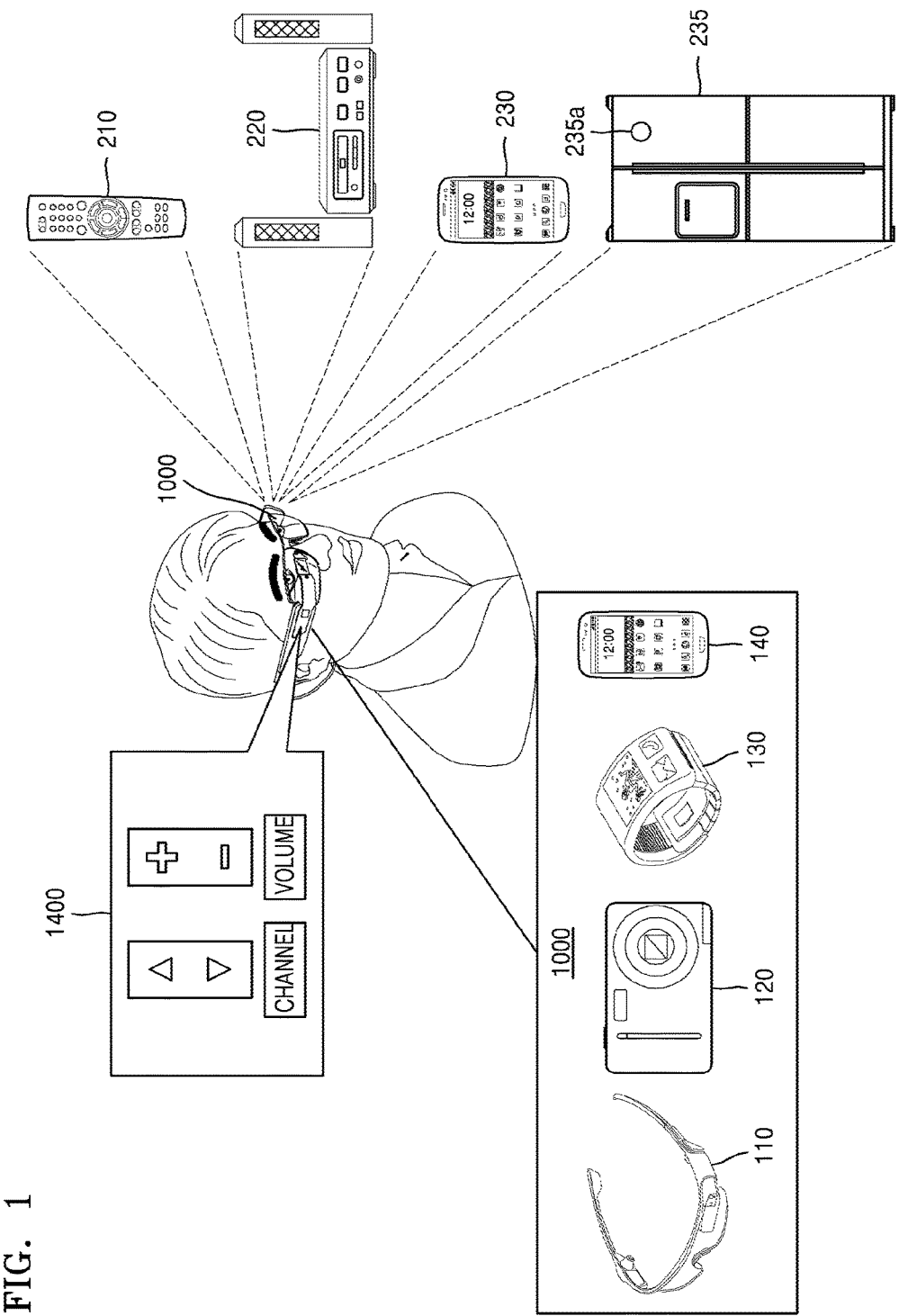
FIG. 1 is a diagram illustrating a method of pairing a mobile device with an electronic device, according to an embodiment of the present disclosure.

Embodiments of the present disclosure are described in detail with reference to the accompanying drawings. The same or similar components may be designated by the same or similar reference numerals although they are illustrated in different drawings. Detailed descriptions or processes known in the art may be omitted to avoid obscuring the subject matter of the present disclosure.

While such terms as "first," "second," etc., may be used to describe various components, such components are not limited to the above terms. The above terms are used only to distinguish one component from another.

The terms used herein are merely used to describe particular embodiments, and are not intended to limit the present disclosure. An expression used in the singular encompasses the expression in the plural as well, unless it has a clearly different meaning in the context. It is to be understood that terms such as "including" or "having," etc., are intended to indicate the existence of features, numbers, steps, actions, components, parts, or combinations thereof disclosed herein, and are not intended to preclude the possibility that one or more other features, numbers, steps, actions, components, parts, or combinations thereof may exist or may be added.

Embodiments of the present disclosure may have different forms and should not be construed as being limited to the descriptions set forth herein. Expressions such as "at least one of," when preceding a list of elements, modify the entire list of elements and do not modify the individual elements of the list.

FIG. 1 is a diagram illustrating a method in which a mobile device pairs with an electronic device, according to an embodiment of the present disclosure. Referring to FIG. 1, a user may pair a mobile device 1000 with nearby electronic devices 210 through 230. For example, the mobile device 1000 may be embodied as a device that is capable of recognizing nearby electronic devices, such as, for example, smart glasses 110, a smart camera 120, a wearable device 130, and a smart phone 140, and may be wirelessly connected to the nearby device.

The mobile device 1000 identifies an electronic device included in an input image and pairs with the identified electronic device. The identification of an electronic device may include an operation of determining whether an input image includes an electronic device. Furthermore, the identification of an electronic device may include an operation of determining a type of an electronic device included in an input image. Furthermore, the identification of an electronic device may include an operation of determining a name of an electronic device included in an input image.

Electronic devices may include devices that are capable of directly communicating with the mobile device 1000 and legacy devices that are unable to directly communicate with the mobile device 1000. A legacy device may communicate with the mobile device 1000 via a patch. A process for the mobile device 1000 to control a legacy device via a patch is described in greater detail below with reference to FIG. 39.

Pairing refers to an operation for connecting the mobile device 1000 to an electronic device via a wire or wirelessly. Furthermore, pairing refers to an operation of establishing settings of the mobile device 1000 to transmit and receive data to and from an electronic device via a wire or wirelessly.

The mobile device 1000 stores identification information for identifying a plurality of electronic devices. Identification information may be information unique to an electronic device to distinguish the corresponding electronic device from other electronic devices. For example, identification information includes information regarding appearance of an electronic device, such as, for example, shape, feature points, and image of an electronic device. Furthermore, identification information may include text indicating a name of an electronic device, that is, a type or model name of an electronic device. Furthermore, identification information may include audio obtained as a person or a machine reads the name of an electronic device.

The mobile device 1000 may identify a plurality of electronic devices by scanning pre-arranged codes. A pre-arranged code may be data indicating a technique for storing information, such as, for example, a barcode, a Quick Response (QR) code, or a color code. A barcode stores information by using a combination of vertical lines having different thicknesses. A QR code is a 2-dimensional code in which information is stored as a square lattice-like pattern. A color code is a data indicating technique for storing information by using a combination of fixed colors. For example, a color code may be printed to a matrix-like shape by using colors including red, green, and blue. A code may be printed on the exterior of an electronic device and may include information including name, type, or serial code of the electronic device. The mobile device 1000 may scan a barcode, a QR code, or a color code by using a camera, and may identify an electronic device having printed thereon the code based on information read out therefrom. Although a barcode, a QR code, and a color code are exemplified above, any of various codes may be used to identify an electronic device as long as the code may be scanned by the mobile device 1000 to read out information therefrom. The mobile device 1000 may recognize different features of respective electronic devices, generate identification information based on the same, and store the generated identification information in a memory. The mobile device 1000 may obtain average features of each type of electronic device and store the average features in a memory. The mobile device 1000 may store names, features, and shapes of electronic devices together with identification symbols of the electronic devices.

The mobile device 1000 may store portions of the appearance of an electronic device as feature points. For example, the mobile device 1000 may extract the edge from the appearance of an electronic device and store the extracted edge as identification information regarding the electronic device. For example, when the mobile device 1000 extracts features of a camera, the mobile device 1000 may extract the edge of the camera only and store the extracted edge as identification information regarding the camera, instead of storing information regarding the entire appearance of the camera as the identification information. A camera includes a rectangular body and a circular lens located in the body. The mobile device 1000 extracts edges of the body and the lens and stores the edges as identification information regarding the camera.

The mobile device 1000 may store not only an edge, but also various other features that may be extracted from the appearance of an electronic device, and may store the features as identification information regarding the electronic device. Furthermore, for the mobile device 1000 to analyze an image and extract features of an electronic device therefrom, various techniques including the above-stated method may be applied.

The mobile device 1000 identifies electronic devices included in an input image, extracts identification information regarding the electronic devices, and selects identification information corresponding to the extracted identification information from among identification information stored in the mobile device 1000. Selecting identification information corresponding to extracted identification information may refer to searching for identification information that is identical to the extracted identification information by a set percentage or higher. Extracted identification information is information regarding electronic devices obtained from a current input image, whereas identification information to be sought is information regarding electronic devices stored in the mobile device 1000 in advance.

The mobile device 1000 pairs with a selected electronic device by using device information regarding the selected electronic device. Device information refers to information necessary for the mobile device 1000 and the electronic device to pair with each other. For example, device information may be a media access control (MAC) address or an Internet protocol (IP) address of an electronic device. The mobile device 1000 pairs with an electronic device by using a MAC address or an IP address. Furthermore, device information may also be transmitted from a server.

Since a legacy device is unable to directly pair with the mobile device 1000, a patch attached to the legacy device may pair with the mobile device 1000.

After being paired, the mobile device 1000 may control an electronic device. For example, the term 'paired' may indicate a state in which the mobile device 1000 may transmit data to an electronic device. Controlling an electronic device may mean that the electronic device operates according to data transmitted from the mobile device 1000. FIG. 1 shows a case in which the mobile device 1000 pairs with electronic devices, such as a remote controller 210, an audio system 220, a smart phone 230, or a legacy device like a refrigerator 235 having attached thereto a patch 235*a*.

The mobile device 1000 may control a paired electronic device by using an input device of the mobile device 1000. For example, the mobile device 1000 may adjust channel and volume of a paired electronic device by using the input device of the mobile device 1000. The input device refers to a device capable of receiving instructions of a user. For example, the input device may be a button, a touch panel, a camera, or a mouse.

A screen image for controlling a paired electronic device may be displayed at a display unit 1400 of the mobile device 1000. The screen image for controlling a paired electronic device may be a screen image displaying functions included in the electronic device. Alternatively, the screen image for controlling a paired electronic device may be a screen image for transmitting a control signal from the mobile device 1000 to the electronic device.

The mobile device 1000 may display various types of control screen images according to the types of identified electronic devices. The types of electronic devices refer to respective groups of electronic devices for performing different functions, e.g., mobile devices, wearable devices, remote controls, home appliances, etc. In FIG. 1, a screen image for adjusting channel or volume is displayed at the display unit 1400 of the mobile device 1000. Therefore, buttons for changing channel and buttons for changing volume may be displayed at the display unit 1400. The mobile device 1000 receives a user input and determines which of the buttons is selected by the user input. The mobile device 1000 transmits a control signal corresponding to the selected button to an electronic device. For example, the mobile device 1000 may receive a user input and may output a control signal for adjusting channel or volume to the remote controller 210, the audio system 220, or the smart phone 230.

The audio system 220 or the smart phone 230 may increase volume of a song that is currently being played back or change a song to play back according to a control signal received from the mobile device 1000.

Based on a status set by a user, the mobile device 1000 may or may not identify an electronic device included in an input image and pair with the identified electronic device. A user interface (UI) element for activating or deactivating the corresponding function may be displayed at the display unit 1400 of the mobile device 1000. For example, a button or a checkbox for activating or deactivating the corresponding function may be displayed at the display unit 1400 of the mobile device 1000. A user may identify an electronic device included in an input image and pair with the identified electronic device by touching a button or selecting a checkbox.

The mobile device 1000 may or may not identify an electronic device included in an input image and pair with the identified electronic device based on power remaining in a battery. The mobile device 1000 may check power remaining in a battery and, if the power is less than or equal to a pre-set value, the mobile device 1000 may not perform the corresponding functions. For example, if the pre-set value is 10% of power remaining in a battery, the mobile device 1000 may not identify an electronic device included in an input image. Alternatively, the mobile device 1000 may not pair with an identified electronic device. If more than 10% of power is remaining in a battery, the mobile device 1000 may identify an electronic device included in an input image and pair with the identified electronic device.

Figure 2:
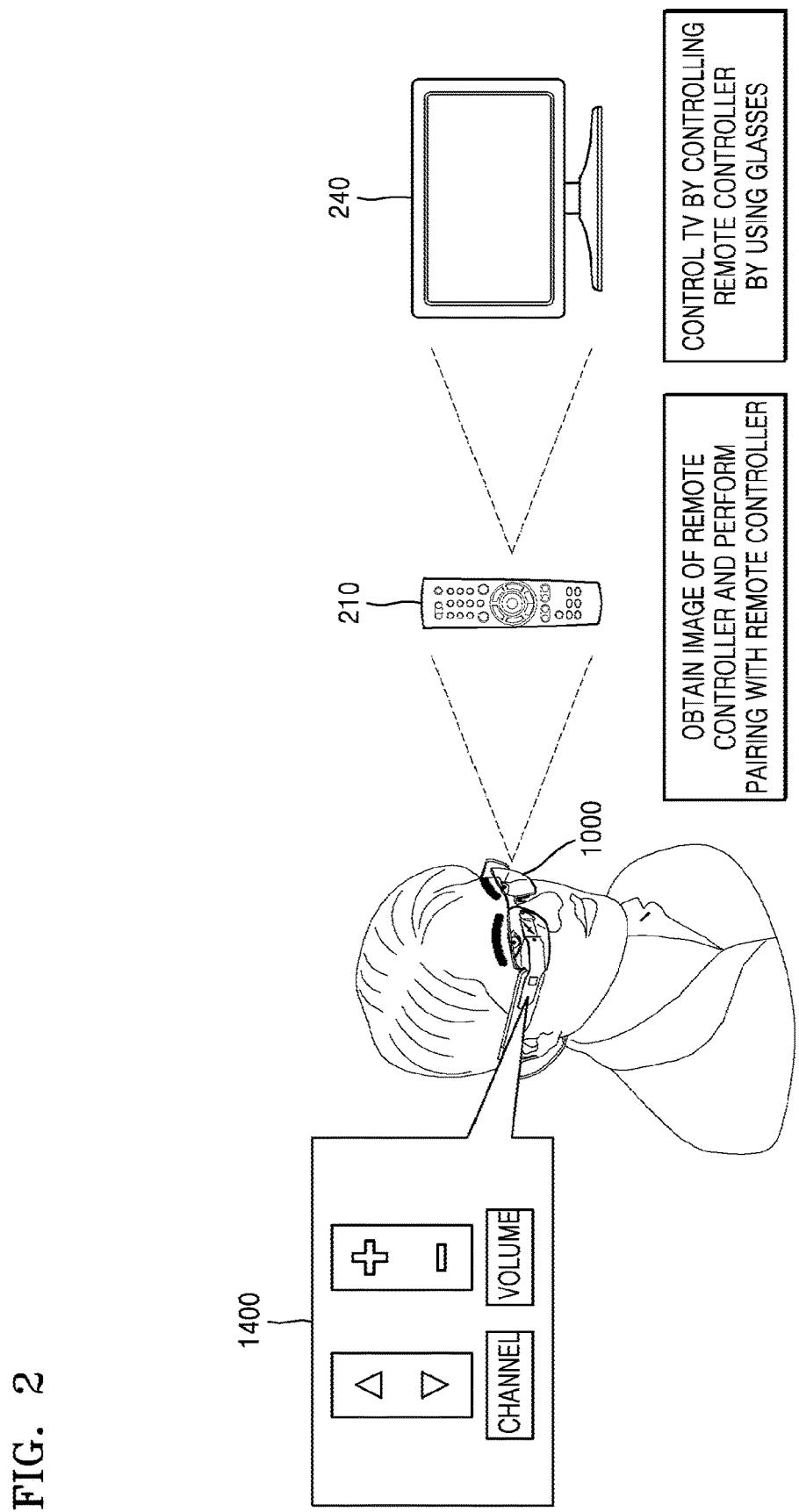
FIG. 2 is a diagram illustrating a method of pairing the mobile devices with a remote controller and controlling the remote controller, according to an embodiment of the present disclosure.

FIG. 2 is a diagram illustrating a method in which the mobile device pairs with a remote controller and controls the remote controller, according to an embodiment of the present disclosure. The remote controller 210 controls other electronic devices, such as, for example, a TV 240, according to control signals received from the mobile device 1000.

The mobile device 1000 obtains an image of the remote controller 210 via a camera. The image may include at least one still image. The mobile device 1000 pairs with the remote controller 210. The mobile device 1000 outputs a control signal for adjusting channel or volume to the remote controller 210. The remote controller 210 receives the control signal from the mobile device 1000 and outputs a control signal to the TV 240. The TV 240 operates according to the received control signal.

Figure 3:
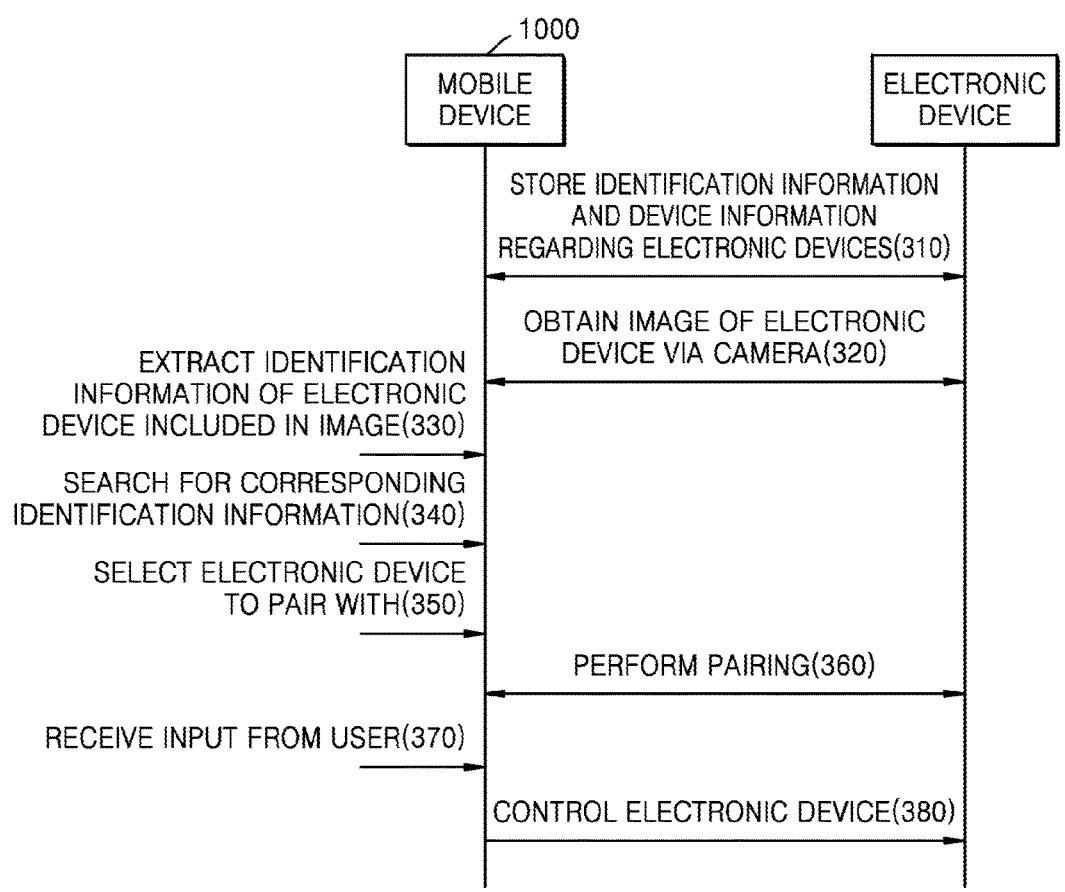
FIG. 3 is a flowchart illustrating a method of controlling an electronic device by the mobile device, according to an embodiment of the present disclosure.

FIG. 3 is a flowchart illustrating a method in which the mobile device controls an electronic device, according to an embodiment of the present disclosure. Referring to FIG. 3, the mobile device 1000 may control an electronic device after being paired with the same.

In operation 310, the mobile device 1000 stores identification information and device information regarding electronic devices. The identification information includes information for identifying appearances of the electronic devices, whereas the device information includes information for establishing connections between the mobile device 1000 and the electronic devices. The mobile device 1000 may obtain an image of an electronic device via a camera and extract identification information regarding the electronic device included in the obtained image. The mobile device 1000 stores the extracted identification information. The mobile device 1000 may receive device information from a user. The mobile device 1000 may store device information by receiving information regarding an electronic device, such as, for example, a MAC address and capability information. Capability information may be information regarding functions that may be performed by an electronic device. For example, capability information is information indicating whether an electronic device is capable of playing back sounds or whether an electronic device is capable of displaying images. Alternatively, the mobile device 1000 may receive device information from nearby electronic devices via a wire or wirelessly, and may store the device information.

In operation 320, the mobile device 1000 obtains an image of an electronic device via a camera. The camera of the mobile device 1000 obtains images of electronic devices.

In operation 330, the mobile device 1000 extracts identification information regarding an electronic device included in the obtained image. The mobile device 1000 determines whether the image includes an electronic device by analyzing the image and extracts identification information regarding the electronic device.

In operation 340, the mobile device 1000 searches for identification information corresponding to the extracted identification information from among identification information stored in the mobile device 1000. The term identification information corresponding to extracted identification information refers to identification information that is identical to extracted identification information by a set percentage or higher.

In operation 350, the mobile device 1000 selects an electronic device to pair with. The mobile device 1000 searches for identification information corresponding to the extracted identification information and selects an electronic device corresponding to the searched identification information.

In operation 360, the mobile device 1000 pairs with the selected electronic device.

In operation 370, the mobile device 1000 receives an input from a user. The mobile device 1000 may receive an input from a user via a button, a touch panel, or a camera.

In operation 380, the mobile device 1000 controls an electronic device based on a user input. The mobile device 1000 transmits a control signal corresponding to the user input to the electronic device.

Figure 4:
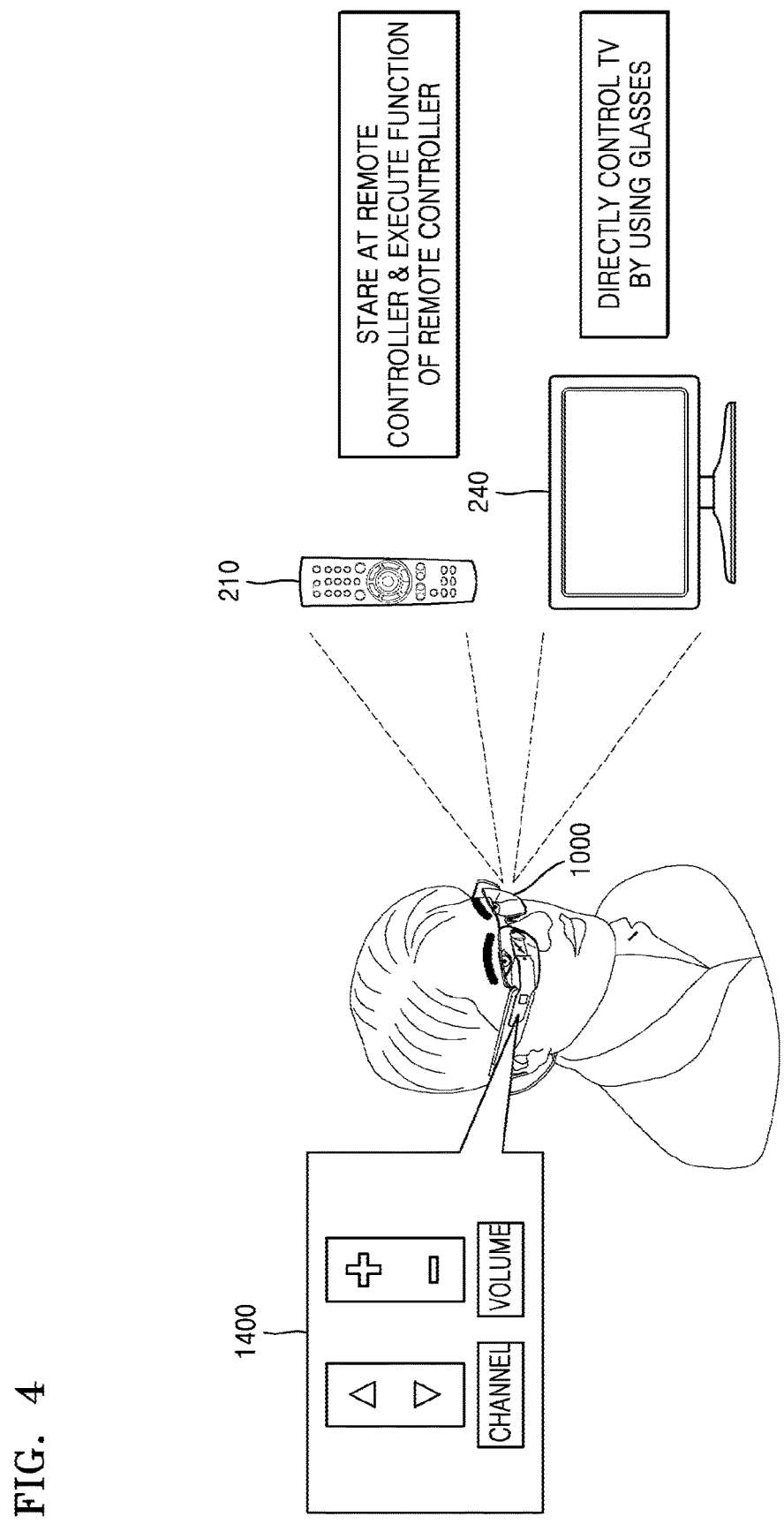
FIG. 4 is a diagram illustrating a method of directly controlling the TV by the mobile device, according to an embodiment of the present disclosure.

FIG. 4 is a diagram illustrating a method in which the mobile device directly controls a TV, according to an embodiment of the present disclosure. The mobile device 1000 may control the TV 240 via the remote controller 210 or may directly control the TV 240.

The mobile device 1000 obtains an image including the remote controller 210 via a camera. The mobile device 1000 identifies the remote controller 210 included in the image and controls a target controlled by the identified remote controller 210. The mobile device 1000 may determine a target controlled by the remote controller 210 based on identification information regarding the remote controller 210. For example, since the remote controller 210 may control an electronic device, such as the TV 240 and the audio system 220, the mobile device 1000 determines an electronic device controlled by the remote controller 210 based on identification information regarding the remote controller 210 and selects a target controlled by the remote controller 210.

The embodiment shown in FIG. 4 relates to the case in which a target controlled by the remote controller 210 is the TV 240. The mobile device 1000 may select a target controlled by the remote controller 210 by identifying a shape of the remote controller 210 and buttons included in the remote controller 210. Alternatively, the mobile device 1000 may receive information regarding a target controlled by the remote controller 210 from the remote controller 210. The mobile device 1000 may receive information regarding the TV 240 from the remote controller 210 and pair with the TV 240.

The mobile device 1000 directly controls the TV 240. If the mobile device 1000 is capable of outputting a signal for controlling the TV 240, the mobile device 1000 directly transmits a control signal to the TV 240. For example, the mobile device 1000 may transmit a signal for changing a channel or a signal for changing the volume to the TV 240.

Figure 5:
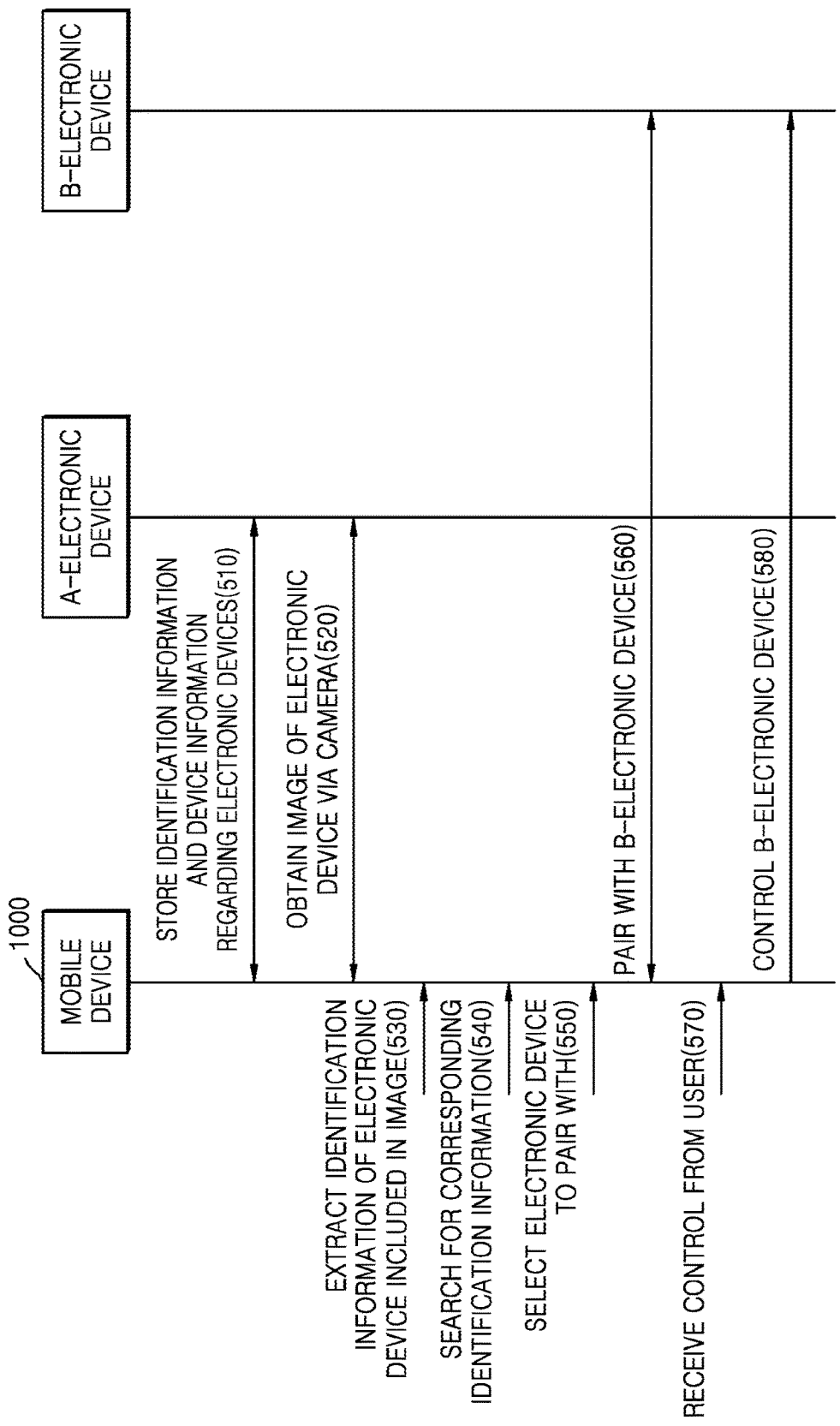
FIG. 5 is a flowchart illustrating a method of controlling an electronic device by a mobile device, according to an embodiment of the present disclosure.

FIG. 5 is a flowchart illustrating a method in which a mobile device controls an electronic device, according to an embodiment of the present disclosure. Referring to FIG. 5, the mobile device 1000 controls a B-electronic device by pairing with the B-electronic device.

In operation 510, the mobile device 1000 stores identification information and device information regarding electronic devices.

In operation 520, the mobile device 1000 obtains an image of an A-electronic device via a camera. For example, the camera of the mobile device 1000 obtains an image of the A-electronic device.

In operation 530, the mobile device 1000 extracts identification information regarding the A-electronic device included in the image. The mobile device 1000 analyzes the image, determines whether the A-electronic device is included in the image, and extracts identification information regarding the A-electronic device.

In operation 540, the mobile device 1000 searches for identification information from identification information stored in memory corresponding to the extracted identification information.

In operation 550, the mobile device 1000 selects an electronic device to pair with. The mobile device 1000 selects the B-electronic device controlled by the A-electronic device as an electronic device to pair with. If the mobile device 1000 is capable of directly controlling the B-electronic device, the mobile device 1000 selects the B-electronic device as an electronic device to pair with. If the mobile device 1000 is unable to directly control the B-electronic device, the mobile device 1000 controls the B-electronic device by using the A-electronic device.

In operation 560, the mobile device 1000 pairs with the B-electronic device.

In operation 570, the mobile device 1000 receives an input from a user. For example, if the B-electronic device is the TV 240, the mobile device 1000 may receive an input for changing a channel or changing the volume from a user.

In operation 580, the mobile device 1000 controls the B-electronic device based on the input from the user. The mobile device 1000 transmits a control signal corresponding to the input from the user to the B-electronic device.

Figure 6:
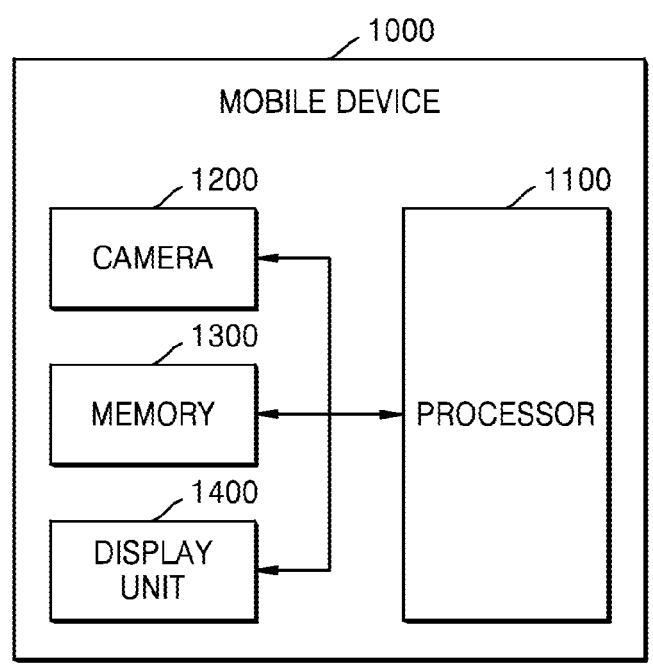
FIG. 6 is a diagram illustrating a configuration of the mobile device, according to an embodiment of the present disclosure.

FIG. 6 is a diagram illustrating a configuration of a mobile device, according to an embodiment of the present disclosure. Referring to FIG. 6, the mobile device 1000 includes a processor 1100, a camera 1200, a memory 1300, and a display unit 1400.

The processor 1100 analyzes an image received from the camera 1200 and identifies an electronic device. The processor 1100 receives an image from the camera 1200 and identifies electronic devices included in the image. The processor 1100 may identify shapes of objects included in the image and select objects having shapes identical to shapes of electronic devices from identified objects.

The processor 1100 searches for identification information corresponding to identification information extracted from the image from among identification information stored in the memory 1300.

The processor 1100 pairs with an identified electronic device.

The processor 1100 displays an interface for controlling an electronic device at the display unit 1400. When the mobile device 1000 is connected to an identified electronic device, the processor 1100 displays an interface at the display unit 1400 to receive an input from a user. The processor 1100 transmits a control signal corresponding to an input of a user to the identified electronic device.

The processor 1100 may change functions of an input unit of the mobile device 1000. For example, if an input unit performs a function for changing brightness of the display unit 1400, the processor 1100 may change the input unit to perform a function for changing a volume of an electronic device. Therefore, even if the same inputs are received from a user via an input unit, the processor 1100 may perform different functions.

The camera 1200 obtains an image, and outputs the image to the processor 1100. The mobile device 1000 includes the at least one camera 1200. The camera 1200 may be arranged on a side surface, a front surface, or a rear surface of the mobile device 1000.

The memory 1300 stores identification information and device information regarding a plurality of electronic devices. The device information represents information to pair with the respective electronic devices.

The display unit 1400 displays a screen image for controlling an electronic device, under the control of the processor 1100. The display unit 1400 may be a touch panel for receiving an input from a user.

Figure 7:
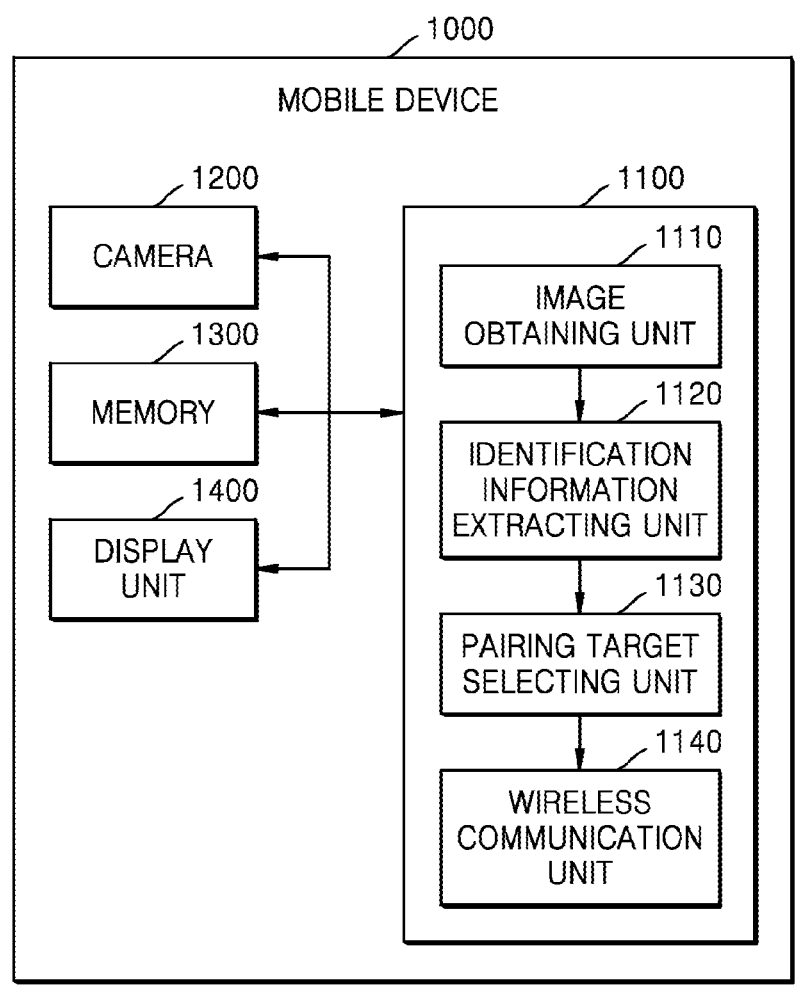
FIG. 7 is a diagram illustrating a configuration of the mobile device, according to an embodiment of the present disclosure.

FIG. 7 is a diagram illustrating a configuration of a mobile device, according to an embodiment of the present disclosure. Referring to FIG. 7, the processor 1100 of the mobile device 1000 includes an image obtaining unit 1110, an identification information extracting unit 1120, a pairing target selecting unit 1130, and a wireless communication unit 1140.

The image obtaining unit 1110 obtains an image of at least one electronic device from the camera 1200 of the mobile device 1000. The image obtaining unit 1110 outputs the obtained image to the identification information extracting unit 1120.

The image obtaining unit 1110 may extract edges included in an image obtained by the camera 1200, may analyze shapes of the edges, and may identify electronic devices. Since the edges of electronic devices may be different in shape from one another, electronic devices included in the image may be identified by comparing shapes of extracted edges to stored edge shapes.

If a fixed image is input via the camera 1200 for a set period of time, the image obtaining unit 1110 may identify an electronic device included in the input image and obtain an image of the electronic device. Furthermore, if an image obtained by the camera 1200 is input, the image obtaining unit 1110 may identify an electronic device included in the image and obtain an image of the electronic device.

The identification information extracting unit 1120 extracts identification information regarding an electronic device included in the image. The identification information extracting unit 1120 may analyze the image and recognize an object having a shape of an electronic device. For example, the identification information extracting unit 1120 may extract information indicating the boundaries of an object as identification information or may extract information indicating polygons and text included in an object as identification information.

The pairing target selecting unit 1130 searches for identification information corresponding to the identification information extracted from the image from among identification information stored in a memory, and selects an electronic device corresponding to the searched identification information as an electronic device to pair with.

Figure 8:
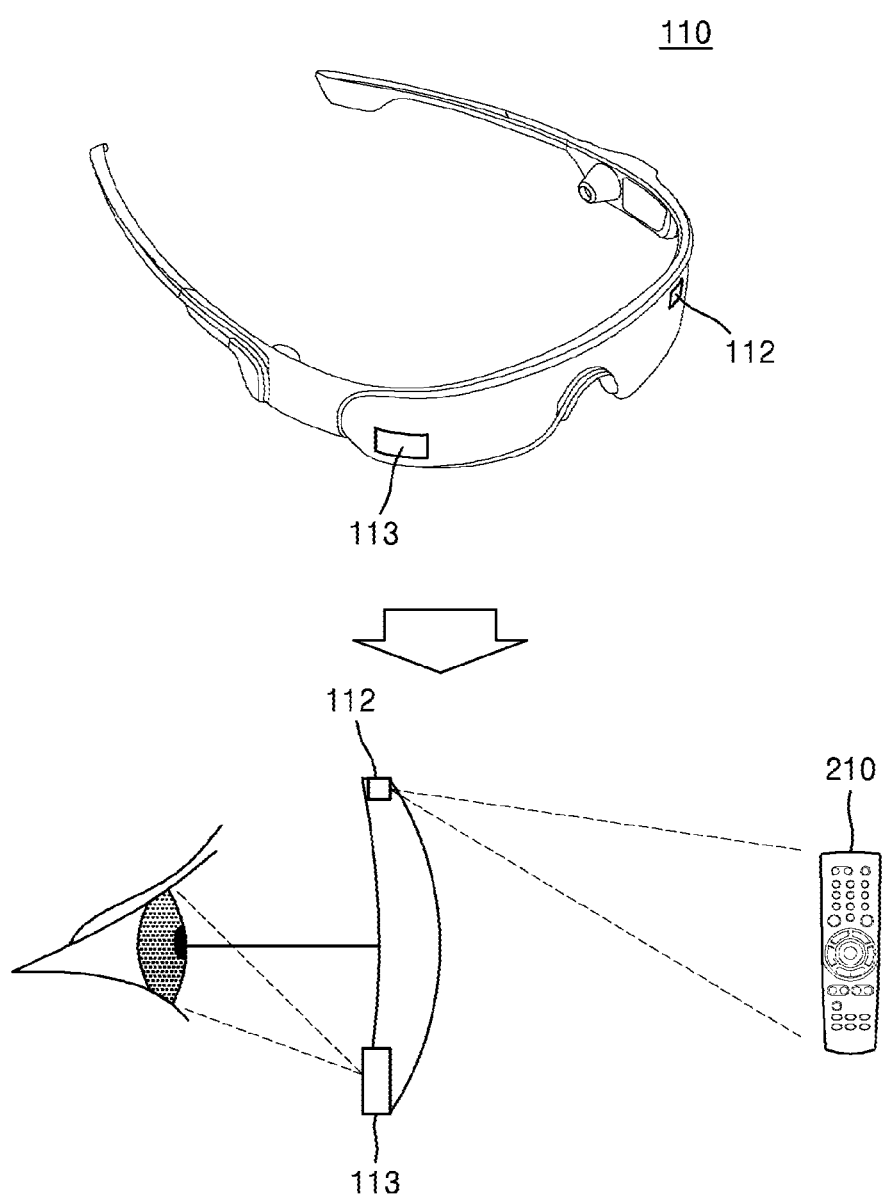
FIG. 8 is a diagram illustrating a method of obtaining an image of an electronic device by smart glasses, according to an embodiment of the present disclosure.

The wireless communication unit 1140 pairs with the selected electronic device by using stored device information regarding the selected electronic device FIG. 8 is a diagram illustrating a method in which smart glasses obtain an image of an electronic device, according to an embodiment of the present disclosure. Referring to FIG. 8, the smart glasses 110 search for electronic devices located in a direction viewed by a user. FIG. 8 shows a case in which the remote controller 210 is located around a user.

An eye-tracking camera 113 tracks eyes of a user and determines a direction viewed by a user.

A front camera 112 obtains an image in the direction tracked by the eye-tracking camera 113. In other words, the front camera 112 obtains an image of the same viewpoint as the user. FIG. 8 shows a case in which the front camera 112 obtains an image of the remote controller 210.

Figure 9:
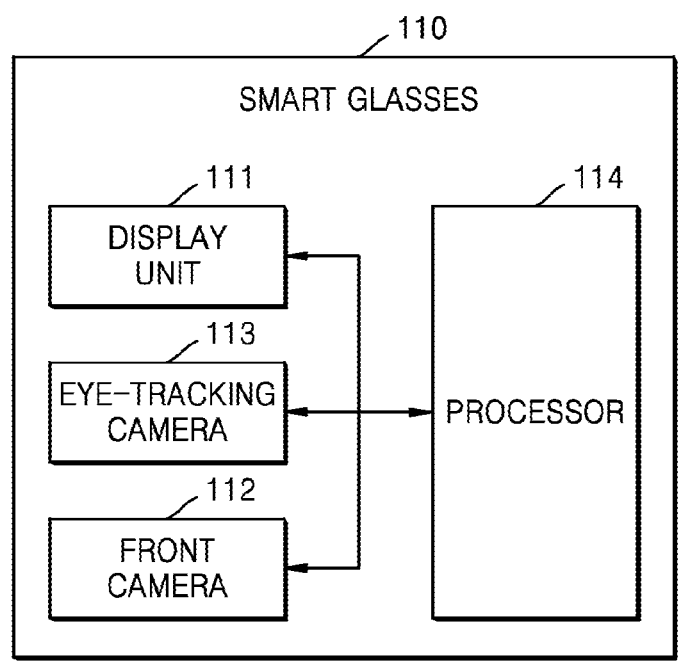
FIG. 9 is a diagram illustrating a configuration of the smart glasses, according to an embodiment of the present disclosure.

FIG. 9 is a diagram illustrating a configuration of the smart glasses, according to an embodiment of the present disclosure. Referring to FIG. 9, the smart glasses 110 include the front camera 112, the eye-tracking camera 113, and a processor 114.

The processor 114 registers identification information and device information regarding electronic devices. The front camera 112 may obtain an image of an electronic device, and the processor 114 may analyze the obtained image and register identification information regarding the electronic device included in the image. For example, the processor 114 extracts features of an electronic device from the image and registers the extracted features as identification information. The processor 114 may receive device information regarding an electronic device from the electronic device and register the device information. Alternatively, the processor 114 may store information regarding methods of communicating with respective electronic devices based on the types of the electronic devices. For example, the processor 114 may register information regarding a frequency or a protocol used by an electronic device as device information regarding the electronic device.

If the processor 114 determines that eyes of a user are not moved for a designated period of time, the processor 114 analyzes an image received from the front camera 112. The processor 114 identifies an electronic device included in the image. The processor 114 may detect boundaries of objects included in the image and extract features of the objects. The processor 114 compares identified objects to registered electronic devices and determines whether there is an identified device identical to any of the registered electronic devices.

The processor 114 receives information regarding a direction viewed by a user from the eye-tracking camera 113, and adjusts a direction of the front camera 112 based on the received information. Therefore, a direction of the front camera 112 is synchronized with the direction viewed by the user. When a direction of the front camera 112 is adjusted, the front camera 112 outputs an image obtained in the adjusted direction to the processor 114.

The processor 114 determines whether there is an electronic device identical to the identified electronic device from among registered electronic devices. If there is an electronic device identical to the identified electronic device from among registered electronic devices, the processor 114 pairs with the identified electronic device and controls the electronic device based on an input from the user.

The smart glasses 110 may pair with an electronic device via Bluetooth or Wi-Fi. When the smart glasses 110 are paired with an electronic device, the smart glasses 110 control the electronic device. The smart glasses 110 may receive a control-related input from a user, and may output a control signal to an electronic device based on the received input.

The smart glasses 110 execute an application. An application is a program registered together with identification information or device information regarding an electronic device. An application is a program for controlling an electronic device or an application that performs the same functions as an electronic device. When an application is executed, the smart glasses 110 may provide a screen image to a user for controlling an electronic device. Alternatively, the smart glasses 110 may execute a voice recognition program.

The smart glasses 110 receive a user's control. In other words, the smart glasses 110 receive a user input. The smart glasses 110 receive a voice of a user or a gesture of the user. The smart glasses 110 output a control signal for controlling an electronic device to the electronic device based on a received voice or a recognized gesture. A voice may be received via a microphone, whereas a gesture may be received via the front camera 112.

Figure 10:
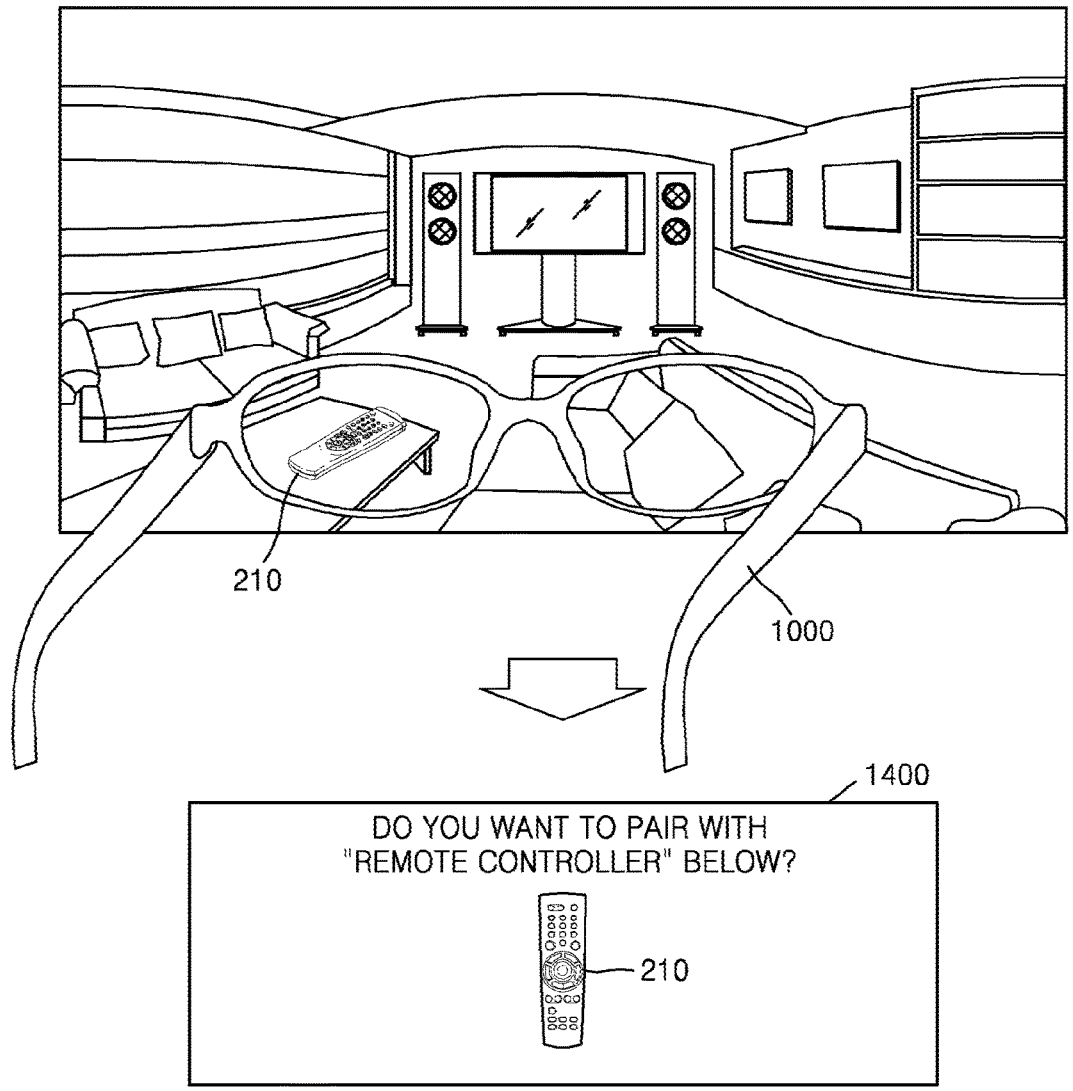
FIG. 10 is a diagram illustrating a pairing method, according to an embodiment of the present disclosure.

FIG. 10 is a diagram illustrating a pairing method, according to an embodiment of the present disclosure. Referring to FIG. 10, the mobile device 1000 may determine an intention of a user and may select an electronic device to pair with. For example, if the smart glasses 110 determine that a user is looking in a same direction for a designated period of time, the smart glasses 110 pair with an electronic device located in the direction viewed by the user. Furthermore, if the mobile device 1000 determines that the camera 1200 is being operated and the same image is input for a designated period of time, the mobile device 1000 pairs with an electronic device included in the input image.

The mobile device 1000 may send an inquiry to a user inquiring whether to control an identified electronic device. FIG. 10 shows a case in which the remote controller 210 is included in an input image. The mobile device 1000 may display an image of the remote controller 210 at the display unit 1400 and may receive an input regarding whether to pair with the remote controller 210 from a user. If an input to pair with the remote controller 210 is received from the user, the mobile device 1000 pairs with the remote controller 210.

Figure 11:
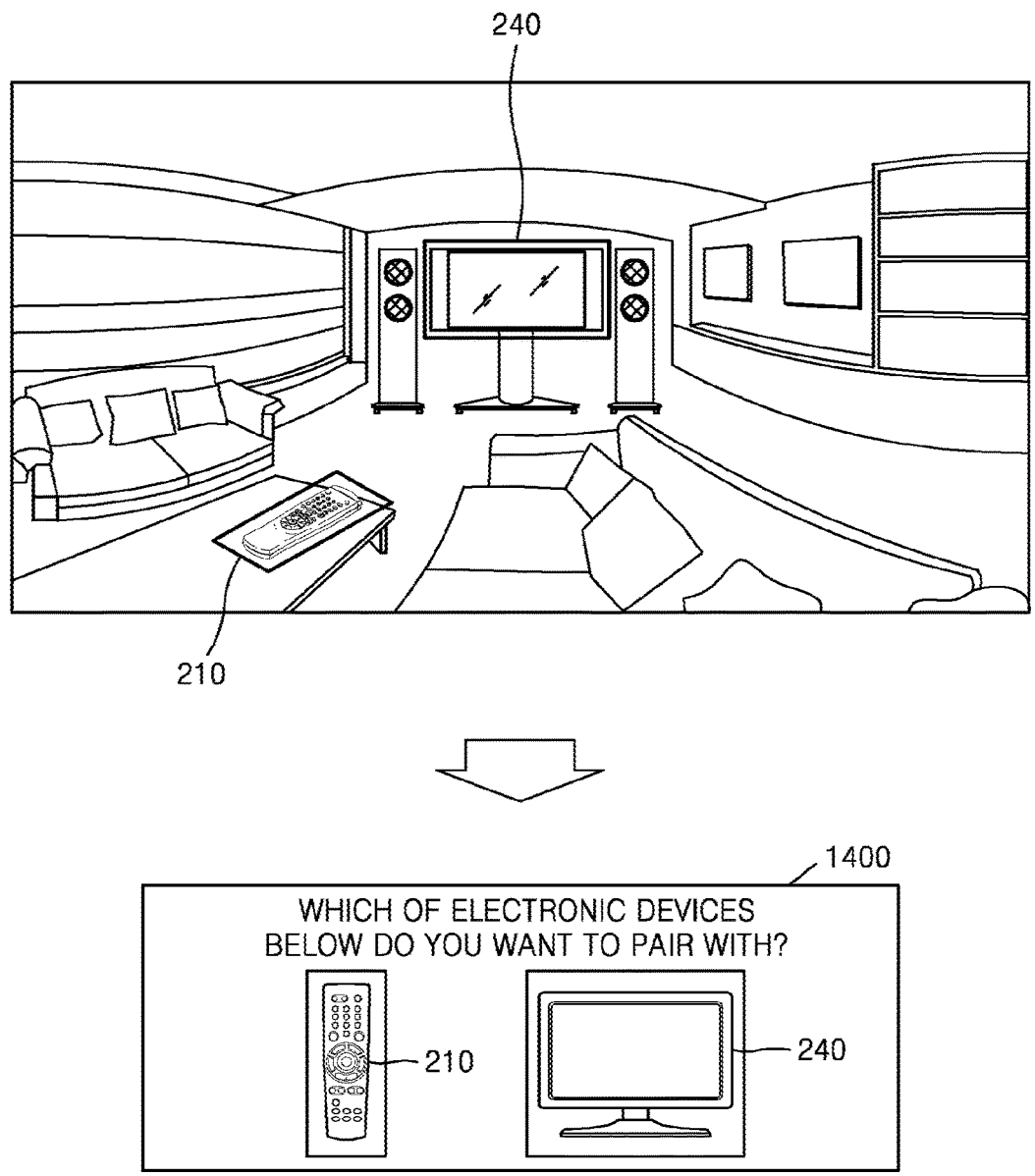
FIG. 11 is a diagram illustrating a pairing method, according to an embodiment of the present disclosure.

FIG. 11 is a diagram illustrating a pairing method, according to an embodiment of the present disclosure. Referring to FIG. 11, the mobile device 1000 may select an electronic device to pair with from among electronic devices included in an obtained image.

If an image is obtained when the mobile device 1000 is ready for pairing, the mobile device 1000 analyzes the obtained image and determines whether an electronic device is included in the obtained image. If an image is obtained in pairing mode, the mobile device 1000 may analyze whether an electronic device is included in the obtained image. The mobile device 1000 may display electronic devices included in the display unit 1400.

FIG. 11 is a diagram showing a case in which the remote controller 210 and the TV 240 are included in an obtained image. The mobile device 1000 displays the remote controller 210 and the TV 240 at the display unit 1400. The mobile device 1000 may receive an input from a user to select an electronic device for pairing from between the remote controller 210 and the TV 240. For example, if an input to pair with the TV 240 is received from a user via the display unit 1400, the mobile device 1000 pairs with the TV 240.

Figure 12:
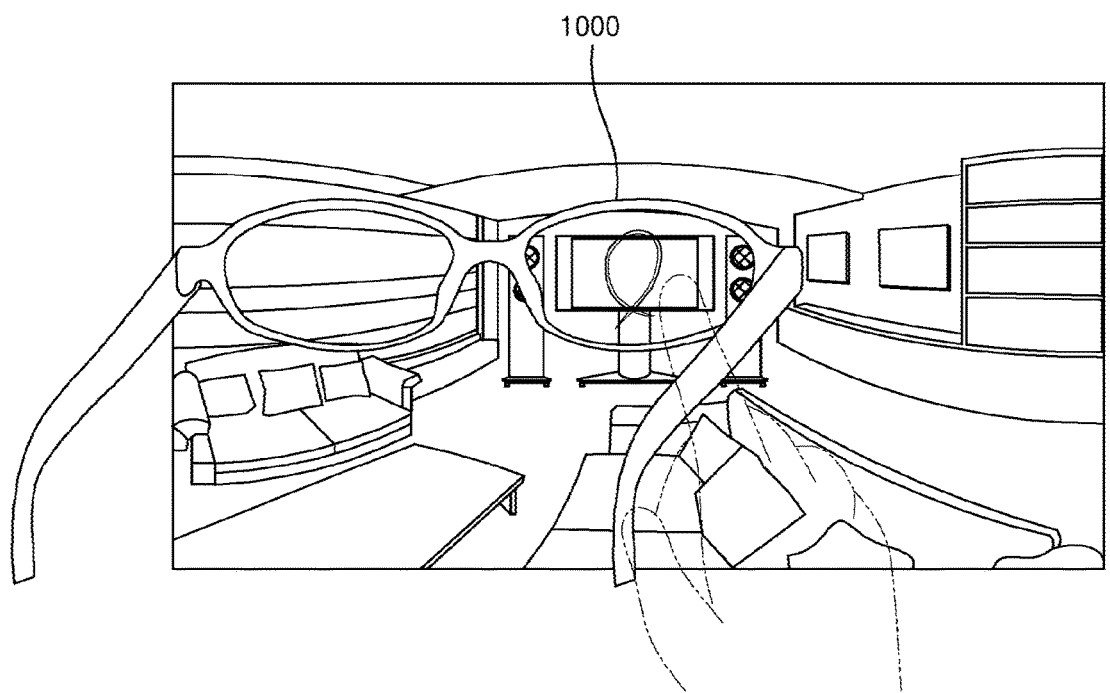
FIG. 12 is a diagram illustrating a pairing method, according to an embodiment of the present disclosure.

FIG. 12 is a diagram illustrating a pairing method, according to an embodiment of the present disclosure. Referring to FIG. 12, the mobile device 1000 may select an electronic device to pair with based on a gesture of a user.

If a gesture of a user is detected when the mobile device 1000 is ready for pairing, the mobile device 1000 analyzes an image and determines whether an electronic device is included in the image. When the mobile device 1000 is in a pairing mode, upon detecting a user's gesture for selecting an electronic device, the mobile device 1000 may search for an electronic device in an area where the gesture is detected. FIG. 12 shows a user's gesture for selecting the TV 240. Therefore, the mobile device 1000 pairs with the TV 240.

Figure 13:
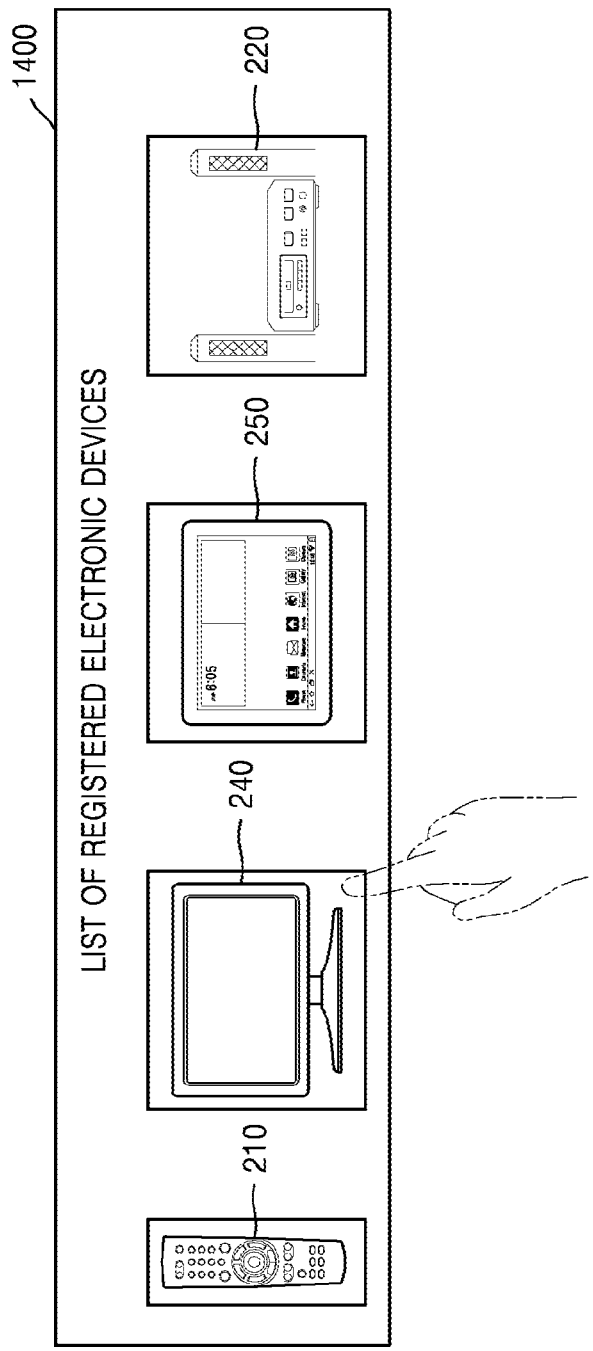
FIG. 13 is a diagram illustrating a pairing method, according to an embodiment of the present disclosure.

FIG. 13 is a diagram illustrating a pairing method, according to an embodiment of the present disclosure. Referring to FIG. 13, the mobile device 1000 may select an electronic device to pair with from among electronic devices that are registered in advance.

The mobile device 1000 displays a list of electronic devices registered in advance at the display unit 1400. The mobile device 1000 receives an input from a user and selects an electronic device to pair with from among the displayed electronic devices. FIG. 13 shows a case in which a user selects the TV 240. Therefore, the mobile device 1000 pairs with the TV 240.

Figure 14A:
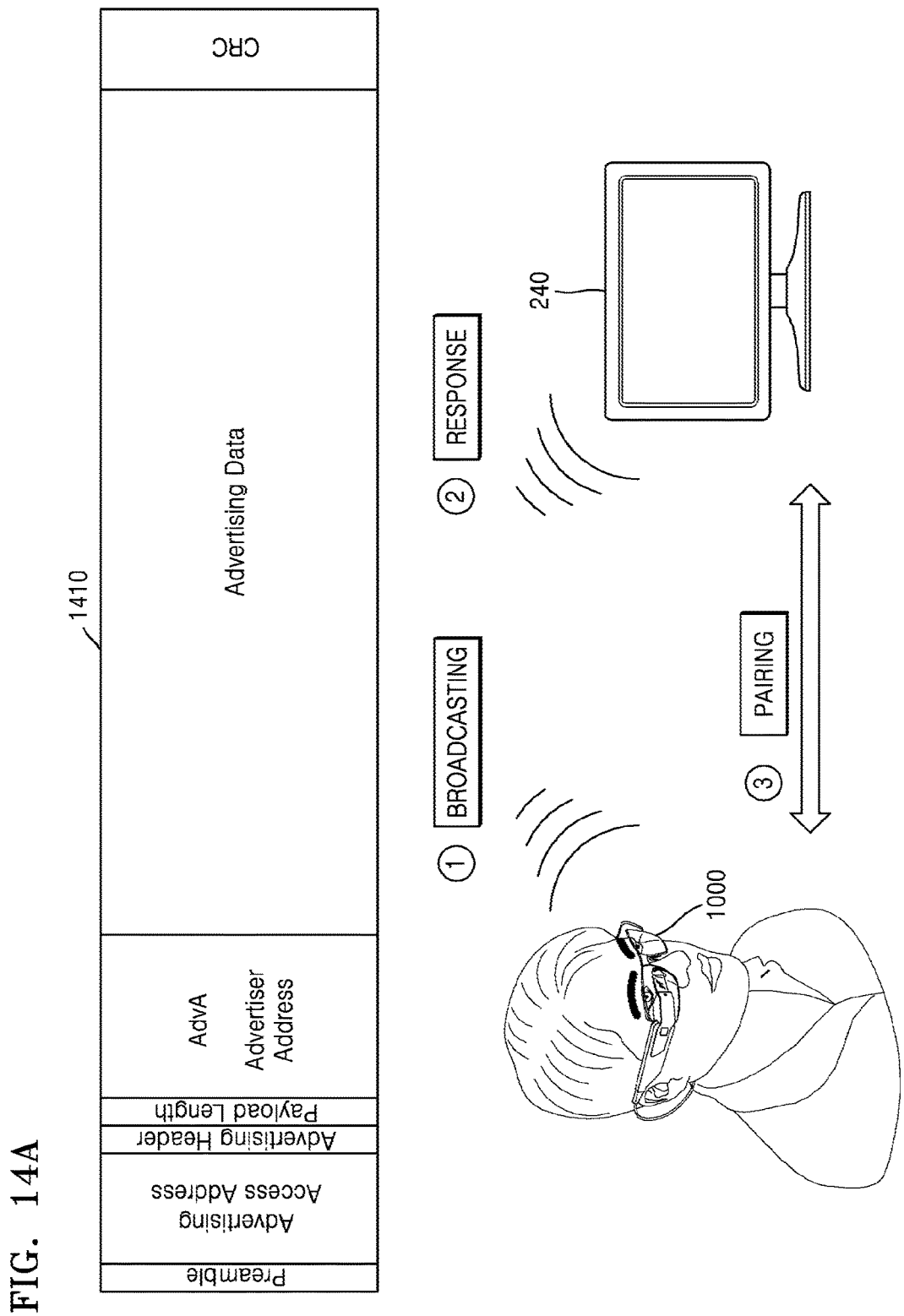
FIG. 14A is a diagram illustrating a method in which the mobile device pairs with an electronic device by broadcasting a packet, according to an embodiment of the present disclosure.

FIG. 14A is a diagram illustrating a method in which a mobile device 1000 pairs with an electronic device by broadcasting a packet. Referring to FIG. 14A, the mobile device 1000 pairs with an electronic device by broadcasting a packet 1410 for connection.

The mobile device 1000 identifies a type of an electronic device included in an image. The mobile device 1000 broadcasts the packet 1410 for requesting pairing with an electronic device of the identified type. The mobile device 1000 receives a response packet and pairs with an electronic device that transmitted the response packet.

In FIG. 14A, the mobile device 1000 broadcasts the packet 1410 and pairs with the TV 240. If an electronic device included in an image is determined as the TV 240, the mobile device 1000 broadcasts the packet 1410 for requesting pairing with the TV 240. The packet 1410 may include data for requesting only the TV 240 to transmit a response packet. The data for requesting only the TV 240 to transmit a response packet may be included in advertising data or in separate item.

The TV 240 receives the packet 1410 from the mobile device 1000 and transmits a response packet to the mobile device 1000. The mobile device 1000 receives the response packet from the TV 240 and pairs with the TV 240 based on the response packet.

The packet 1410 includes items such as a preamble, an advertising access address, an advertising header, an advertiser address, and advertising data. The packet 1410 may be included in advertising data that is broadcast and may include data that identifies the mobile device 1000 and indicates that the mobile device 1000 wants to pair with a TV. The mobile device 1000 may transmit the packet 1410 and inform the TV 240 about services to be provided. For example, the mobile device 1000 may transmit moving images or a song to the TV 240.

Furthermore, the mobile device 1000 may add information regarding a location of the mobile device 1000 to the packet 1410, and may broadcast the packet 1410.

The TV 240 receives the packet 1410 and transmits a response packet indicating that the TV 240 is a TV available for connection to the mobile device 1000. The TV 240 may add information regarding a necessary application for controlling the TV 240 to the response packet, and may transmit the response packet to the mobile device 1000. If the packet 1410 includes data that requests only the TV 240 to transmit a response packet, only the TV 240 from among those electronic devices that received the packet 1410 transmits a response packet to the mobile device 1000.

The TV 240 may communicate with a location of the mobile device 1000 included in the packet 1410 via, for example, a beam-forming method. In this case, the TV 240 may transmit a response packet to the location of the mobile device 1000, and thus, power consumption may be reduced.

Figure 14B:
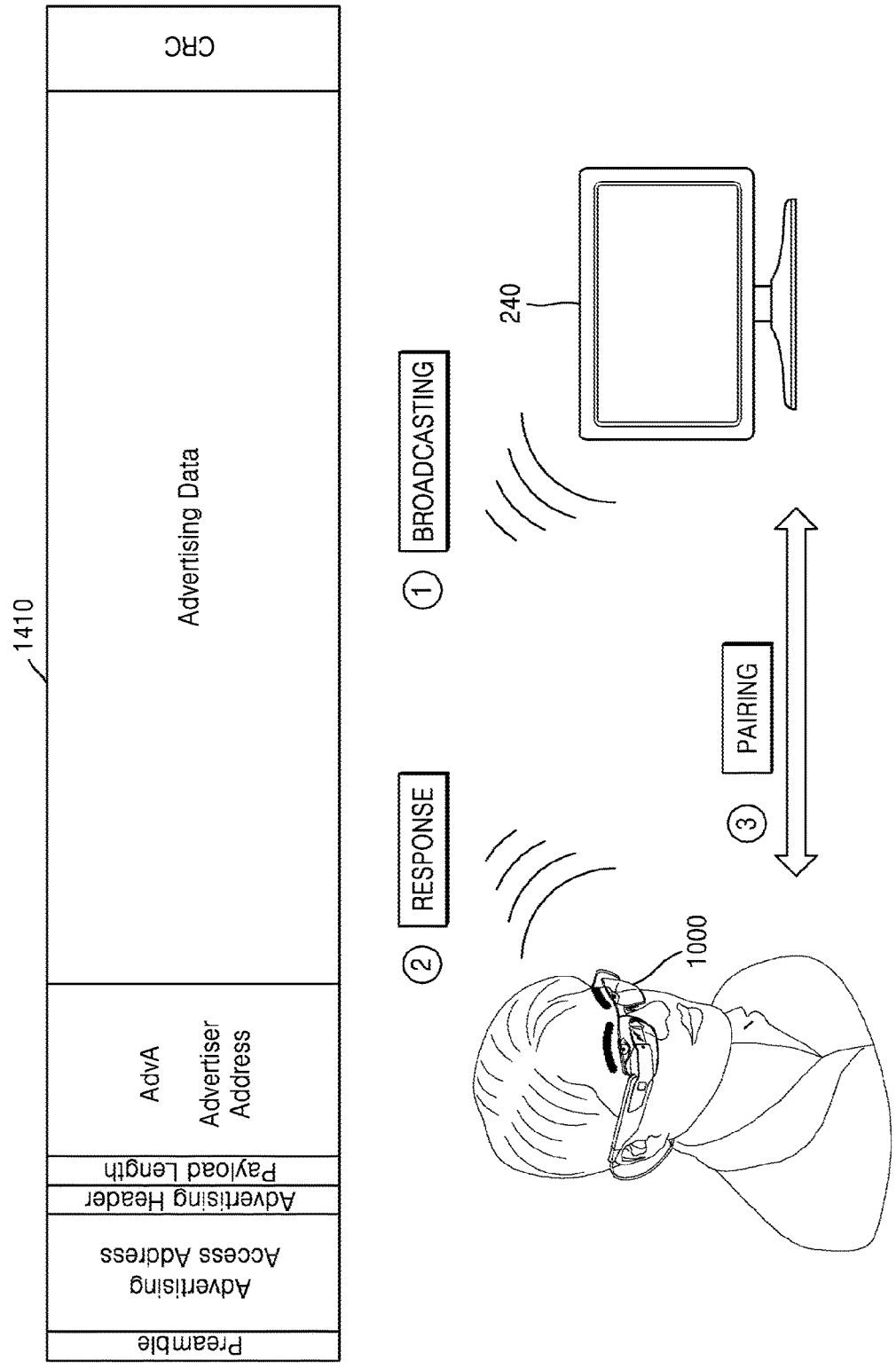
FIG. 14B is a diagram illustrating a method in which an electronic device pairs with the mobile device by broadcasting a packet, according to an embodiment of the present disclosure.

FIG. 14B is a diagram illustrating a method in which an electronic device pairs with the mobile device by broadcasting a packet, according to an embodiment of the present disclosure. Referring to FIG. 14B, an electronic device may pair with the mobile device 1000 by broadcasting the packet 1410. In other words, if the TV 240 broadcasts the packet 1410, the mobile device 1000 may pair with the TV 240 by using device information included in the received packet 1410.

In FIG. 14B, the TV 240 pairs with the mobile device 1000 by broadcasting the packet 1410. The packet 1410 transmitted by the TV 240 includes device information regarding the TV 240. In other words, a packet transmitted by the TV 240 includes data indicating that the TV 240 is a TV available to be paired and connection information for pairing.

The mobile device 1000 receives the packet 1410 broadcasted from the TV 240, and pairs with the TV 240 by transmitting a response packet to the TV 240.

The mobile device 1000 determines that the pairable TV 240 is nearby based on the packet 1410 received from the TV 240, and stores device information included in the packet 1410. The mobile device 1000 stores identification information regarding the TV 240 in advance. The mobile device 1000 extracts device information regarding an electronic device included in an obtained image. The mobile device 1000 compares the extracted identification information to stored identification information and identifies an electronic device included in the image. If the electronic device included in the image is identified as the TV 240, the mobile device 1000 attempts to pair with the TV 240 by transmitting a response packet to the TV 240 by using device information included in the packet 1410.

Figure 15:
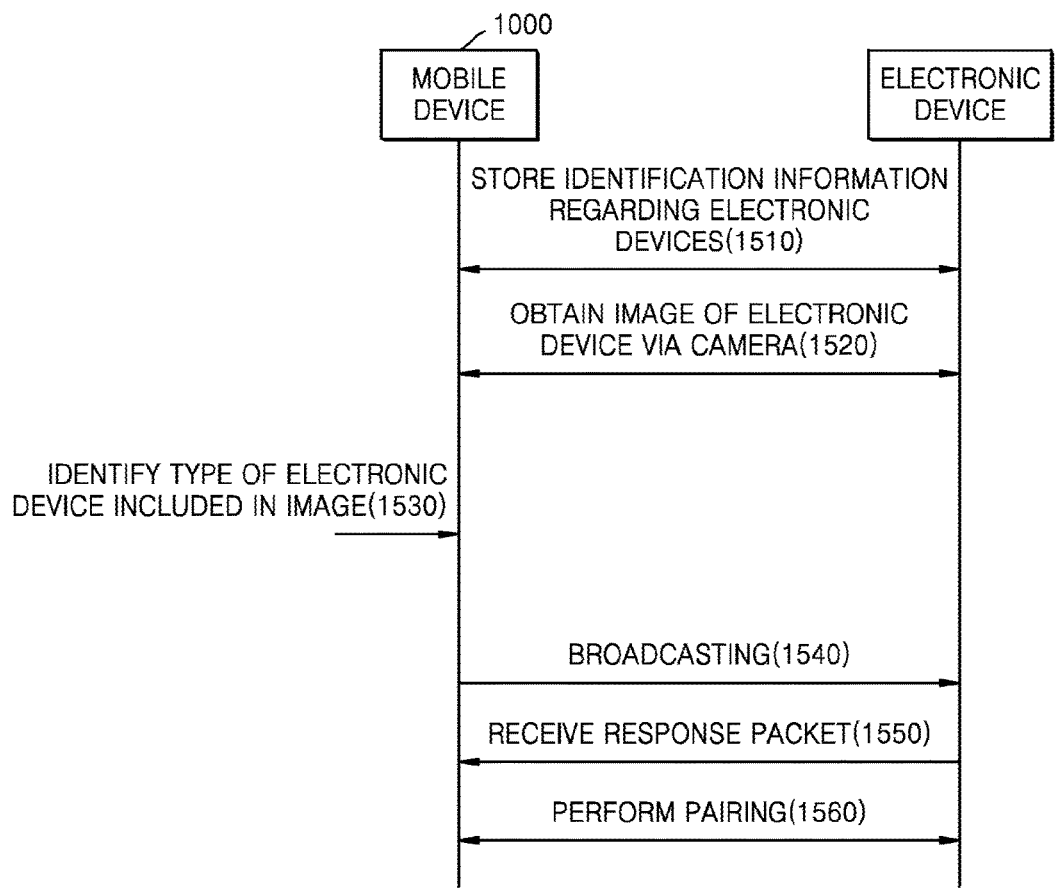
FIG. 15 is a diagram illustrating a method in which the mobile device performs pairing via broadcasting a packet, according to an embodiment of the present disclosure.

FIG. 15 is a diagram illustrating a method in which the mobile device pairs with an electronic device by broadcasting a packet, according to an embodiment of the present disclosure. Referring to FIG. 15, in operation 1510, the mobile device 1000 stores identification information regarding electronic devices. The mobile device 1000 may store identification information according to the types of electronic devices.

In operation 1520, the mobile device 1000 obtains an image of an electronic device via the camera 1200.

In operation 1530, the mobile device 1000 identifies a type of the electronic device included in the image.

In operation 1540, the mobile device 1000 broadcasts a packet to pair with an electronic device of the identified type. The packet includes information regarding the mobile device 1000 and information regarding the type of the electronic device to pair with.

In operation 1550, the mobile device 1000 receives a response packet from an electronic device. An electronic device that received a packet from the mobile device 1000 reads information regarding the type of electronic device indicated in the packet. The electronic device, which received the packet from the mobile device 1000, transmits a response packet to the mobile device 1000 only if the electronic device is the type of electronic device indicated in the read information. A response packet includes information regarding the type of the electronic device, information indicating whether the electronic device is available to be paired with, and device information for pairing.

In operation 1560, the mobile device 1000 pairs with the electronic device. The mobile device 1000 may pairs with an electronic device, which transmitted the response packet, by using device information included in the response packet.

Figure 16:
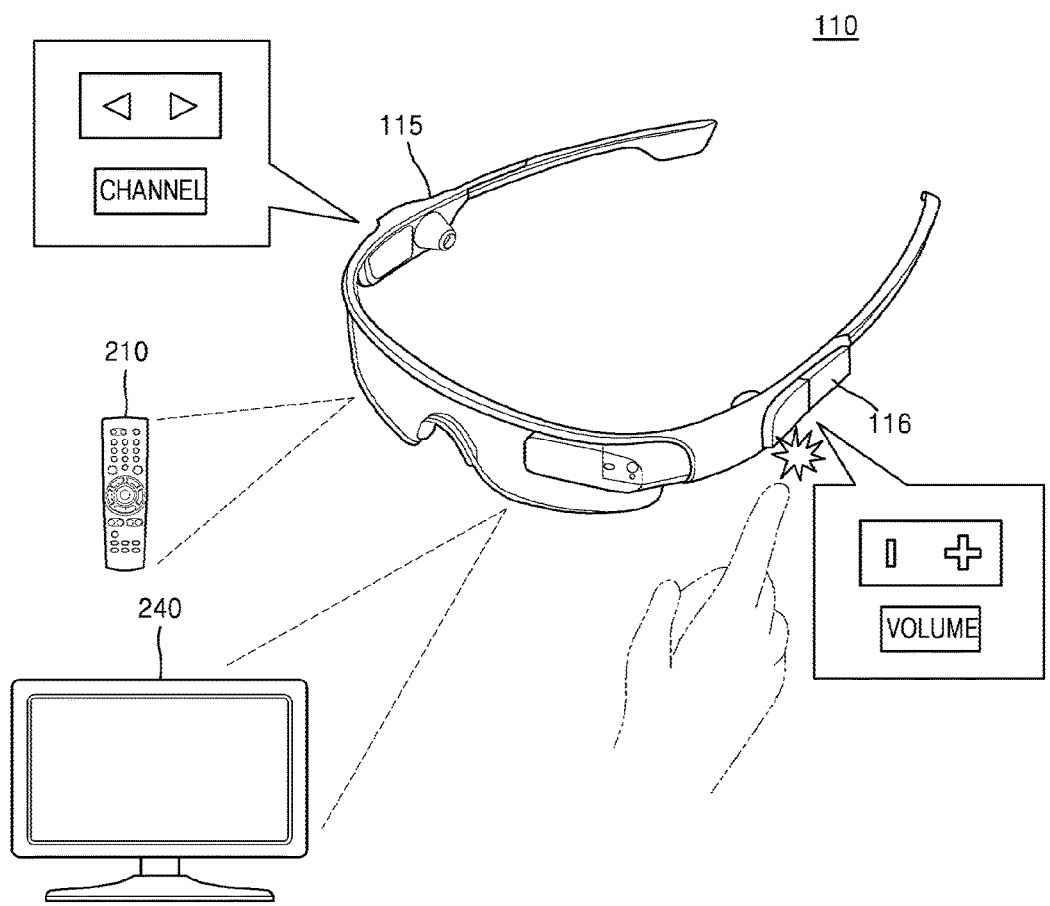
FIG. 16 is a diagram illustrating a method in which the mobile device controls an electronic device by using an input unit, according to an embodiment of the present disclosure.

FIG. 16 is a diagram illustrating a method in which the mobile device controls an electronic device by using an input unit, according to an embodiment of the present disclosure. Referring to FIG. 16, the smart glasses 110 may control an electronic device by using an input unit.

If the smart glasses 110 do not control an electronic device, first and second input units 115 and 116 of the smart glasses 110 are used as input units for controlling operation of the smart glasses 110. However, when the smart glasses 110 control a nearby electronic device, functions of the first and second input units 115 and 116 are changed to functions for controlling the nearby electronic device.

The smart glasses 110 include the first and second input units 115 and 116. Functions of the first and second input units 115 and 116 are changed based on an identified electronic device. For example, if the smart glasses 110 identify the remote controller 210 and control the remote controller 210, the first input unit 115 performs a function for changing a track, and the second input unit 116 performs a function for changing the volume. If the smart glasses 110 identify the TV 240 and control the TV 240, the first input unit 115 performs a function for changing a channel, and the second input unit 116 performs a function for changing the volume.

Figure 17:
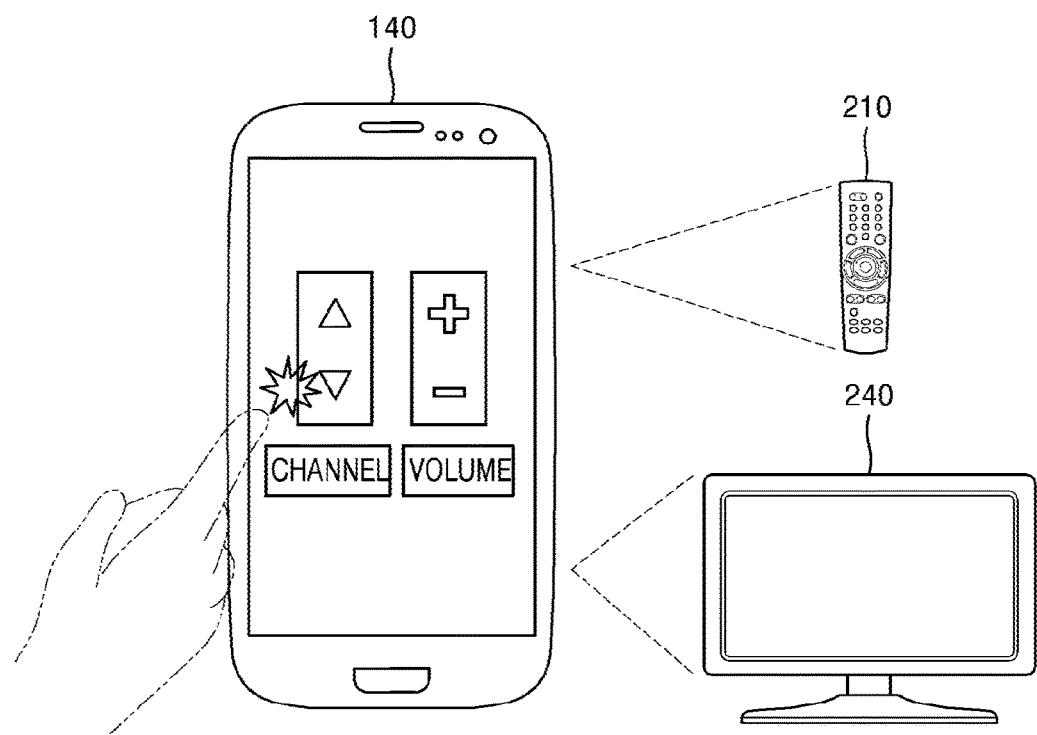
FIG. 17 is a diagram illustrating a method in which the mobile device controls an electronic device by using an application, according to an embodiment of the present disclosure.

FIG. 17 is a diagram illustrating a method in which the mobile device 1000 controls an electronic device by using an application, according to an embodiment of the present disclosure. Referring to FIG. 17, the smart phone 140 may control the remote controller 210 or the TV 240 by using an application.

The smart phone 140 stores an application or a program for controlling an electronic device. The smart phone 140 may store the application or program for controlling the electronic device in advance or obtain information for downloading the application or program, download the application or program, and store the application or program.

The smart phone 140 executes an application or a program corresponding to an identified electronic device, and controls the identified electronic device. For example, if the smart phone 140 identifies the remote controller 210 and controls the remote controller 210, the smart phone 140 executes an application or a program corresponding to the remote controller 210. Furthermore, if the smart phone 140 identifies the TV 240 and controls the TV 240, the smart phone 140 executes an application or a program corresponding to the TV 240.

If the smart phone 140 executes an application or a program, a screen image for controlling functions of an electronic device is displayed at the smart phone 140. The smart phone 140 may receive a touch input from a user, and may transmit a control signal for changing a channel or a control signal for changing the volume to the electronic device.

Figure 18:
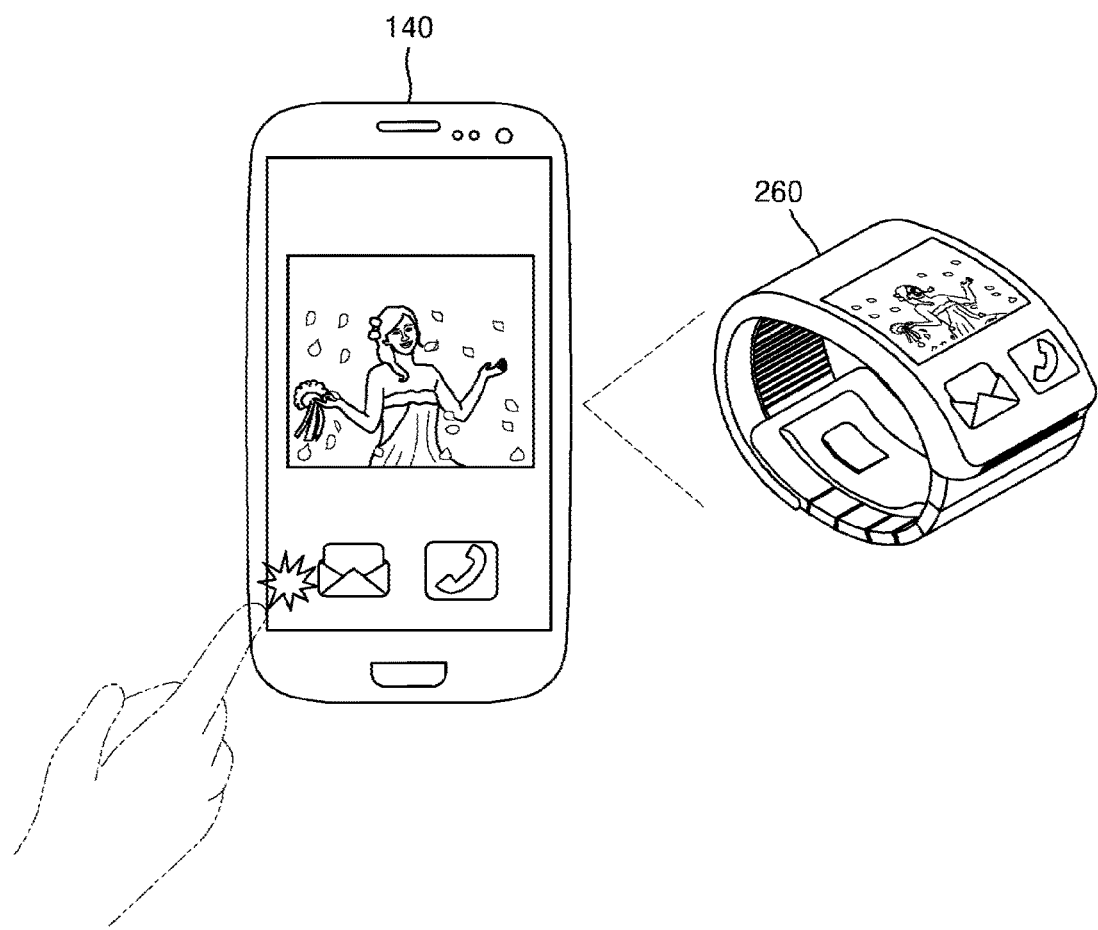
FIG. 18 is a diagram illustrating a method in which the mobile device controls an electronic device by providing a screen image displayed at the electronic device, according to an embodiment of the present disclosure.

FIG. 18 is a diagram illustrating a method in which the mobile device controls an electronic device by providing a screen image displayed at the electronic device, according to an embodiment of the present disclosure. Referring to FIG. 18, the smart phone 140 may control a wearable device 260 by providing a screen image displayed at the wearable device 260. Although description below relates to the smart phone 140, any electronic device capable of displaying a screen image identical to a screen image displayed at the wearable device 260, and receiving an input from a user, may control the wearable device 260 by providing a screen image identical to the screen image displayed at the wearable device 260 to a user.

When the smart phone 140 is paired with the wearable device 260, the smart phone 140 may provide a screen image identical to a screen image displayed at the wearable device 260. The smart phone 140 receives a screen image from the wearable device 260 and displays the received screen image.

The smart phone 140 controls the wearable device 260 based on an input from a user. The smart phone 140 transmits a control signal to the wearable device 260 based on a location of an input from a user and a received screen image. For example, the smart phone 140 may determine a location on a touch panel touched by a user, and may transmit a control signal to the wearable device 260. The wearable device 260 performs an operation based on a control signal and transmits a screen image showing a result of performing the operation to the smart phone 140. The smart phone 140 displays the received screen image at a display unit.

Figure 19:
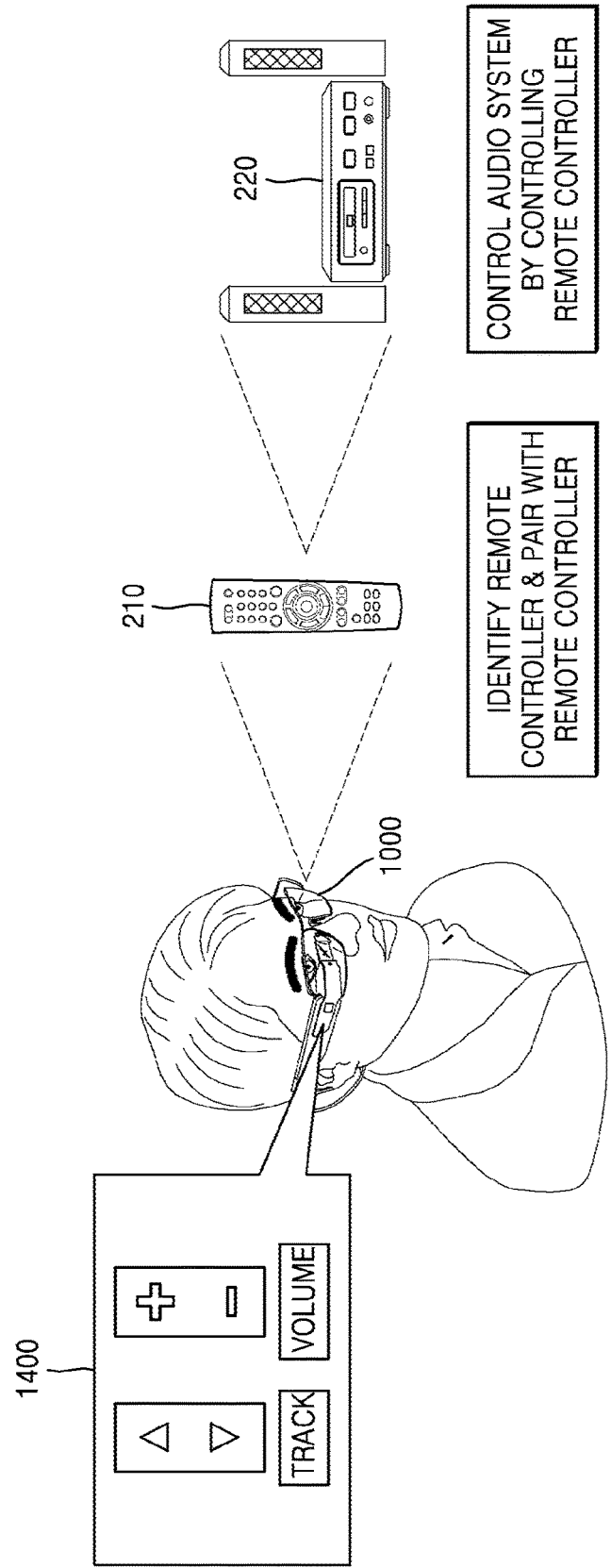
FIG. 19 is a diagram for describing a method that the mobile device according to an embodiment controls an audio system.

FIG. 19 is a diagram illustrating a method in which the mobile device controls an audio system 220, according to an embodiment of the present disclosure. Referring to FIG. 19, the mobile device 1000 pairs with the remote controller 210 and controls the audio system 220 via the remote controller 210.

The mobile device 1000 identifies the remote controller 210 and pairs with the remote controller 210.

The display unit 1400 displays a screen image for controlling the remote controller 210. FIG. 19 shows a case in which a track and a volume level are displayed at the display unit 1400. The mobile device 1000 receives an input from a user, and transmits a control signal to the remote controller 210 based on the received input. For example, the mobile device 1000 may receive an input for changing a track or an input for changing the volume from a user.

The remote controller 210 controls the audio system 220. The remote controller 210 controls the audio system 220 based on a control signal received from the mobile device 1000.

The mobile device 1000 may control the audio system 220 by directly transmitting a control signal to the audio system 220.

Figure 20:
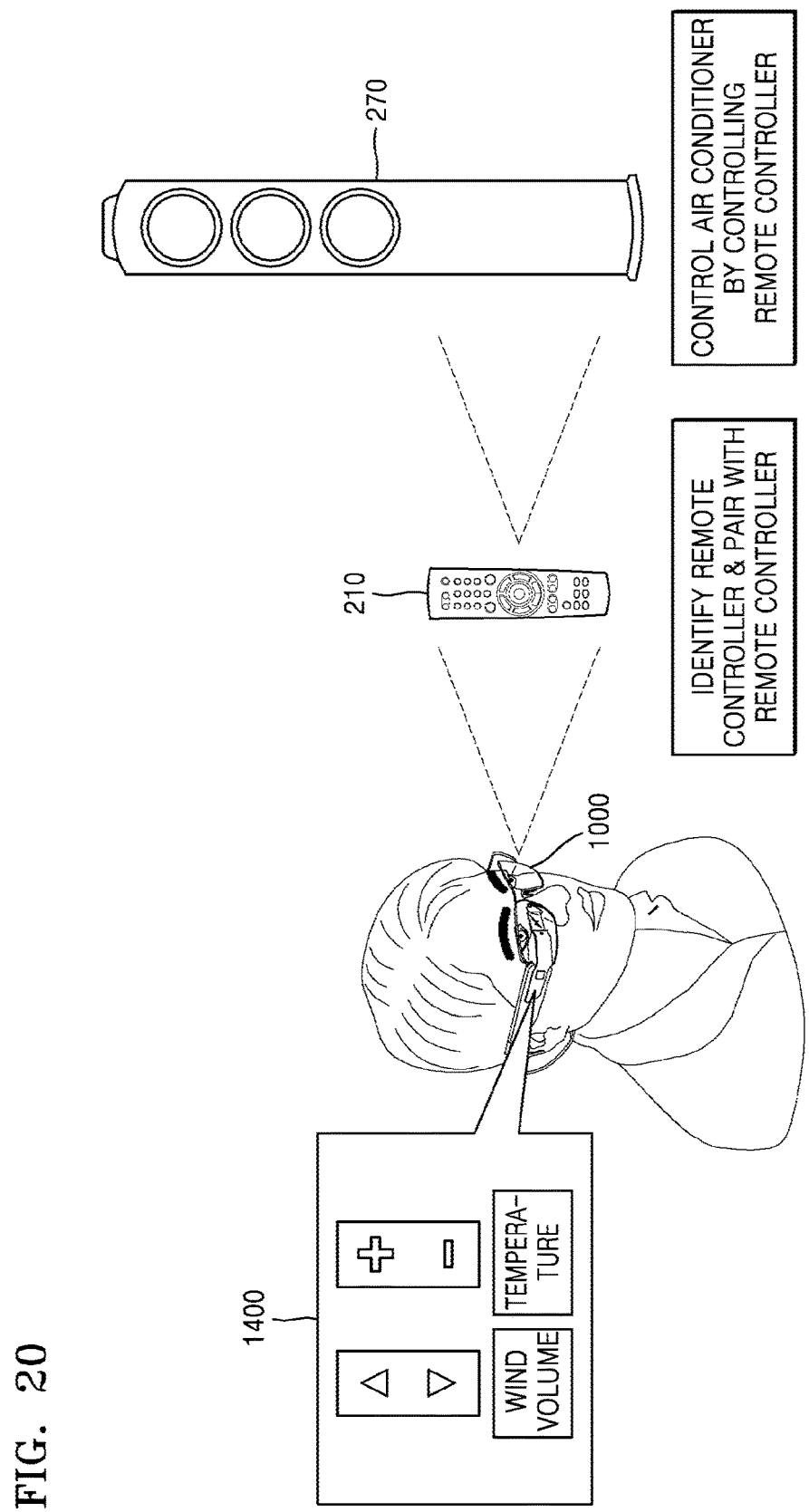
FIG. 20 is a diagram illustrating a method in which the mobile device controls an air conditioner, according to an embodiment of the present disclosure.

FIG. 20 is a diagram illustrating a method in which the mobile device controls an air conditioner, according to an embodiment of the present disclosure. Referring to FIG. 20, the mobile device 1000 pairs with the remote controller 210 and controls an air conditioner 270 via the remote controller 210.

The mobile device 1000 identifies the remote controller 210 and pairs with the remote controller 210.

The mobile device 1000 receives an input from a user and transmits a control signal to the remote controller 210 based on the received input. For example, the mobile device 1000 may receive an input for changing a fan speed or an input for changing the temperature from a user.

The display unit 1400 displays a screen image for controlling the air conditioner 270. FIG. 20 shows a case in which a fan speed and the temperature are displayed at the display unit 1400. The remote controller 210 controls the air conditioner 270 based on a control signal received from the mobile device 1000.

The mobile device 1000 may control the air conditioner 270 by directly transmitting a control signal to the air conditioner 270.

Figure 21:
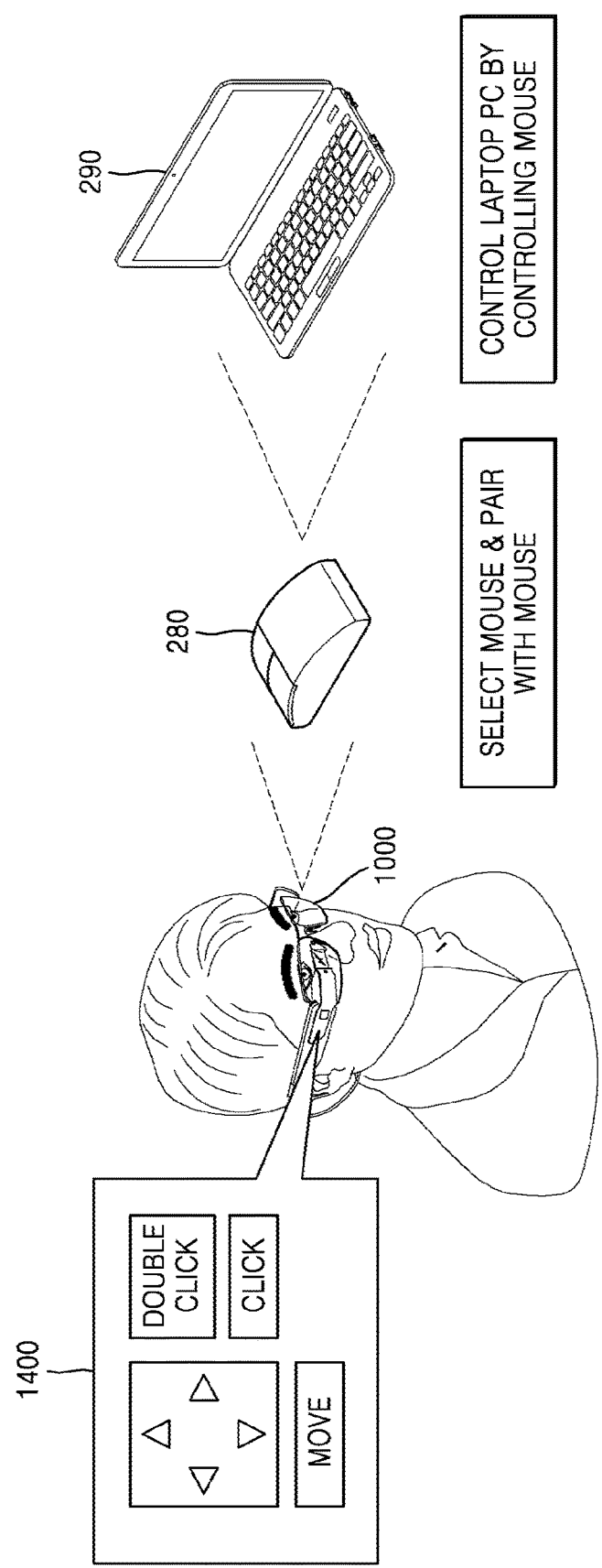
FIG. 21 is a diagram illustrating a method in which the mobile device controls a laptop PC, according to an embodiment of the present disclosure.

FIG. 21 is a diagram illustrating a method in which the mobile device controls a laptop personal computer (PC), according to an embodiment of the present disclosure. Referring to FIG. 21, the mobile device 1000 pairs with a mouse 280 and controls a laptop PC 290 by using the mouse 280.

The mobile device 1000 pairs with the laptop PC 290. The mobile device 1000 identifies the mouse 280 and pairs with the mouse 280.

The display unit 1400 displays a screen image for controlling the mouse 280. FIG. 21 shows a case in which movement, a click, and a double-click are displayed on the display unit 1400. The mobile device 1000 receives an input from a user and transmits a control signal to the mouse 280 based on the received input. For example, the mobile device 1000 may receive a command to move a cursor, to click, or to double-click from a user.

The mouse 280 controls the laptop PC 290 based on a control signal received from the mobile device 1000.

The mobile device 1000 may control the laptop PC 290 by directly transmitting a control signal to the laptop PC 290.

Figure 22:
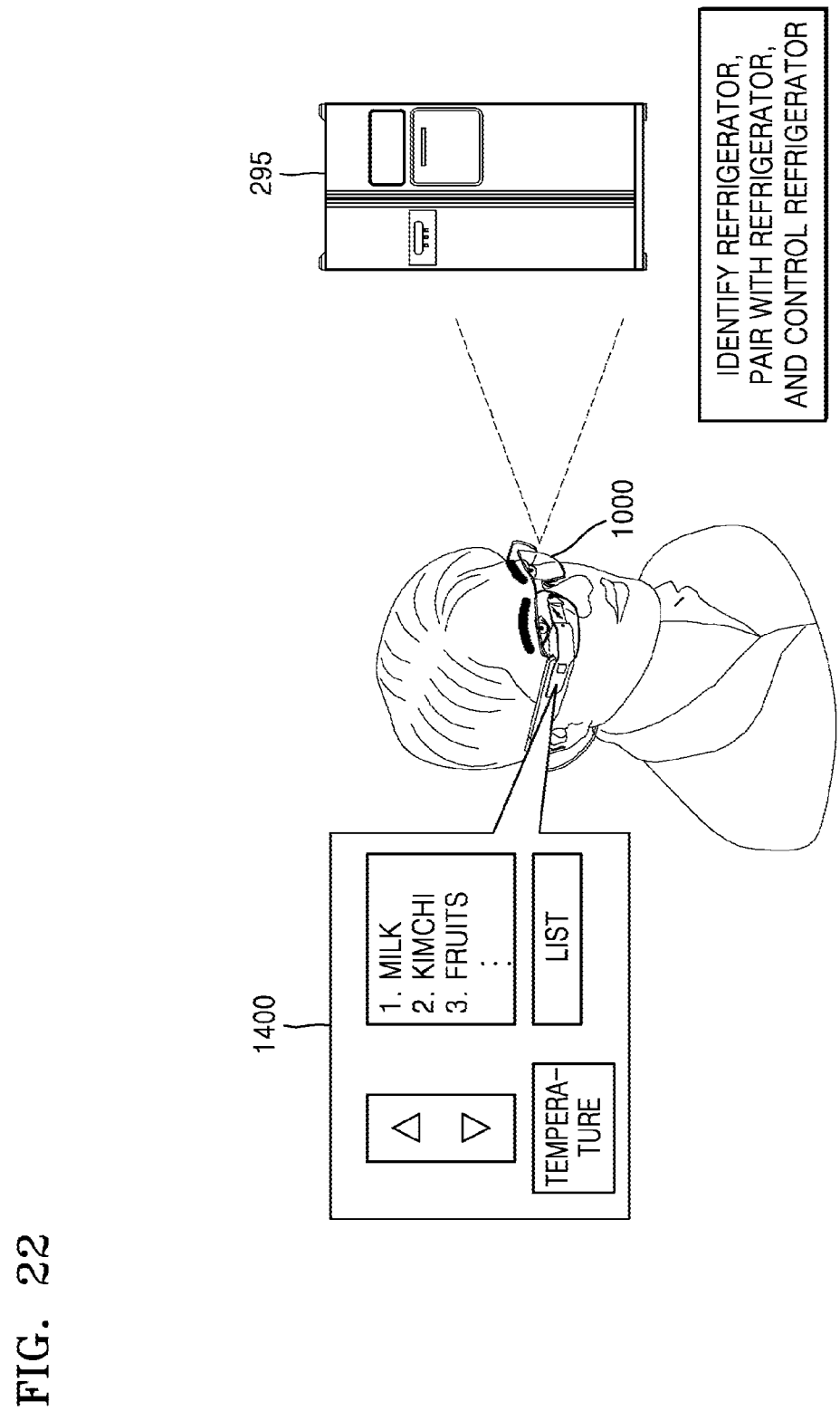
FIG. 22 is a diagram illustrating a method in which the mobile device controls a refrigerator, according to an embodiment of the present disclosure.

FIG. 22 is a diagram illustrating a method in which the mobile device controls a refrigerator, according to an embodiment of the present disclosure. Referring to FIG. 22, the mobile device 1000 pairs with a refrigerator 295 and controls the refrigerator 295.

The mobile device 1000 identifies the refrigerator 295 and pairs with the refrigerator 295.

The display unit 1400 displays a screen image for controlling the refrigerator 295. FIG. 22 shows a case in which the temperature and a list are displayed at the display unit 1400. The mobile device 1000 receives an input from a user and transmits a control signal to the refrigerator 295 based on the received input. For example, the mobile device 1000 may receive a command to adjust the temperature of the refrigerator 295 from a user.

The mobile device 1000 may receive information regarding the refrigerator 295 from the refrigerator 295 and display the information at the display unit 1400. For example, the refrigerator 295 may transmit a list of contents stored in the refrigerator 295 to the mobile device 1000. The mobile device 1000 displays the list received from the refrigerator 295 at the display unit 1400. A user may adjust temperature of the refrigerator 295 with reference to the list.

Figure 23:
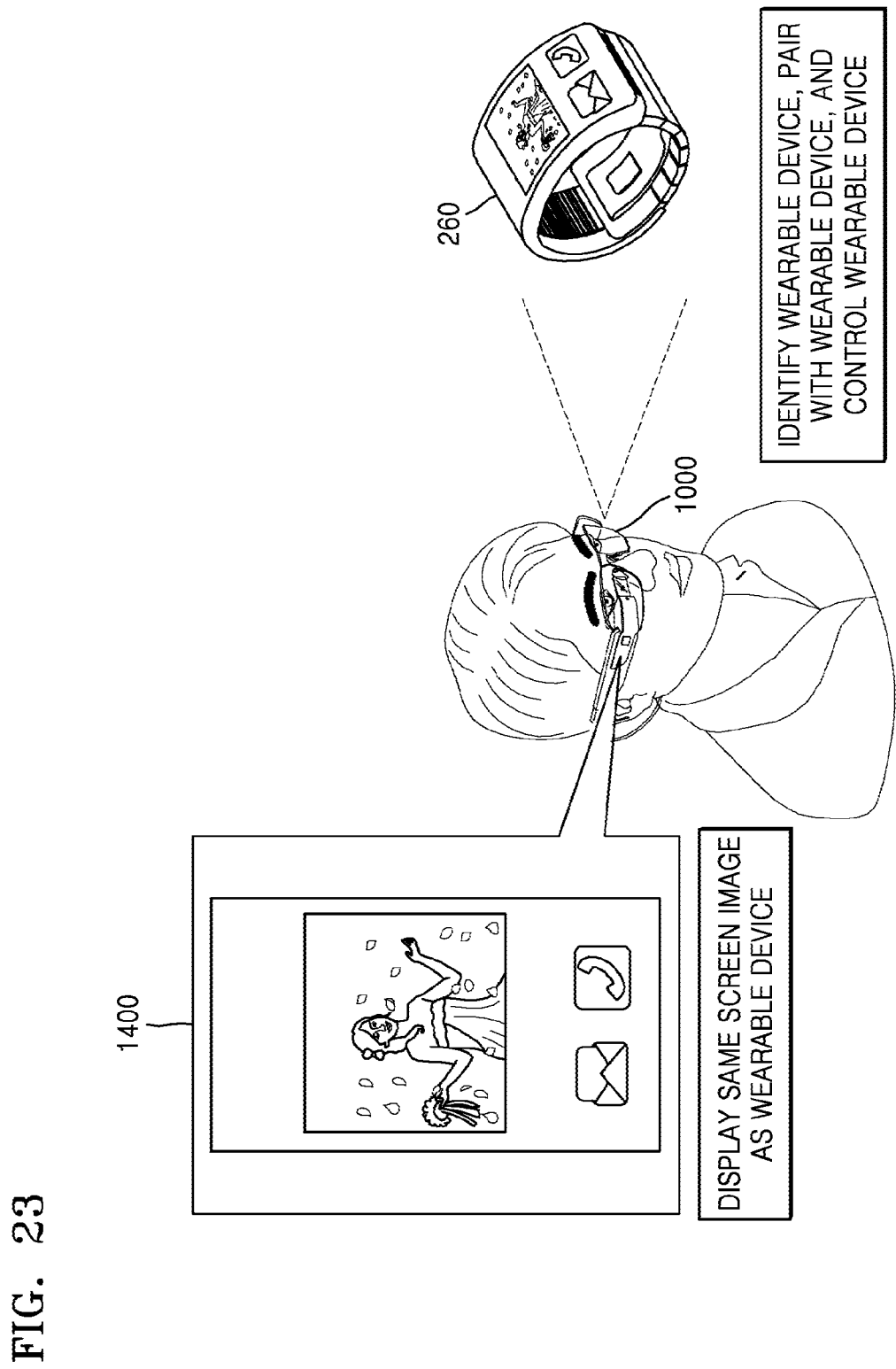
FIG. 23 is a diagram illustrating a method in which the mobile device controls the wearable device, according to an embodiment of the present disclosure.

FIG. 23 is a diagram illustrating a method in which the mobile device controls a wearable device, according to an embodiment of the present disclosure. Referring to FIG. 23, the mobile device 1000 pairs with the wearable device 260 and controls the wearable device 260.

The mobile device 1000 identifies the wearable device 260 and pairs with the wearable device 260.

The display unit 1400 displays a screen image for controlling the wearable device 260. FIG. 23 shows a case in which the display unit 1400 displays a screen image identical to a screen image displayed at the wearable device 260. The mobile device 1000 receives an input from a user and transmits a control signal to the wearable device 260.

Figure 24:
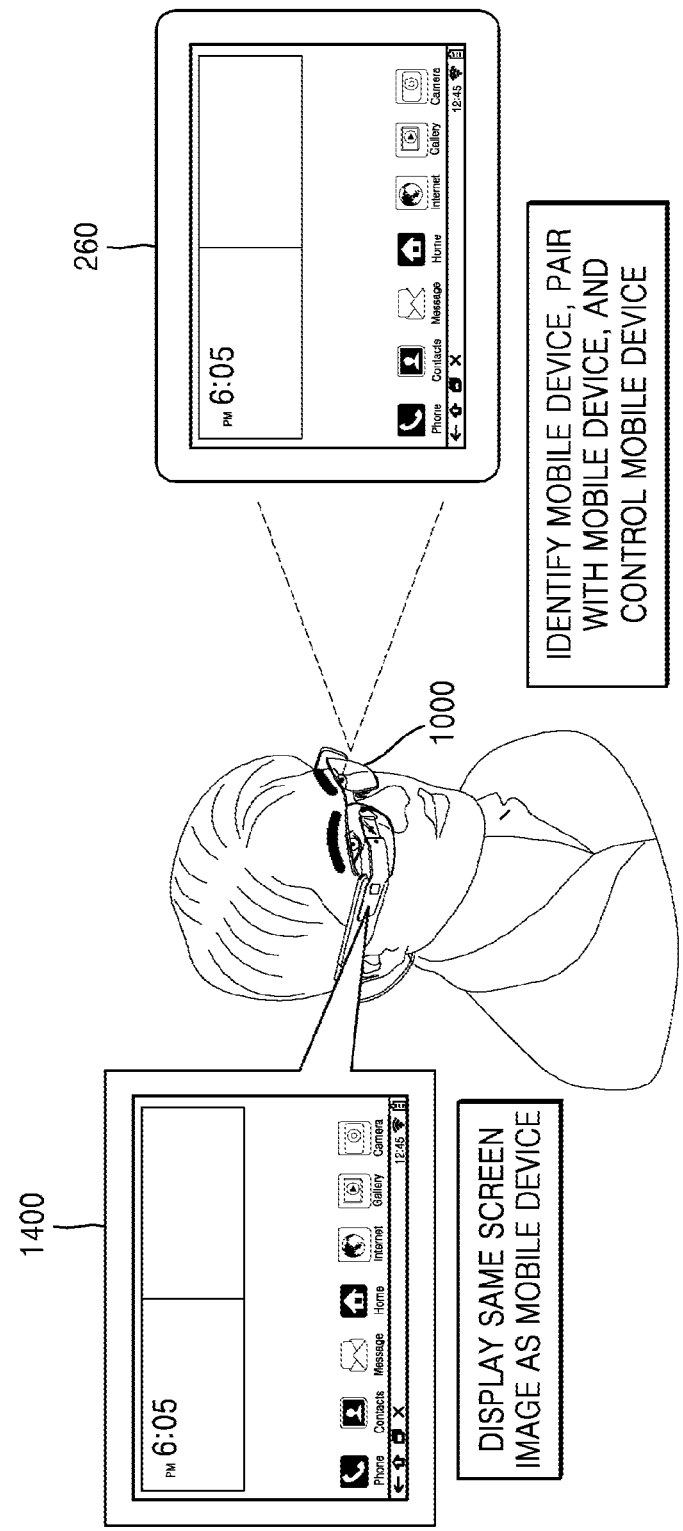
FIG. 24 is a diagram illustrating a method in which the mobile device controls a mobile device, according to an embodiment of the present disclosure.

FIG. 24 is a diagram illustrating a method in which the mobile device controls a mobile device, according to an embodiment of the present disclosure. Referring to FIG. 24, the mobile device 1000 pairs with another mobile device and controls the other mobile device.

The mobile device 1000 identifies the other mobile device and pairs with the other mobile device.

Figure 25:
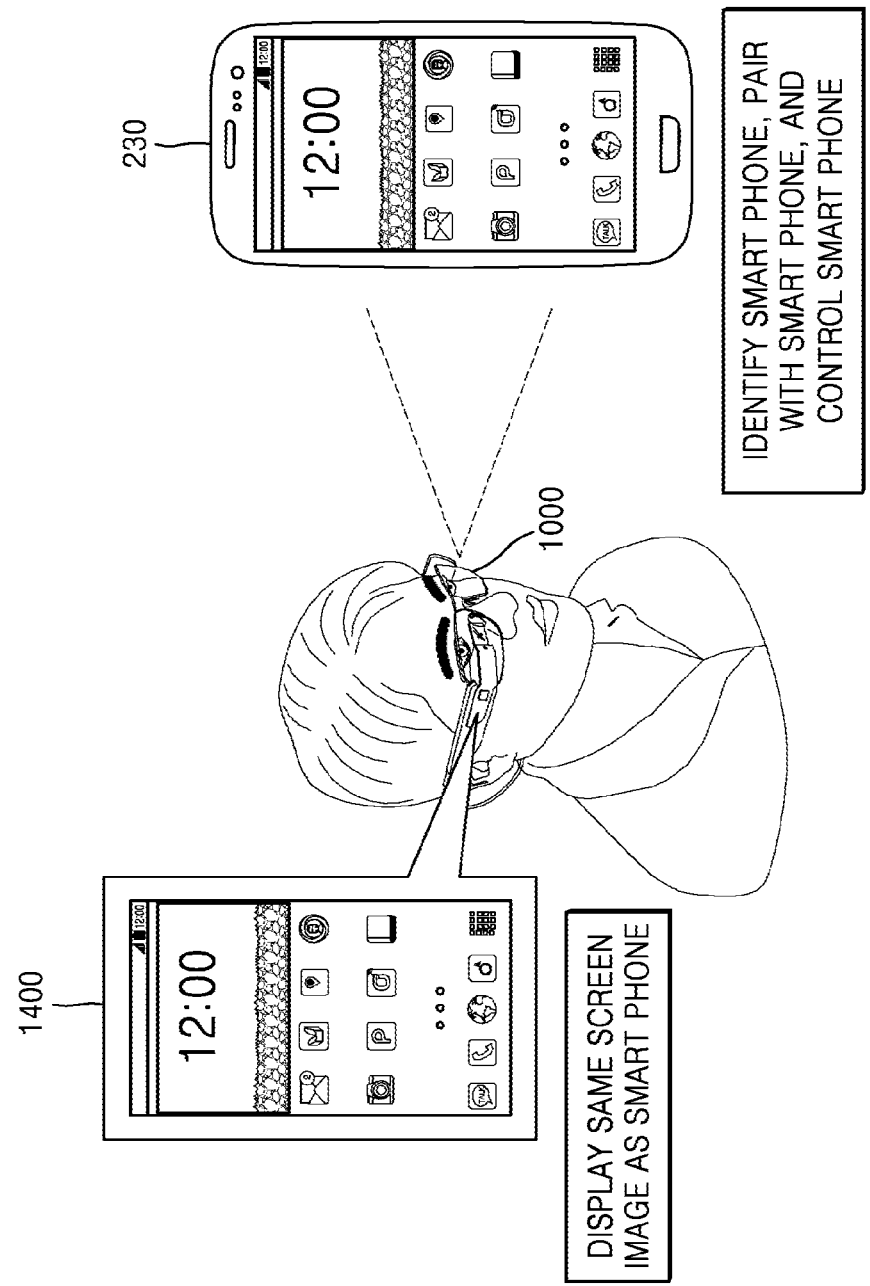
FIG. 25 is a diagram illustrating a case in which the display unit displays a screen image identical to a screen image displayed at the other mobile device, according to an embodiment of the present disclosure.

The display unit display unit 1400 displays a screen image for controlling the other mobile device. FIG. 25 shows a case in which the display unit 1400 displays a screen image identical to a screen image displayed at the other mobile device. The mobile device 1000 receives an input from a user and transmits a control signal to the other mobile device.

FIG. 25 is a diagram illustrating a method in which the mobile device mobile device controls a smart phone, according to an embodiment of the present disclosure. Referring to FIG. 25, the mobile device 1000 pairs with the smart phone 230 and controls the smart phone 230.

The mobile device 1000 identifies the smart phone 230 and pairs with the smart phone 230.

The display unit 1400 displays a screen image for controlling the smart phone 230. FIG. 25 shows a case in which the display unit 1400 displays a screen image identical to a screen image displayed at the smart phone 230. The mobile device 1000 receives an input from a user and transmits a control signal to the smart phone 230.

Figure 26A:
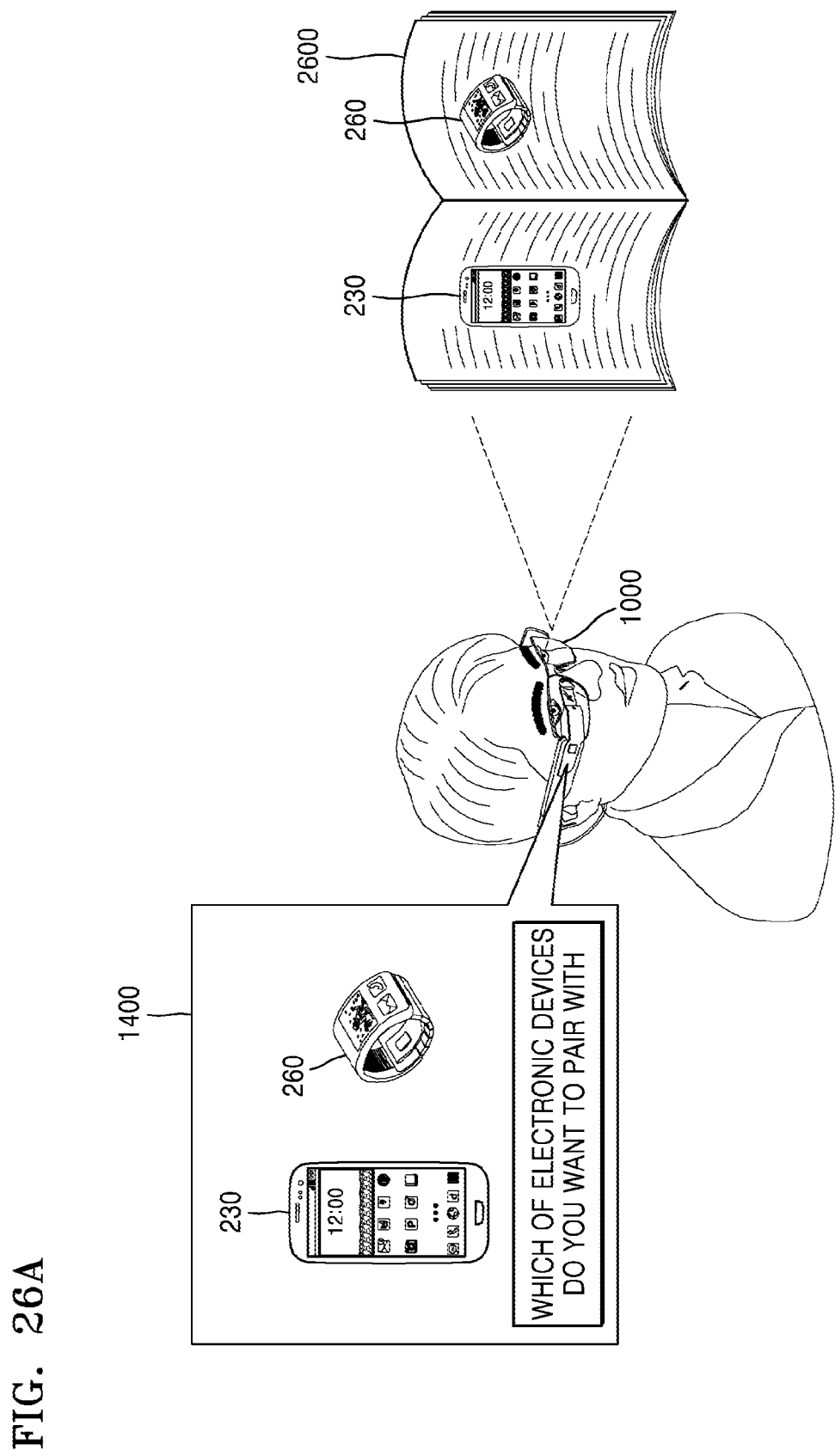
FIGS. 26A and 26B are diagrams illustrating a method in which the mobile device pairs with an electronic device using an image of the electronic device, according to an embodiment of the present disclosure.

FIG. 26A is a diagram illustrating a method in which the mobile device pairs with an electronic device by using an image of the electronic device, according to an embodiment of the present disclosure. Referring to FIG. 26A, the mobile device 1000 may obtain an image of an electronic device and select an electronic device to pair with.

In FIG. 26A, images of the smart phone 230 and the wearable device 260 are shown in a book 2600. The mobile device 1000 may identify the smart phone 230 and the wearable device 260 shown in the book 2600 and display the identified smart phone 230 and the identified wearable device 260 at the display unit 1400.

A user selects an electronic device to pair with from between the smart phone 230 or the wearable device 260.

The mobile device 1000 pairs with an electronic device selected by the user. The mobile device 1000 determines whether the selected electronic device is nearby and pairs with the selected electronic device by using stored device information.

A drawing or an image shown in a book may be a drawing or an image drawn or taken at a different angle compared to the angle at which stored device information (i.e., a stored drawing or image) is taken. In this case, the mobile device 1000 may not be able to find the drawing or the image shown in the book in the stored device information even if the drawing and the device information indicate the same product. To resolve the problem, when the mobile device 1000 stores device information, the mobile device 1000 may store images taken at various angles or drawings drawn at various angles. In other words, stored device information may include a plurality of images or a plurality of drawings regarding a same product.

Figure 26B:
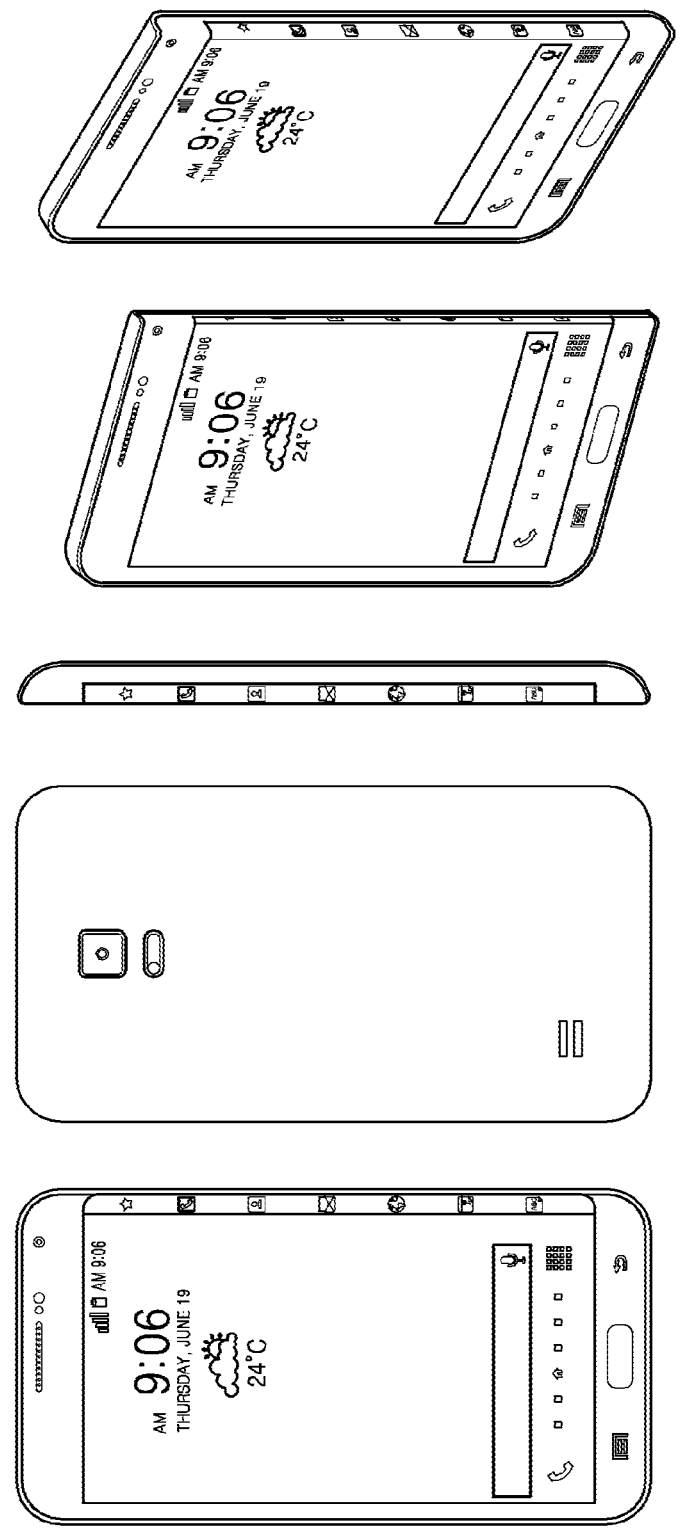

FIG. 26B is a diagram illustrating device information stored in the mobile device, according to an embodiment of the present disclosure. Referring to FIG. 26B, a representative image of a smart phone and images of the smart phone taken at various angles are shown.

If the mobile device 1000 identifies an electronic device, the mobile device 1000 may compare a obtained image of the electronic device to a representative image in stored device information and, if the obtained image of the electronic device is not identical to the representative image, may compare the obtained image of the electronic device to images taken at other angles.

The mobile device 1000 may utilize a representative image and images taken at various angles not only for recognizing a drawing in a book, but also to identify an actual electronic device.

Figure 27:
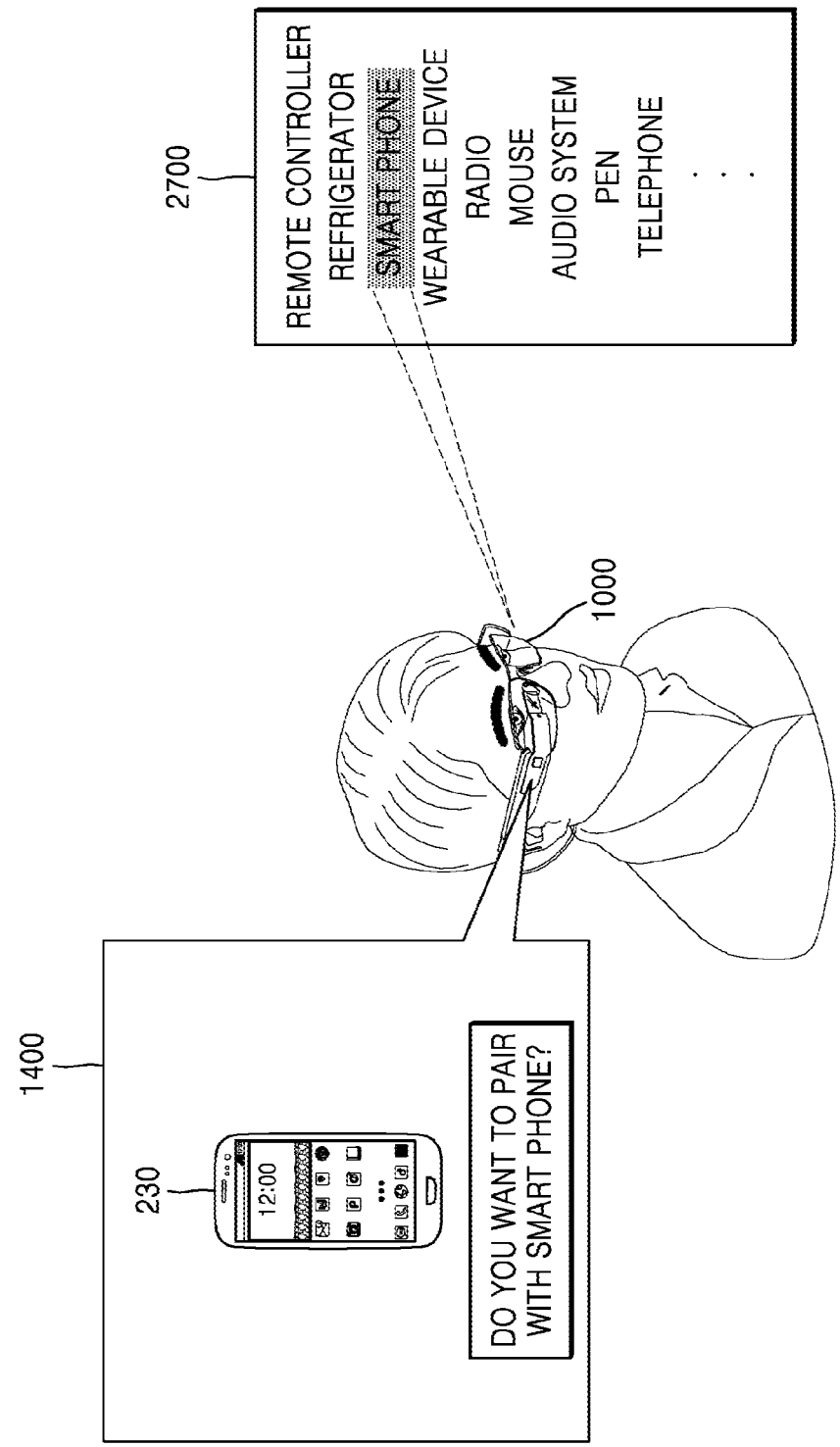
FIG. 27 is a diagram illustrating a method in which the mobile device pairs with an electronic device via a text, according to an embodiment of the present disclosure.

FIG. 27 is a diagram illustrating a method in which the mobile device pairs with an electronic device via a text, according to an embodiment of the present disclosure. Referring to FIG. 27, the mobile device 1000 may recognize a name of an electronic device included in a text 2700 and may select an electronic device to pair with.

In FIG. 27, the text 2700 includes names of electronic devices. The mobile device 1000 analyzes the text 2700 and determines whether the text 2700 includes the name of an electronic device.

The mobile device 1000 recognizes the name of an electronic device located in a direction viewed by a user. Alternatively, the mobile device 1000 recognizes the name of an electronic device included in an obtained image. The mobile device 1000 displays an electronic device corresponding to a recognized name of an electronic device at the display unit 1400. If a plurality of names of electronic devices is recognized, an electronic device to pair with may be selected by a user.

The mobile device 1000 determines whether the selected electronic device is nearby and pairs with the selected electronic device by using device information.

The mobile device 1000 may recognize the name of an electronic device received via a microphone and may select an electronic device to pair with. If a user speaks the name of an electronic device, the mobile device 1000 recognizes the name of the electronic device pronounced by the user via a microphone and selects an electronic device to pair with.

Figure 28:
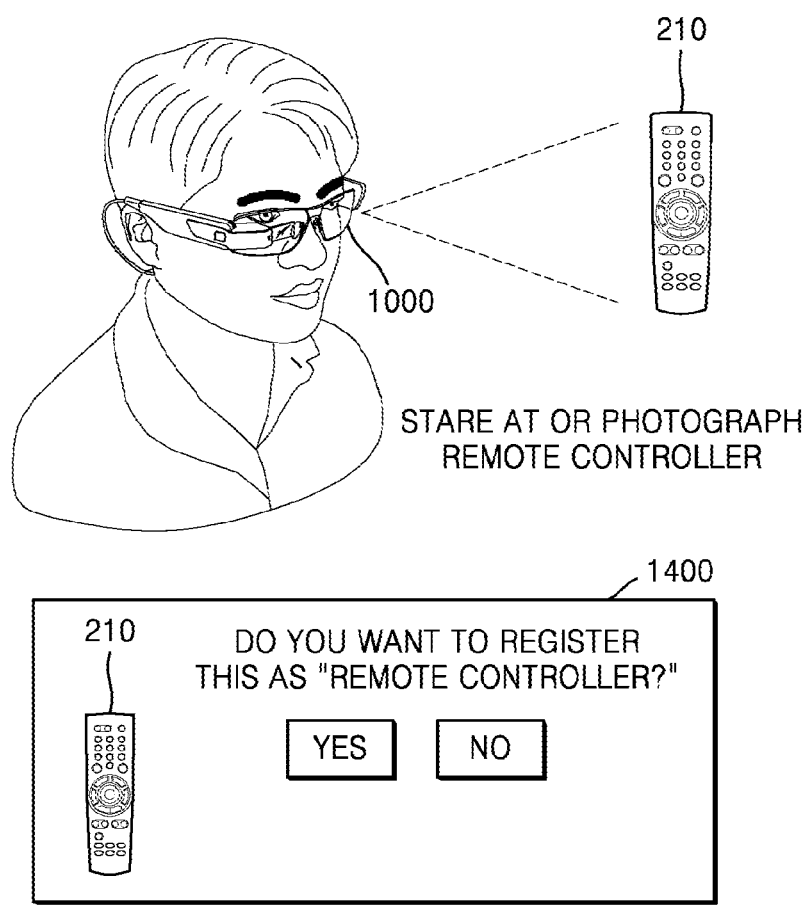
FIG. 28 is a diagram illustrating an operation in which the mobile device registers an electronic device, according to an embodiment of the present disclosure.

FIG. 28 is a diagram illustrating an operation in which the mobile device registers an electronic device, according to an embodiment of the present disclosure. Referring to FIG. 28, the mobile device 1000 registers an identified electronic device.

The mobile device 1000 registers an electronic device by using an image obtained via the camera 1200. For example, if a user is looking in a same direction for a designated period of time, the mobile device 1000 selects an electronic device located in the direction viewed by the user as an electronic device to register. Alternatively, the mobile device 1000 may select an electronic device included in the obtained image as an electronic device to register.

The mobile device 1000 may also display text inquiring whether to register an identified electronic device. FIG. 28 shows an operation for registering the remote controller 210, where the display unit 1400 displays text inquiring whether to register the remote controller 210.

Figure 29:
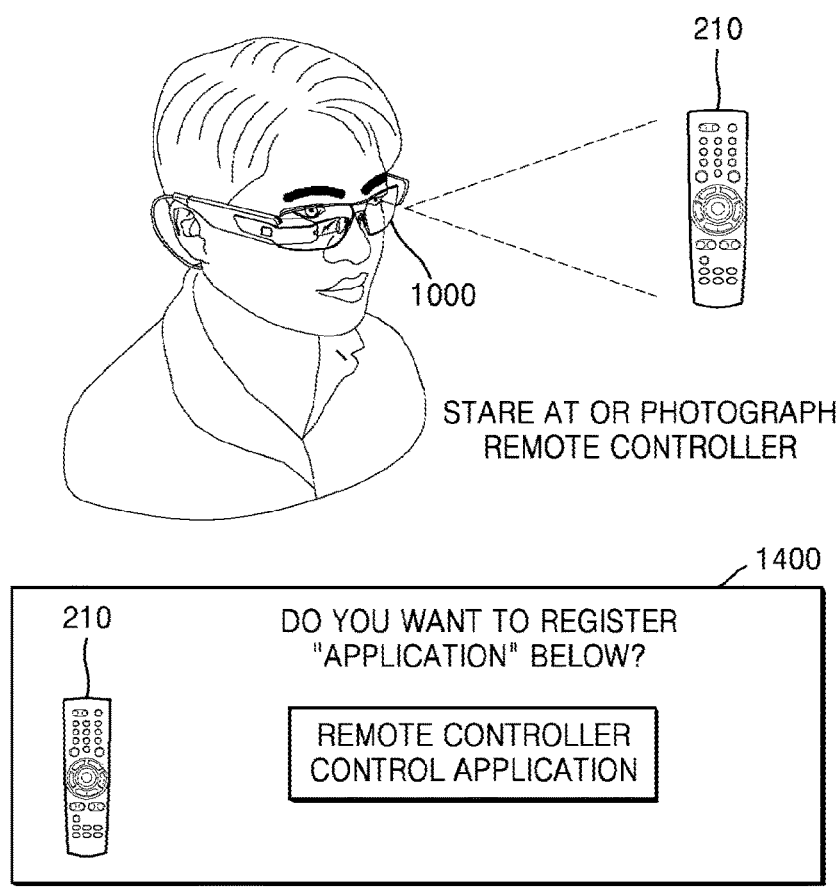
FIG. 29 is a diagram illustrating an operation in which the mobile device registers an application, according to an embodiment of the present disclosure.

FIG. 29 is a diagram illustrating an operation in which the mobile device registers an application, according to an embodiment of the present disclosure. Referring to FIG. 29, the mobile device 1000 registers an application for controlling an identified electronic device. An application includes functions for controlling an electronic device.

The mobile device 1000 may also display text inquiring whether to register an identified electronic device. FIG. 28 shows an operation for registering an "application for controlling a remote controller," where the display unit 1400 displays text inquiring whether to register the application.

Figure 30:
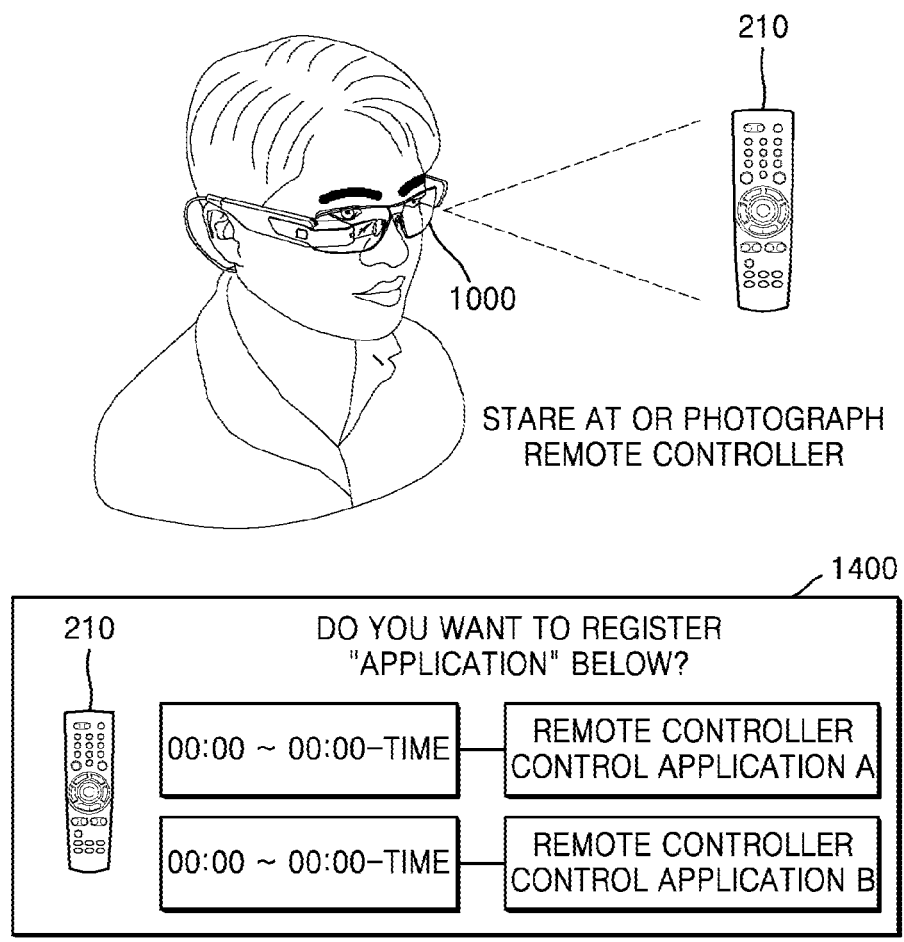
FIG. 30 a diagram illustrating an operation in which the mobile device registers an application, according to an embodiment of the present disclosure.

FIG. 30 a diagram illustrating an operation in which the mobile device registers an application, according to an embodiment of the present disclosure. Referring to FIG. 30, the mobile device 1000 registers a plurality of applications for controlling an identified electronic device.

The mobile device 1000 may assign different applications to different time slots for controlling an electronic device. For example, the mobile device 1000 may assign a "remote controller controlling application A" to a morning time slot to control the remote controller 210 in the morning, and may assign a "remote controller controlling application B" to an afternoon time slot to control the remote controller 210 in the afternoon.

The mobile device 1000 may display text inquiring whether to register an application. FIG. 30 shows an operation for registering the "remote controller controlling application A" and the "remote controller controlling application B," where the display unit 1400 displays text inquiring whether to register an application.

Figure 31:
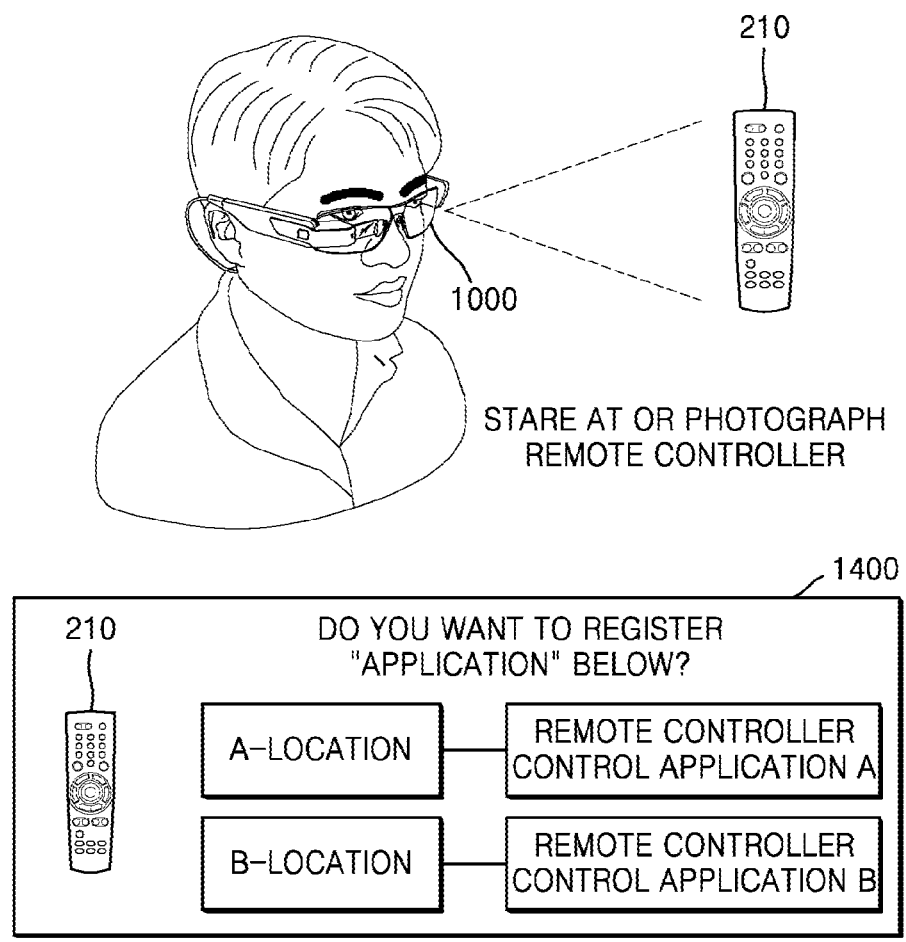
FIG. 31 a diagram illustrating an operation in which the mobile device registers an application, according to an embodiment of the present disclosure.

FIG. 31 is a diagram illustrating an operation in which the mobile device registers an application, according to an embodiment of the present disclosure. Referring to FIG. 31, the mobile device 1000 registers a plurality of applications for controlling an identified electronic device.

The mobile device 1000 may assign different applications to different locations for controlling an electronic device. For example, the mobile device 1000 may assign a "remote controller controlling application A" to an A-location to control the remote controller 210 at the A-location, and may assign a "remote controller controlling application B" to a B-location to control the remote controller 210 at the B-location.

The mobile device 1000 may display text inquiring whether to register an application. FIG. 31 shows an operation for registering the "remote controller controlling application A" and the "remote controller controlling application B," where the display unit 1400 displays text inquiring whether to register an application.

Figure 32:
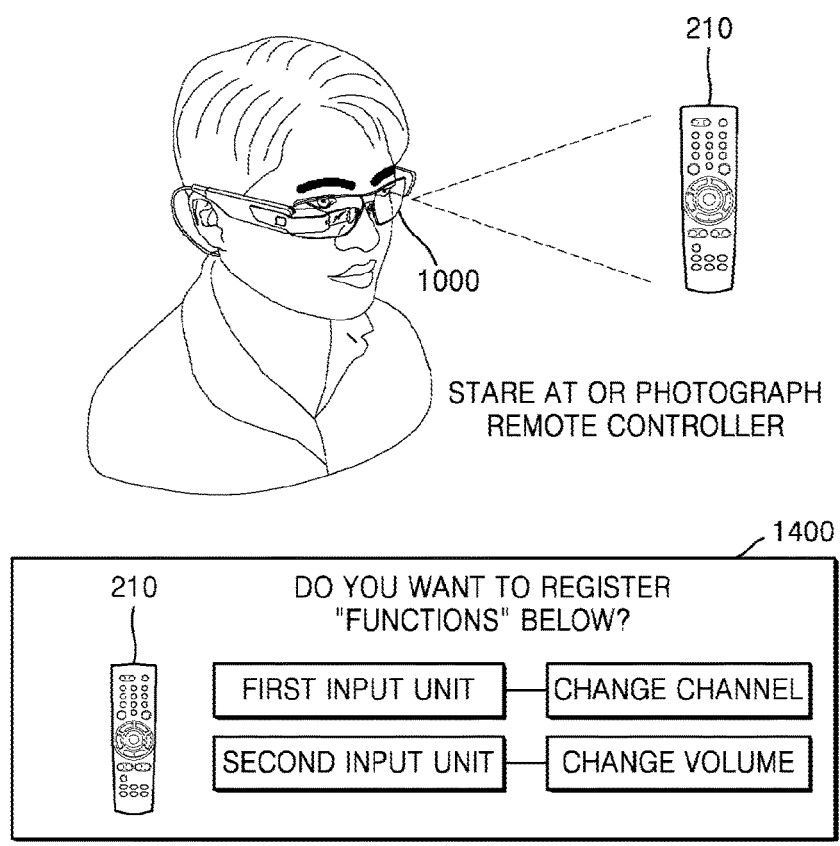
FIG. 32 a diagram illustrating an operation in which the mobile device registers a control function, according to an embodiment of the present disclosure.

FIG. 32 is a diagram illustrating an operation in which the mobile device registers a control function, according to an embodiment of the present disclosure. Referring to FIG. 32, the mobile device 1000 registers a control function corresponding to an input unit.

The mobile device 1000 registers a control function for controlling an electronic device. If an electronic device may be controlled by using an input unit, the mobile device 1000 may map an input unit to a control function. Therefore, when the mobile device 1000 controls an electronic device, the mobile device 1000 changes a default function of an input unit to the mapped control function for controlling the electronic device.

For example, a first input unit of the mobile device 1000 may be mapped to a channel changing function of the remote controller 210, whereas a second input unit of the mobile device 1000 may be mapped to a volume changing function of the remote controller 210.

Figure 33:
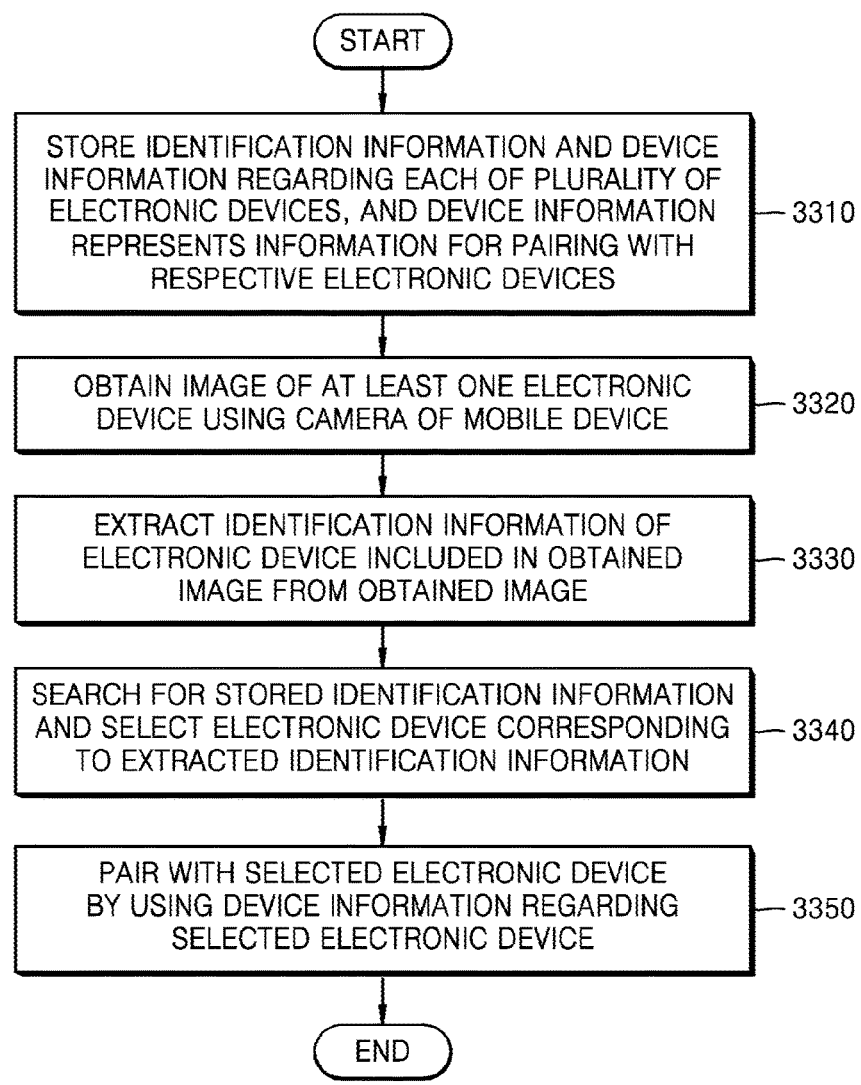
FIG. 33 a diagram illustrating an operation in which the mobile device pairs with an electronic device, according to an embodiment of the present disclosure.

FIG. 33 a diagram illustrating an operation in which the mobile device pairs with an electronic device, according to an embodiment of the present disclosure. Referring to FIG. 33, the mobile device 1000 may pair with an electronic device included in an image obtained via the camera 1200.

In operation 3310, the mobile device 1000 stores identification information regarding a plurality of electronic devices and device information to pair with the respective electronic devices. The mobile device 1000 stores identification information and device information regarding controllable electronic devices. The mobile device 1000 may obtain an image of an electronic device and extract features of the electronic device from the obtained image. The mobile device 1000 may store the extracted features of the electronic device as identification information.

In another embodiment, the mobile device 1000 may store features of electronic devices of the same type. The mobile device 1000 may extract and store features of the remote controllers 210 or the TVs 240 of various types. The mobile device 1000 may receive data including features of electronic devices via a network and store the data in a memory.

In operation 3320, the mobile device 1000 obtains an image of at least one electronic device via the camera 1200. The mobile device 1000 may obtain an image by using the camera 1200 and obtain an image of an electronic device included in the obtained image. The mobile device 1000 may analyze an image input via the camera 1200 and determine whether the image includes an electronic device.

In operation 3330, the mobile device 1000 extracts identification information regarding an electronic device included in a obtained image. In operation 3340, the mobile device 1000 searches for stored identification information and selects an electronic device corresponding to the extracted identification information. If identification information corresponding to the extracted identification information exists in a memory, the mobile device 1000 selects an electronic device corresponding to the extracted identification information as an electronic device to pair with. For example, if the extracted identification information corresponds to identification information regarding the TV 240, the mobile device 1000 selects the TV 240 as an electronic device to pair with.

In operation 3350, the mobile device 1000 pairs with the selected electronic device by using stored device information regarding the selected electronic device.

Figure 34:
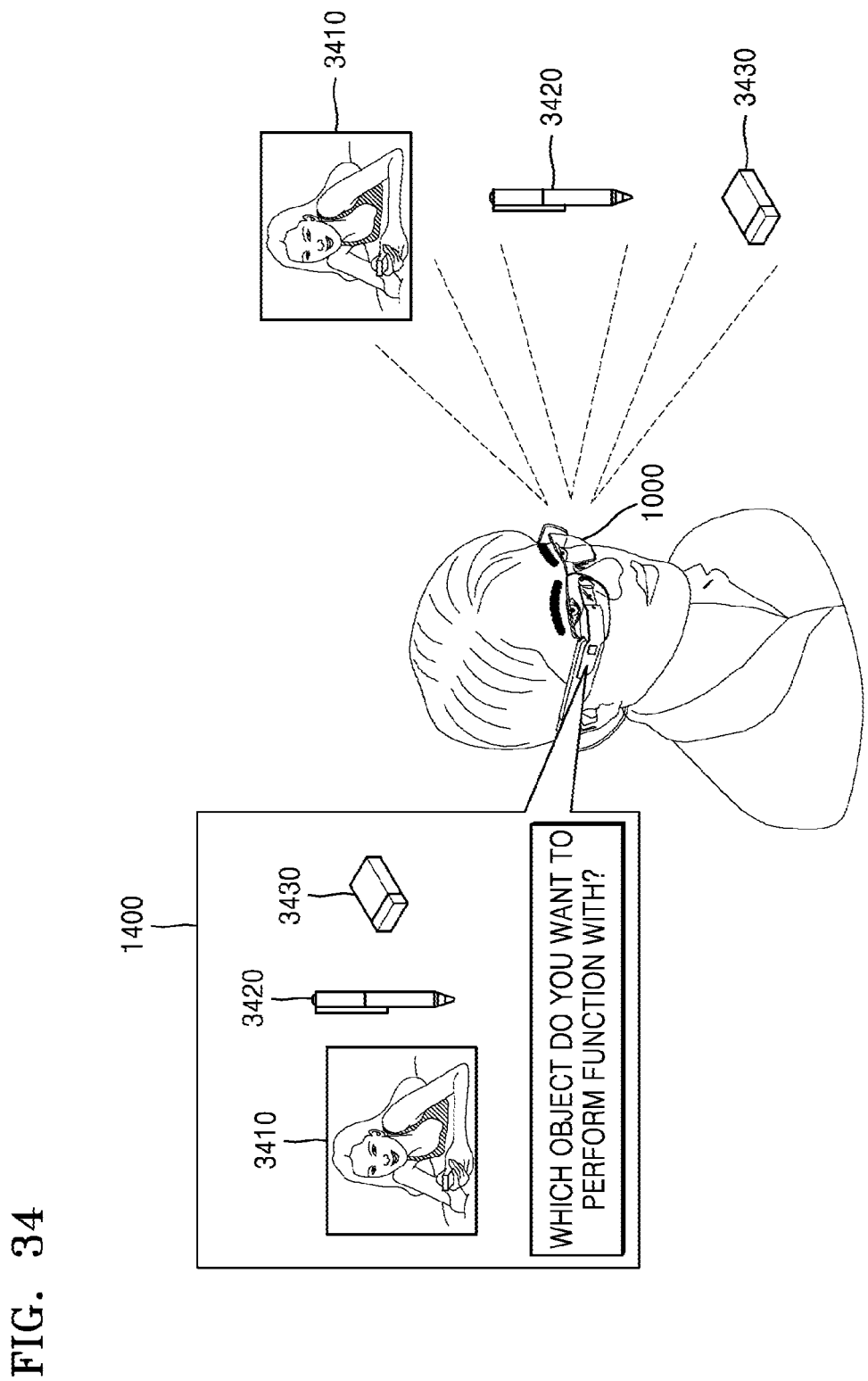
FIG. 34 a diagram illustrating an operation in which the mobile device identifies an object and provides related functions, according to an embodiment of the present disclosure.

FIG. 34 a diagram illustrating an operation in which the mobile device identifies an object and provides related functions, according to an embodiment of the present disclosure. Referring to FIG. 34, the mobile device 1000 may identify a person 3410, a pen 3420, and an eraser 3430 and provide functions related to identified objects.

The mobile device 1000 may analyze an input image and identify objects included in the image. The image may include a plurality of objects. The mobile device 1000 may extract features of a plurality of objects and identify types of the objects based on the extracted features. For example, the mobile device 1000 may determine whether an object is the person 3410, the pen 3420, or the eraser 3430.

The mobile device 1000 determines whether an object identical to an identified object is registered. The mobile device 1000 compares features of an identified object to features of pre-stored objects and searches for an object having features that match those of the identified object.

The mobile device 1000 provides a functions set with respect to an identified object. The mobile device 1000 may set functions with respect to respective objects in advance. For example, the mobile device 1000 may set a phone call function or a messenger execution function when the mobile device identifies the person 3410.

The mobile device 1000 may assign functions to an element based on the type of the element. For example, the mobile device 1000 may assign a 'notebook' function to the pen 3420. The mobile device 1000 may assign an 'erase' function to the eraser 3430.

When a plurality of objects is identified, the mobile device 1000 may receive an input from a user for selecting a function. The mobile device 1000 may display identified objects, receive an input from a user, and select one of the objects.

The mobile device 1000 provides a function related to an identified object. For example, if an identified object is the particular person 3410, the mobile device 1000 may make a phone call to the person 3410. Alternatively, if an identified object is the pen 3420, the mobile device 1000 may execute the 'notebook' function.

Figure 35:
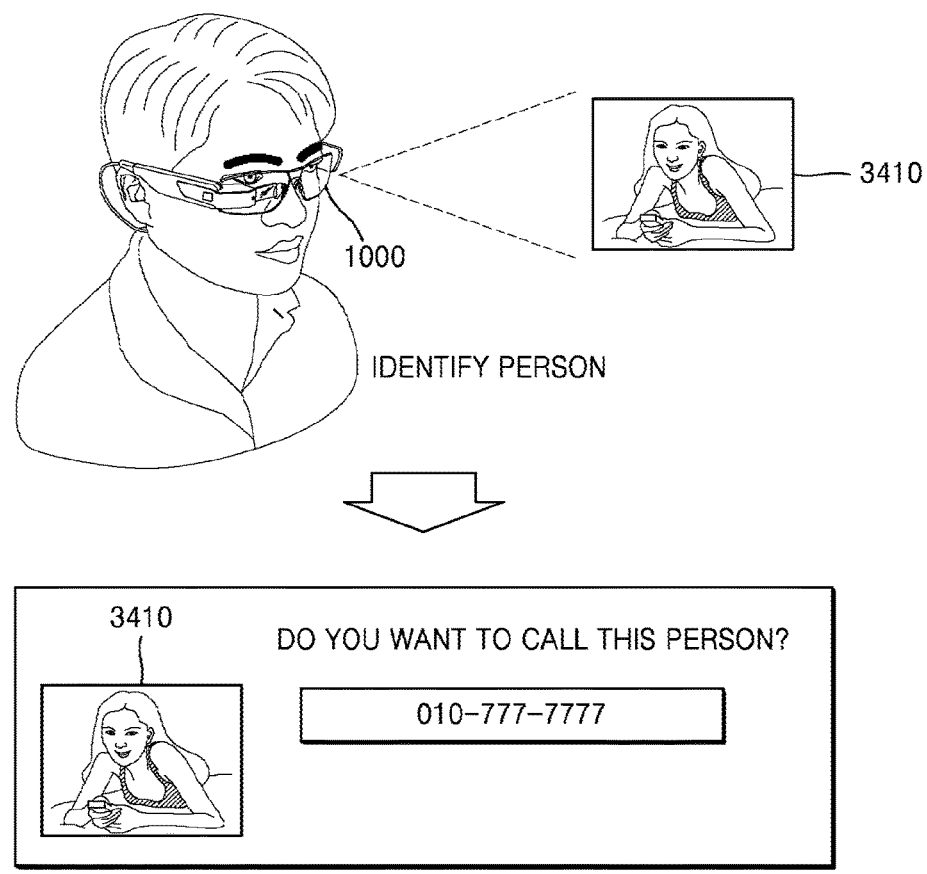
FIG. 35 a diagram illustrating an operation in which the mobile device makes a phone call to an identified person, according to an embodiment of the present disclosure.

FIG. 35 is a diagram illustrating an operation in which the mobile device makes a phone call to an identified person, according to an embodiment of the present disclosure. Referring to FIG. 35, the mobile device 1000 identifies the person 3410 and makes a phone call to the identified person 3410 using a registered phone number.

The mobile device 1000 identifies the person 3410 included in an image obtained via the camera 1200. The mobile device 1000 determines whether the identified person 3410 is a registered person. If the identified person 3410 is a registered person, the mobile device 1000 executes a function registered with respect to the registered person. In FIG. 35, the function registered with respect to the person 3410 is 'phone call' function. A phone number registered in the mobile device 1000 with respect to the person 3410 is 010-777-7777. Therefore, the mobile device 1000 makes a phone call using the phone number 010-777-7777.

Figure 36:
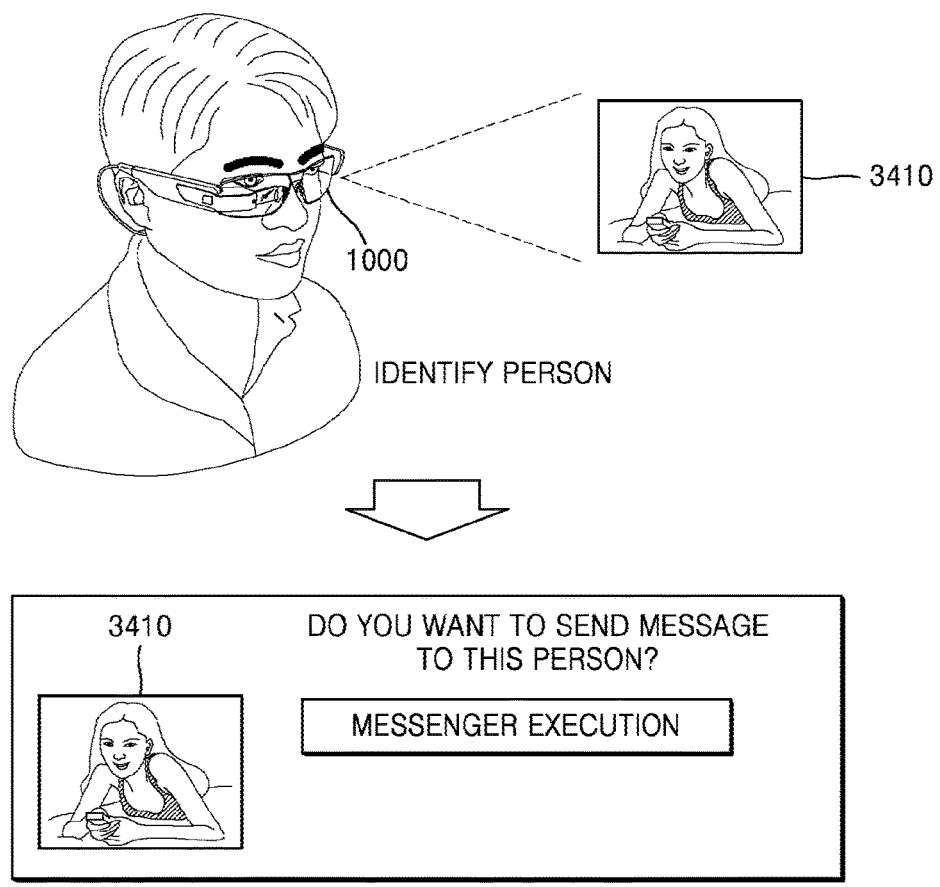
FIG. 36 a diagram illustrating an operation in which the mobile device sends a message to an identified person, according to an embodiment of the present disclosure.

FIG. 36 a diagram illustrating an operation in which the mobile device sends a message to an identified person, according to an embodiment of the present disclosure. Referring to FIG. 36, the mobile device 1000 identifies the person 3410 and transmits a message to the identified person 3410.

The mobile device 1000 identifies the person 3410 included in an image obtained via the camera 1200. The mobile device 1000 determines whether the identified person 3410 is a registered person. If the identified person 3410 is a registered person, the mobile device 1000 executes a function registered with respect to the registered person. In FIG. 36, the function registered with respect to the person 3410 is 'messenger execution' function. The mobile device 1000 executes a messenger function with respect to the person 3410 and displays a screen image for sending a message to the person 3410. Alternatively, the mobile device 1000 may display a screen image for sending a text message to the person 3410.

Figure 37:
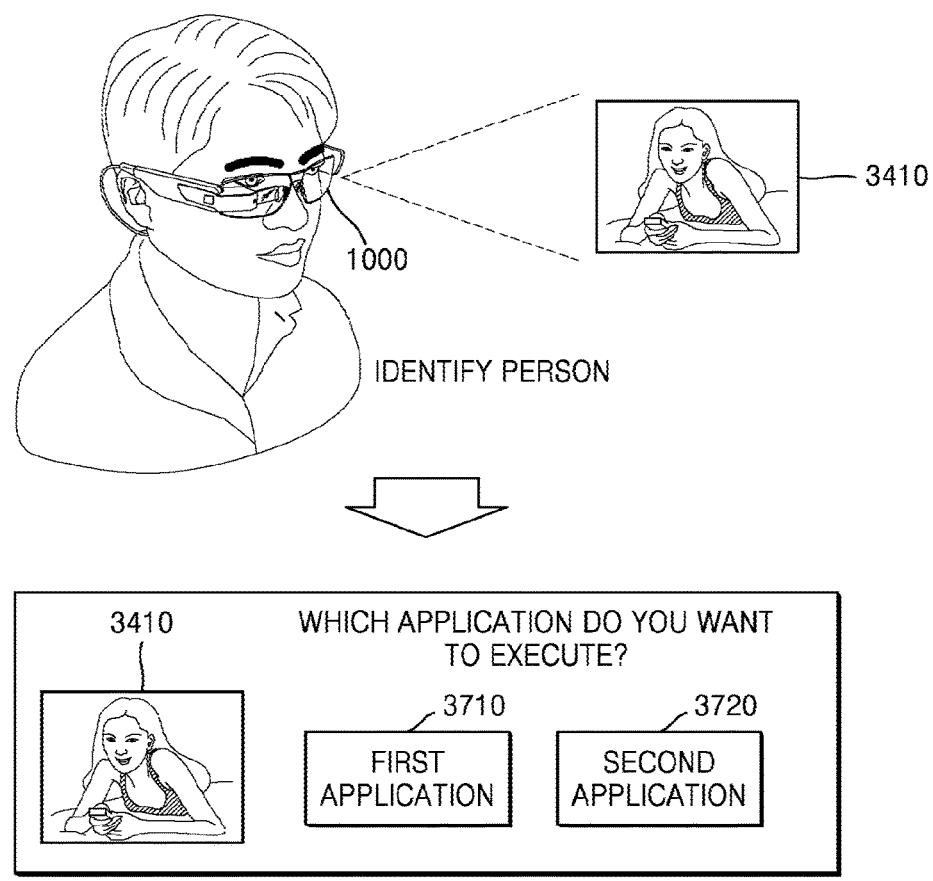
FIG. 37 is a diagram illustrating an operation in which the mobile device executes an application corresponding to an identified person, according to an embodiment of the present disclosure.

FIG. 37 is a diagram illustrating an operation in which the mobile device executes an application corresponding to an identified person, according to an embodiment of the present disclosure. Referring to FIG. 37, the mobile device 1000 identifies the person 3410 and executes applications 3710 and 3720 corresponding to the identified person 3410.

The mobile device 1000 identifies the person 3410 included in an image obtained via the camera 1200. The mobile device 1000 determines whether the identified person 3410 is a registered person. If the identified person 3410 is a registered person, the mobile device 1000 executes a function registered with respect to the registered person. In FIG. 37, the function registered with respect to the person 3410 is an 'application execution' function. The mobile device 1000 executes an application registered with respect to the person 3410. If a plurality of applications 3710 and 3720 are registered with respect to the single person 3410, the mobile device 1000 may display first and second applications 3710 and 3720 as shown in FIG. 37.

If a plurality of applications 3710 and 3720 are registered, the mobile device 1000 may receive an input from a user selecting an application to execute first. The mobile device 1000 may display the registered applications 3710 and 3720, receive an input from a user, and select one of the applications 3710 and 3720.

Figure 38:
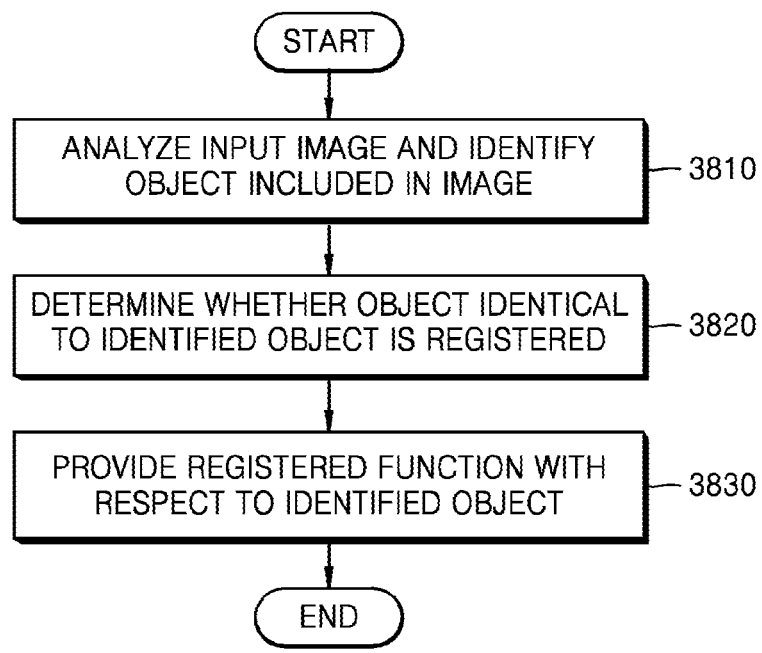
FIG. 38 is a diagram illustrating a method in which the mobile device performs a function registered with respect to an identified object, according to an embodiment of the present disclosure.

FIG. 38 is a diagram illustrating a method in which the mobile device performs a function registered with respect to an identified object, according to an embodiment of the present disclosure. Referring to FIG. 38, the mobile device 1000 may identify an object and provide a function registered with respect to the identified object.

In operation 3810, the mobile device 1000 analyzes an input image and identifies one or more objects included in the image. The image may include a plurality of objects. The mobile device 1000 may extract features of a plurality of objects and identify the types of objects based on the extracted features.

In operation 3820, the mobile device 1000 determines whether an object identical to an identified object is registered. The mobile device 1000 compares features of an identified object to features of objects that are stored in advance and searches for an object having matching features.

In operation 3830, the mobile device 1000 provides a functions set with respect to an identified object. The mobile device 1000 may set functions with respect to respective objects in advance. For example, the mobile device 1000 may set a 'phone call' function or a 'messenger execution' function with respect to the person 3410.

The mobile device 1000 may provide functions related to things. For example, the mobile device 1000 may register 'notebook' function with respect to the pen 3420. The mobile device 1000 may register 'erase' function with respect to the eraser 3430.

When a plurality of objects is identified, the mobile device 1000 may receive an input from a user selecting an object to execute a function. The mobile device 1000 may display identified objects, receive an input from a user, and select one of the objects.

The mobile device 1000 provides a function related to an identified object. For example, if an identified object is the particular person 3410, the mobile device 1000 may make a phone call to the person 3410. Alternatively, if an identified object is the pen 3420, the mobile device 1000 may execute the 'notebook' function.

Figure 39:
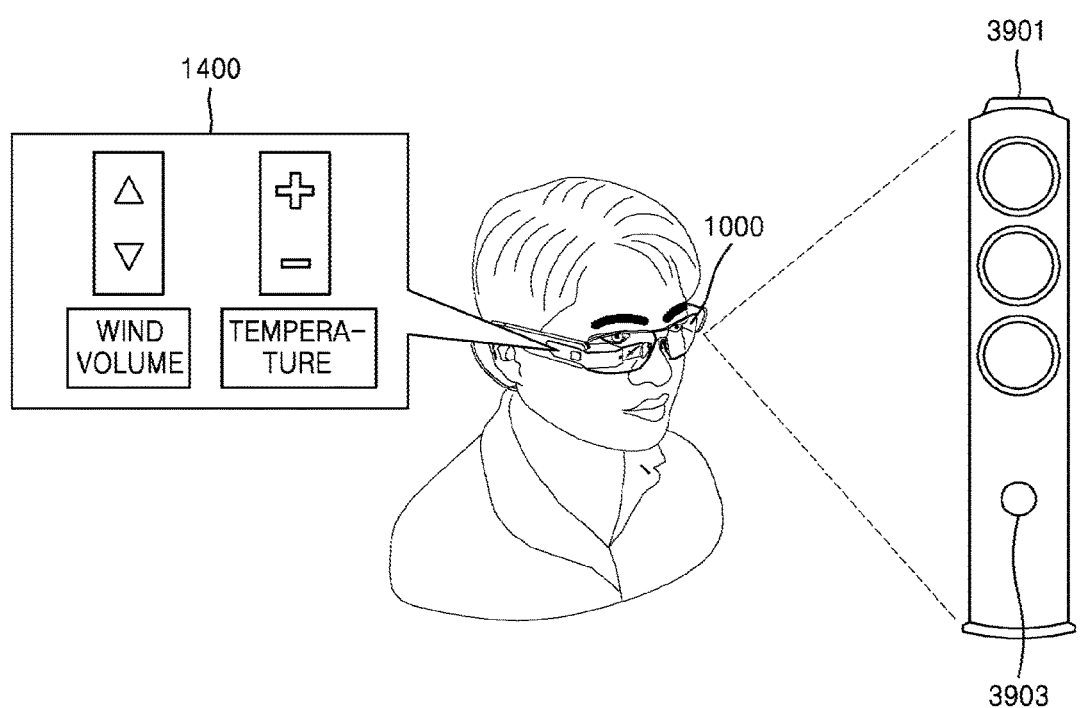
FIG. 39 is a diagram illustrating a method in which the mobile device controls a legacy device, according to an embodiment of the present disclosure.

FIG. 39 is a diagram illustrating a method in which the mobile device controls a legacy device, according to an embodiment of the present disclosure. Referring to FIG. 39, the mobile device 1000 may pair with a patch 3903, and control a legacy device 3901 via the patch 3903. The legacy device 3901 is an old type of electronic device without a communication function, and is unable to be directly connected to the mobile device 1000. For example, the legacy device 3901 may be an air conditioner with infrared-ray (IR) communication function.

The patch 3903 is an electronic device attached to the legacy device 3901 and may function as a communication relay device. The patch 3903 may communicate with the mobile device 1000 via a first type of communication method, and may communicate with the legacy device 3901 via a second type of communication method. For example, the patch 3903 may communicate with the mobile device 1000 via Wi-Fi and may communicate with the legacy device 3901 via the IR communication method.

If the patch 3903 is paired with the mobile device 1000, the display unit 1400 of the mobile device 1000 displays a screen image for controlling the legacy device 3901.

Control data for controlling the legacy device 3901 may be stored in the patch 3903. The control data may be received from the mobile device 1000. An operation for the mobile device 1000 to obtain control data for controlling the legacy device 3901 is identical to the operation for the mobile device 1000 to identify an electronic device.

If an identified electronic device is determined as the legacy device 3901, the mobile device 1000 may transmit control data for controlling the legacy device 3901 to the patch 3903 attached to the legacy device 3901. The mobile device 1000 may display a screen image for controlling the legacy device 3901.

FIG. 39 is a diagram showing a case in which the display unit 1400 displays a fan speed and the temperature of the legacy device 3901. A user may control the legacy device 3901 by using virtual buttons displayed at the display unit of the mobile device 1000.

For example, the mobile device 1000 controls the patch 3903. The mobile device 1000 may receive a user input for changing the fan speed or a user input for changing the temperature, and may transmit control data to the patch 3903 based on the received input. The patch 3903 controls an air conditioner.

Figure 40:
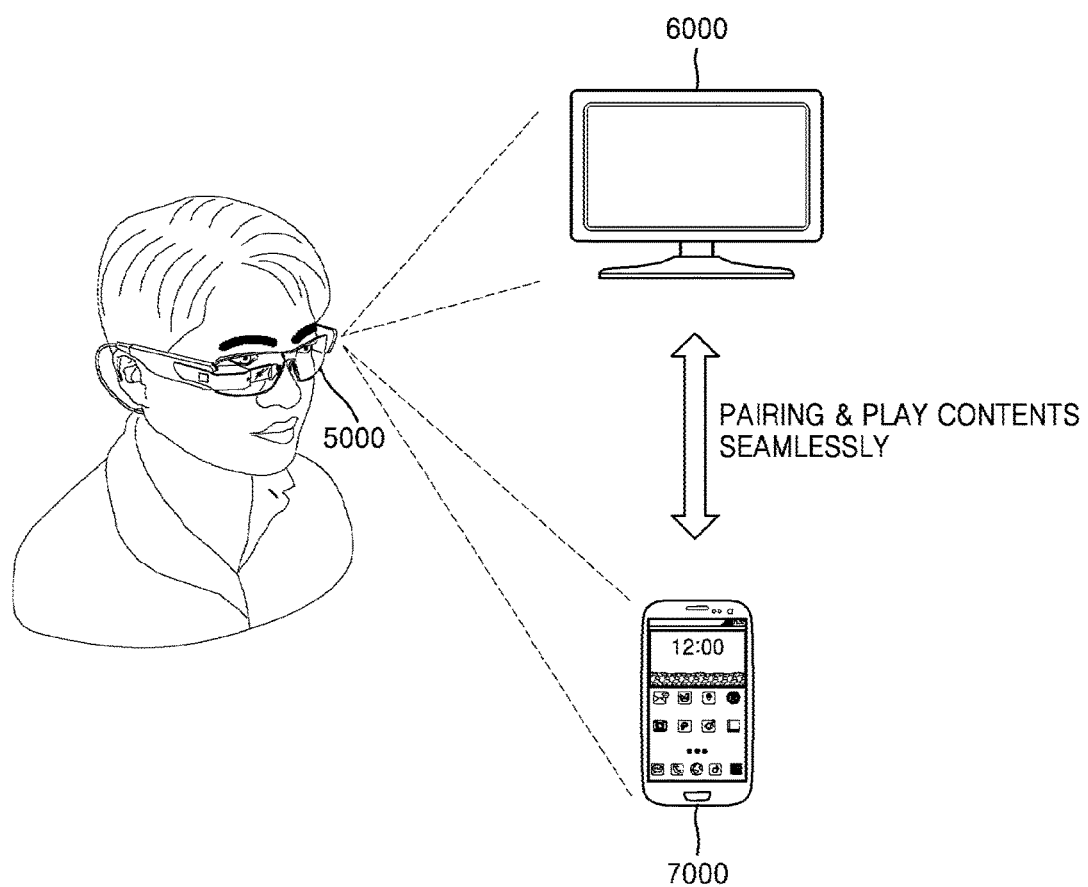
FIG. 40 is a diagram illustrating a method in which glasses control electronic devices, according to an embodiment of the present disclosure.

FIG. 40 is a diagram illustrating a method in which glasses control electronic devices, according to an embodiment of the present disclosure. Referring to FIG. 40, glasses 5000 may control a TV 6000 and a smart phone 7000 to pair with each other. Furthermore, the smart phone 7000 may seamlessly play the same content, which a user is viewing via the TV 6000.

The glasses 5000 may track eyes of a user and determine electronic devices to pair with each other. For example, if the glasses 5000 detect that a user looks at the TV 6000 and then at the smart phone 7000, the glasses 5000 may control the TV 6000 and the smart phone 7000 to pair with each other. When the TV 6000 and the smart phone 7000 pair with each other, the TV 6000 and the smart phone 7000 are connected to each other via a wire or wirelessly and transmit and receive data to and from each other.

The glasses 5000 may track eyeballs of a user or detect changes in the pupils. Therefore, the glasses 5000 may detect that a user is staring in a particular direction and determine electronic devices located in the particular direction as electronic devices to pair with each other.

The glasses 5000 may identify irises of a user. The glasses 5000 may extract feature points of the irises of a user and determine the identity of a user who is wearing the glasses 5000. Furthermore, the glasses 5000 may transmit information regarding identified irises to the TV 6000 and the smart phone 7000 for user authentication. Therefore, only a user registered to the glasses 5000, the TV 6000, and the smart phone 7000 may be authorized to control the glasses 5000, the TV 6000, and the smart phone 7000.

If iris information received from the glasses 5000 is identical to iris information stored in the TV 6000, the TV 6000 may transmit device information regarding the TV 6000 to the glasses 5000. The glasses 5000 may pair with the TV 6000 using the received device information.

If iris information received from the glasses 5000 is identical to iris information stored in the smart phone 7000, the smart phone 7000 may transmit device information regarding the smart phone 7000 to the glasses 5000. The glasses 5000 may pair with the smart phone 7000 using the received device information.

If a user stares at the smart phone 7000 while he or she was watching the TV 6000, the glasses 5000 may control the smart phone 7000 to seamlessly play back content that is being played back at the TV 6000. The glasses 5000 may transmit information regarding the content being played back at the TV 6000 to the smart phone 7000. The smart phone 7000 may receive content from the TV 6000 and play back the content or, if the smart phone 7000 stores content identical to the content being played back at the glasses 5000, the smart phone 7000 may play back the stored content. The smart phone 7000 may receive bookmark information from the TV 6000. Bookmark information is information indicating a point of playback of content played back on the TV 6000. When the smart phone 7000 receives bookmark information from the TV 6000, the smart phone 7000 may determine a point of playback of content based on the bookmark information. Accordingly, the smart phone 7000 may seamlessly play back content that is being played back at the TV 6000.

Figure 41:
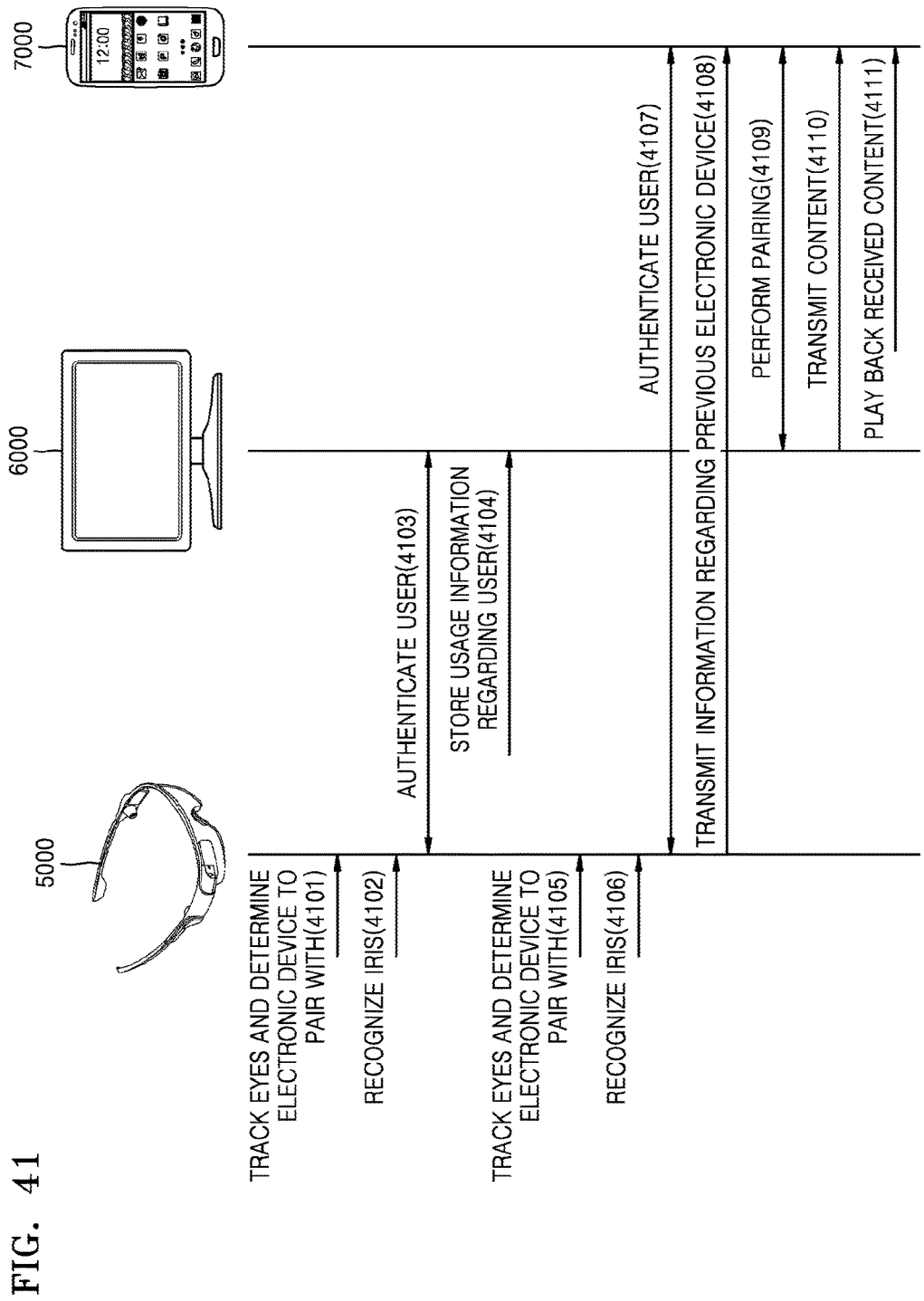
FIG. 41 is a flowchart illustrating a method of seamlessly playing back content, according to an embodiment of the present disclosure.

FIG. 41 is a flowchart illustrating a method in which content is seamlessly played back, according to an embodiment of the present disclosure. Referring to FIG. 41, the smart phone 7000 may seamlessly play back content that is being played at the TV 6000.

In operation 4101, the glasses 5000 track eyes of a user and determine an electronic device to pair with. The glasses 5000 may track a direction viewed by a user and detect a change of size of pupils of the user. The glasses 5000 may determine a direction viewed by a user based on changes in the eyes or pupils of the user. The glasses 5000 may determine an electronic device located in a direction viewed by a user as an electronic device to pair with. FIG. 41 exemplifies a case in which the glasses 5000 determined the TV 6000 as an electronic device to pair with.

In operation 4102, the glasses 5000 identify irises of a user. The glasses 5000 extracts feature points of irises of the user.

In operation 4103, the glasses 5000 perform user authentication via irises of a user. The user authentication is an operation for determining whether a user wearing the glasses 5000 is properly authorized to control the TV 6000. The glasses 5000 transmit the extracted feature points of the irises to the TV 6000, and the TV 6000 performs user authentication by comparing stored feature points of irises to the received feature points of irises. When the user authentication is completed, the glasses 5000 and the TV 6000 may transmit and receive data to and from each other or the glasses 5000 may control the TV 6000.

In operation 4104, the TV 6000 stores usage information regarding a user. The TV 6000 may store information regarding content played back by a user. Information regarding content includes a name of the content, a point of playback of the content, etc. The TV 6000 may store usage information regarding each user. Therefore, if a user of the glasses 5000 is changed, the TV 6000 may store usage information regarding the changed user in a separate memory.

In operation 4105, the glasses 5000 track the eyes of a user and determine an electronic device to pair with. The glasses 5000 may track a direction viewed by a user and detect a change of the size of pupils of the user. FIG. 41 shows a case in which an electronic device which the glasses 5000 are facing changes from the TV 6000 to the smart phone 7000. Since a user of the glasses 5000 is staring at the smart phone 7000, the glasses 5000 determine that the smart phone 7000 is an electronic device to pair with.

In operation 4106, the glasses 5000 identify irises of a user. The glasses 5000 extracts feature points of irises of the user.

In operation 4107, the glasses 5000 perform user authentication via irises of a user. The user authentication is an operation for determining whether a user wearing the glasses 5000 is properly authorized to control the smart phone 7000. The glasses 5000 transmit the extracted feature points of irises to the smart phone 7000, and the smart phone 7000 performs user authentication by comparing stored feature points of irises to the received feature points of irises. When the user authentication is completed, the glasses 5000 and the smart phone 7000 may transmit and receive data to and from each other or the glasses 5000 may control the smart phone 7000.

In operation 4108, the glasses 5000 transmit information regarding a previous electronic device to the smart phone 7000. The previous electronic device may be an electronic device that has been most recently paired with the glasses 5000. Information regarding a previous electronic device may include information identifying what the previous electronic device was, information for pairing with the previous electronic device, and/or information regarding content being played back by the previous electronic device. In FIG. 41, the previous electronic device is the TV 6000. Therefore, the glasses 5000 transmit information regarding the TV 6000 to the smart phone 7000.

In operation 4109, the smart phone 7000 pairs with the TV 6000. The smart phone 7000 may pair with the TV 6000 based on information regarding the TV 6000 that is received from the glasses 5000. The smart phone 7000 requests the TV 6000 to transmit content.

In operation 4110, the TV 6000 transmits content that is being played back or content that is most recently played back to the smart phone 7000. Furthermore, the TV 6000 may transmit bookmark information indicating a point of playback of the content to the smart phone 7000 together with the content.

In operation 4111, the smart phone 7000 plays back received content. The smart phone 7000 may determine a point of playback of content based on bookmark information. The smart phone 7000 plays back content based on a point of playback. Therefore, the smart phone 7000 may seamlessly play back content that is being played back at the TV 6000.

Figure 42:
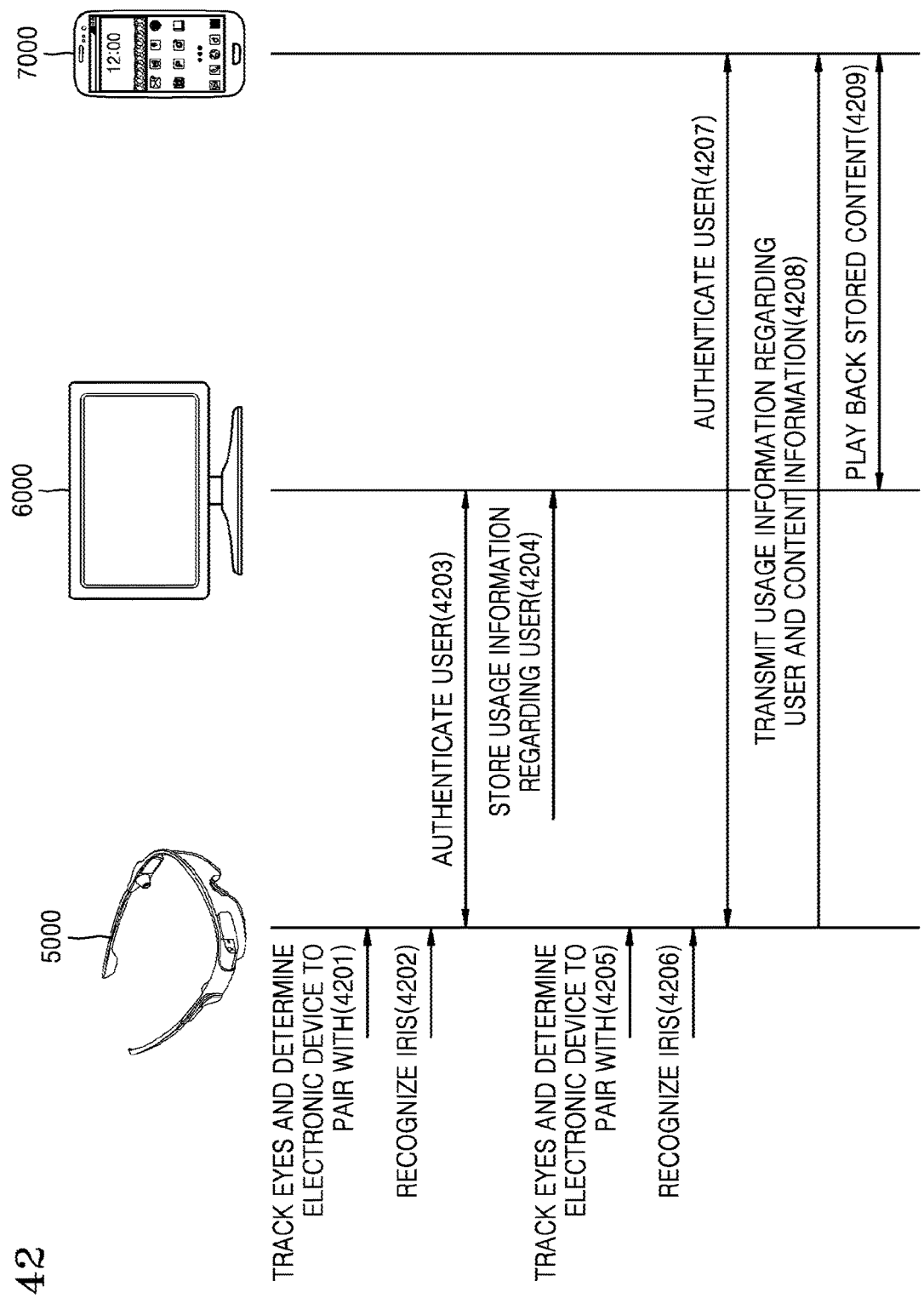
FIG. 42 is a flowchart illustrating a method of seamlessly playing back content, according to an embodiment of the present disclosure.

FIG. 42 is a flow chart illustrating a method of seamlessly playing back content, according to an embodiment of the present disclosure. FIG. 42 is a diagram for describing a method in which the smart phone 7000 plays back content if the smart phone 7000 stores the content. Since the smart phone 7000 stores content, it is not necessary for the smart phone 7000 to receive content from the TV 6000, and the smart phone 7000 may play back content based on information regarding the content.

Operations 4101 through 4107 of FIG. 41 described above are substantially identical to operations 4201 through 4207 of FIG. 42.

In operation 4208, the glasses 5000 transmit usage information regarding a user and information regarding content to the smart phone 7000. Since content that is being played back at the TV 6000 is also stored in the smart phone 7000, it is not necessary for the glasses 5000 to transmit the content that is being played back at the TV 6000 to the smart phone 7000. Therefore, the glasses 5000 transmit content information indicating what content is being played back and a point of playback of the content to the smart phone 7000.

In operation 4209, the smart phone 7000 plays back stored content. The smart phone 7000 plays back content based on a point of playback of the content. Therefore, the smart phone 7000 may seamlessly play back content that is being played back at the TV 6000.

Figure 43:
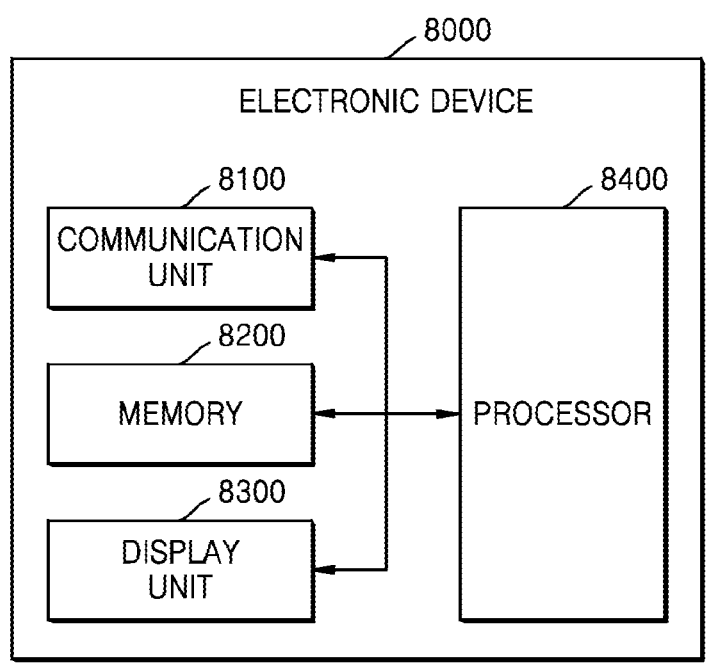
FIG. 43 is a diagram illustrating an electronic device, according to an embodiment of the present disclosure.

FIG. 43 is a diagram illustrating an electronic device, according to an embodiment of the present disclosure. Referring to FIG. 43, an electronic device 8000 includes a communication unit 8100, a memory 8200, a display unit 8300, and a processor 8400.

The communication unit 8100 receives iris information regarding a user wearing the glasses 5000 from the glasses 5000, and receives device information regarding a previous electronic device used by the user from the glasses 5000. For example, iris information may be information regarding feature points extracted from irises of the user.

The communication unit 8100 receives content and bookmark information regarding the content from the previous electronic device. The content may be a media file, such as a music file, a video file, a text file, an image file, etc.

The memory 8200 stores iris information regarding at least one user.

The processor 8400 identifies a user wearing the glasses 5000 by comparing received iris information to stored iris information and pairs with a previous electronic device by using device information regarding the previous electronic device. The received iris information refers to information regarding irises of a user wearing the glasses 5000, and the stored iris information refers to iris information of users stored in the memory 8200 of the electronic device 8000. The processor 8400 determines a similarity between the received iris information and the stored iris information and, if the similarity is greater than or equal to a set critical value, the processor 8400 determines that the received iris information is identical to the stored iris information. The processor 8400 may pair with the glasses 5000 or another electronic device only if the received iris information is identical to the stored iris information.

The processor 8400 determines a point of playback of content based on bookmark information and controls the display unit 8300 to play back the content from the point of playback. The bookmark information indicates a point of playback of content. The processor 8400 distinguishes bookmark information associated with different users and determines a point of playback of content by using bookmark information regarding an authenticated user.

The processor 8400 determines a point of playback of content stored in the memory 8200 based on bookmark information and controls the display unit 8300 to play back the content.

According to the control of the processor 8400, the display unit 8300 plays back content that is being played back at a previous electronic device.

Figure 44:
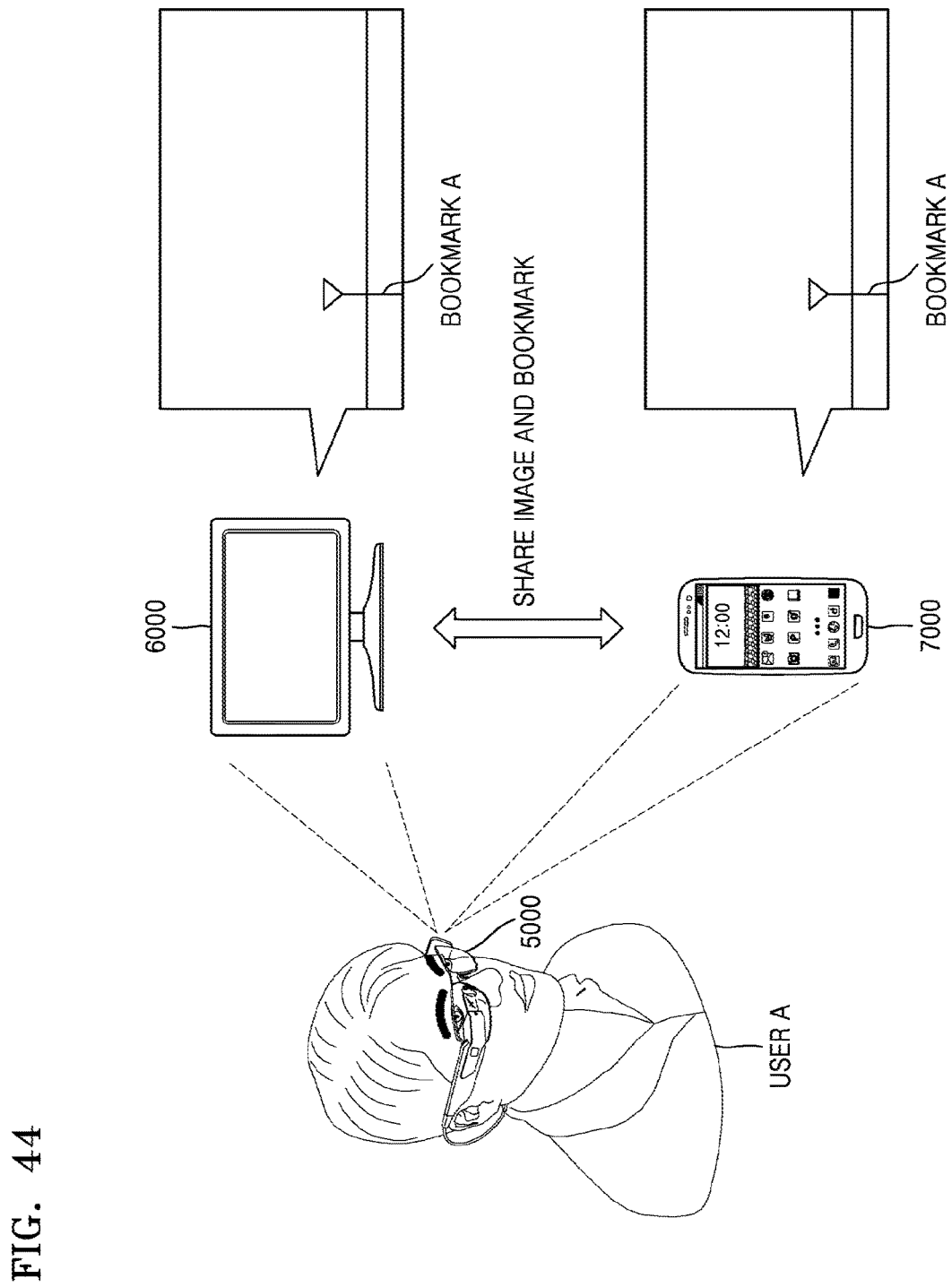
FIG. 44 is a diagram illustrating a seamless playback method, according to an embodiment of the present disclosure.

FIG. 44 is a diagram illustrating a seamless playback method, according to an embodiment of the present disclosure. Referring to FIG. 44, the TV 6000 and the smart phone 7000 may seamlessly playback content.

The glasses 5000 may track eyes of a user and determine an electronic device that the user is staring at and, based on eye movement of the user, the glasses 5000 determine an electronic device that the user is staring at again. For example, if a user stares at a second electronic device while the user is watching content via a first electronic device, the second electronic device seamlessly plays back the content that is being played back at the first electronic device.

FIG. 44 is a diagram for describing a method in which the smart phone 7000 seamlessly plays back a video being played back at the TV 6000 when a user A stares at the smart phone 7000 while the user A is watching the video via the TV 6000. The TV 6000 plays back the video and stores a bookmark A regarding the user A. As the video is being played back, the bookmark A is updated. If the user A stares at the smart phone 7000, the glasses 5000 track eyes of the user A and determines an electronic device that the user A is staring at. The glasses 5000 control the smart phone 7000 to seamlessly play back a video that is being played back at the TV 6000. The smart phone 7000 receives information regarding the video from the glasses 5000 and the TV 6000. The smart phone 7000 plays back the video based on the received information from a point corresponding to the bookmark A. The bookmark A is received from the TV 6000 or the glasses 5000. Therefore, the smart phone 7000 may play back the video from a point corresponding to the bookmark A, and thus, the user A may seamlessly watch the video that is being played back on the TV 6000 via the smart phone 7000.

Figure 45:
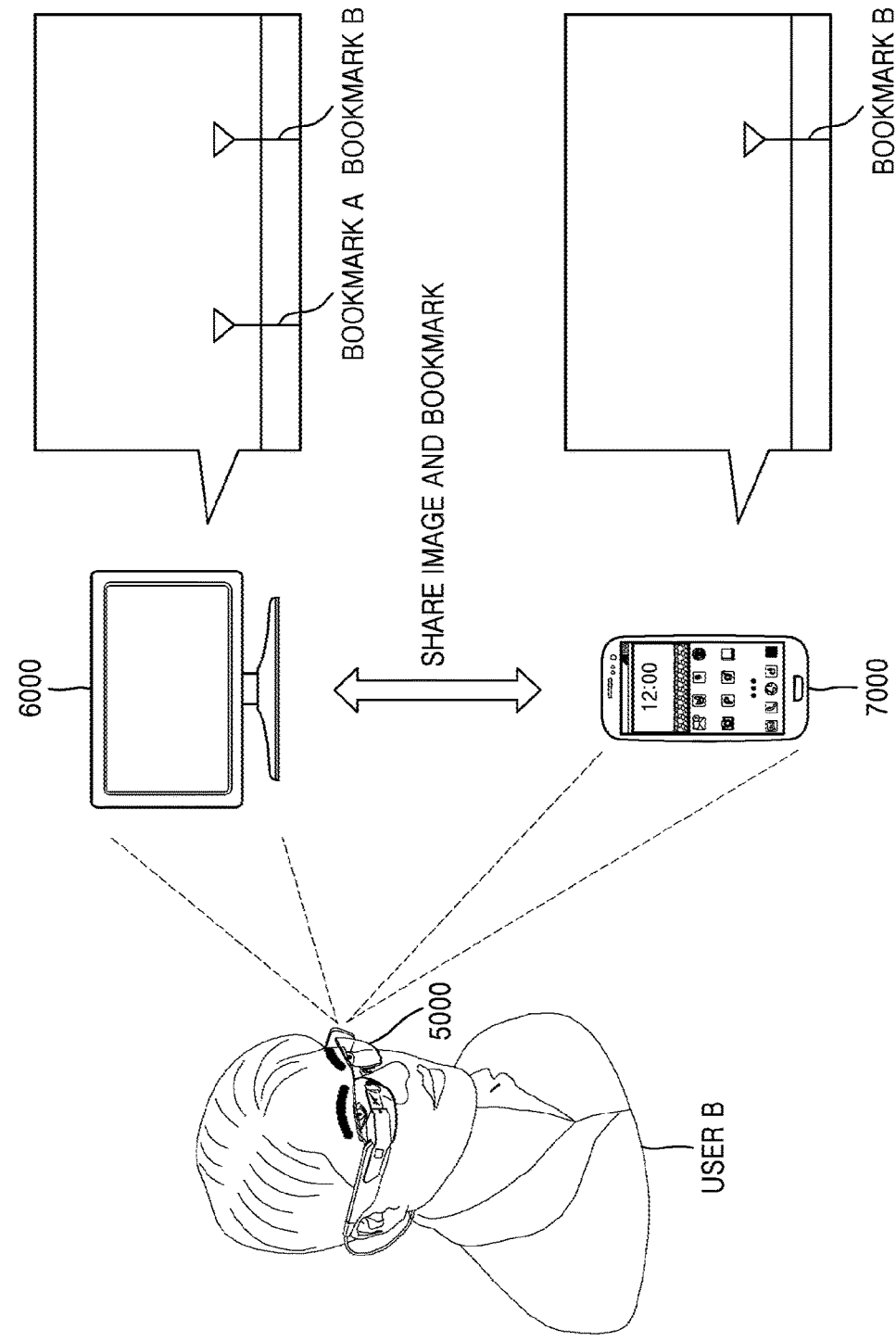
FIG. 45 is a diagram illustrating an embodiment for utilizing user-customized bookmark information if there are a plurality of users, according to an embodiment of the present disclosure.

FIG. 45 is a diagram illustrating an embodiment for utilizing user-customized bookmark information if there is a plurality of users, according to an embodiment of the present disclosure. Referring to FIG. 45, if a user B is wearing the glasses 5000, the TV 6000 stores and updates bookmark B regarding the user B. If the smart phone 7000 seamlessly plays back a video, the smart phone 7000 requests a bookmark and a video regarding the user B to the TV 6000. The TV 6000 transmits a bookmark B to the smart phone 7000. The smart phone 7000 plays back the video based on the received bookmark B. Therefore, the smart phone 7000 may seamlessly play back the video being watched by the user B.

Figure 46:
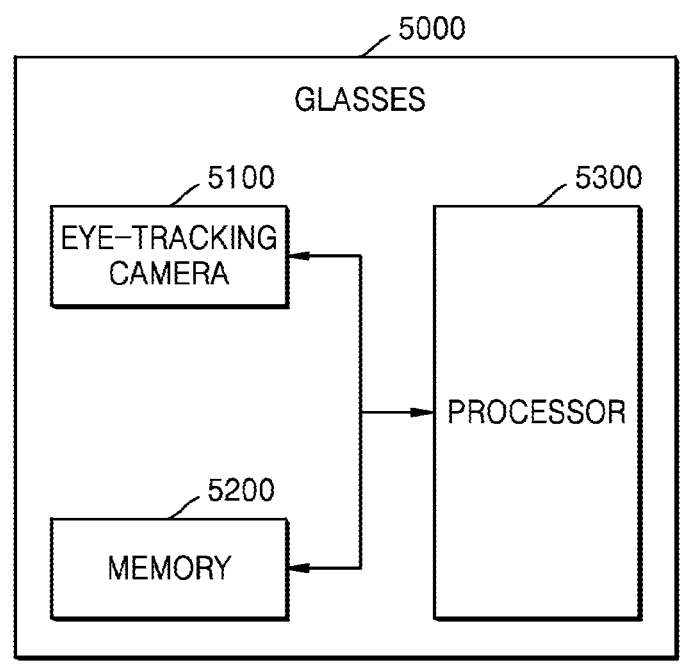
FIG. 46 is a diagram illustrating glasses, according to an embodiment of the present disclosure.

FIG. 46 is a diagram illustrating glasses 5000, according to an embodiment of the present disclosure. Referring to FIG. 46, the glasses 5000 include an eye-tracking camera 5100, a memory 5200, and a processor 5300.

The eye-tracking camera 5100 obtains an image of eyes of a user wearing the glasses 5000. The eye-tracking camera 5100 transmits the obtained image to the processor 5300.

The memory 5200 stores device information regarding at least one device.

The processor 5300 tracks eyes of the user via the obtained image and extracts feature points of irises. The processor 5300 may analyze the obtained image and detect a change of the pupils of the user. Furthermore, the processor 5300 may analyze the obtained image and extract feature points of the irises.

The processor 5300 determines a first electronic device and a second electronic device to pair with based on the eyes of the user. The first electronic device is an electronic device that is playing back content under the control of the glasses 5000, whereas the second electronic device is an electronic device to seamlessly play back the content being played back at the first electronic device. In other words, the first electronic device and the second electronic device are electronic devices that the user wearing the glasses 5000 stares at, in turn.

The processor 5300 performs user authentication with the first and second electronic devices by using feature points of irises of the user wearing the glasses 5000. The processor 5300 performs iris authentication to determine whether the user wearing the glasses 5000 is authorized to control the first and second electronic devices. The processor 5300 may perform iris authentication by transmitting feature points of irises to the first and second electronic devices.

The processor 5300 controls the first and second electronic devices to pair with each other. The processor 5300 controls the first and second electronic devices, such that the second electronic device seamlessly plays back content that is being played back by the first electronic device. The processor 5300 may transmit device information regarding the second electronic device to the first electronic device. Furthermore, the processor 5300 may transmit device information regarding the first electronic device to the second electronic device.

Figure 47:
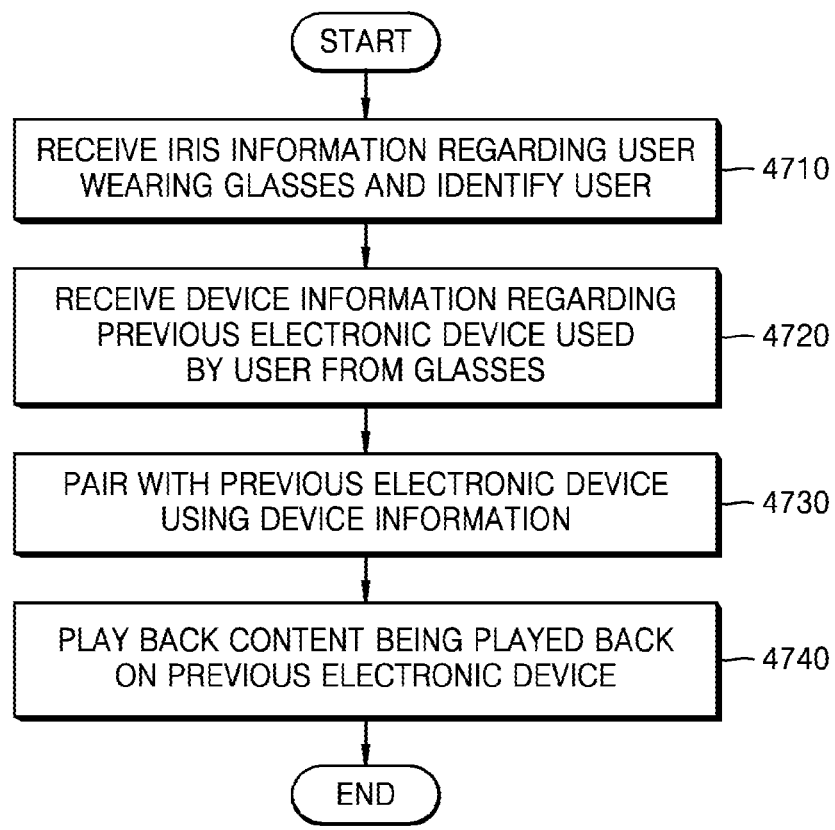
FIG. 47 is a flowchart illustrating a method of seamlessly playing back content, according to an embodiment of the present disclosure.

FIG. 47 is a flowchart illustrating a method of seamlessly playing back content, according to an embodiment of the present disclosure.

In operation 4710, the electronic device 8000 receives iris information regarding a user wearing the glasses 5000 and identifies the user. The electronic device 8000 determines whether the user is authorized to control the glasses 5000, and transmits a result of iris authentication to the glasses 5000.

In operation 4720, the electronic device 8000 receives device information regarding a previous electronic device used by the user from the glasses 5000. If user authentication is successful, the electronic device 8000 may request information regarding a previous electronic device previously controlled by the user, from the glasses 5000.

In operation 4730, the electronic device 8000 pairs with the previous electronic device by using device information regarding the previous electronic device. The electronic device 8000 attempts a connection to the previous electronic device based on device information regarding the previous electronic device.

In operation 4740, the electronic device 8000 plays back content that is being played back at the previous electronic device. The electronic device 8000 may receive the content from the previous electronic device and play back the received content. Alternatively, if content identical to the content that is being played back at the previous electronic device is stored in the electronic device 8000, the electronic device 8000 may play back the stored content.

Figure 48:
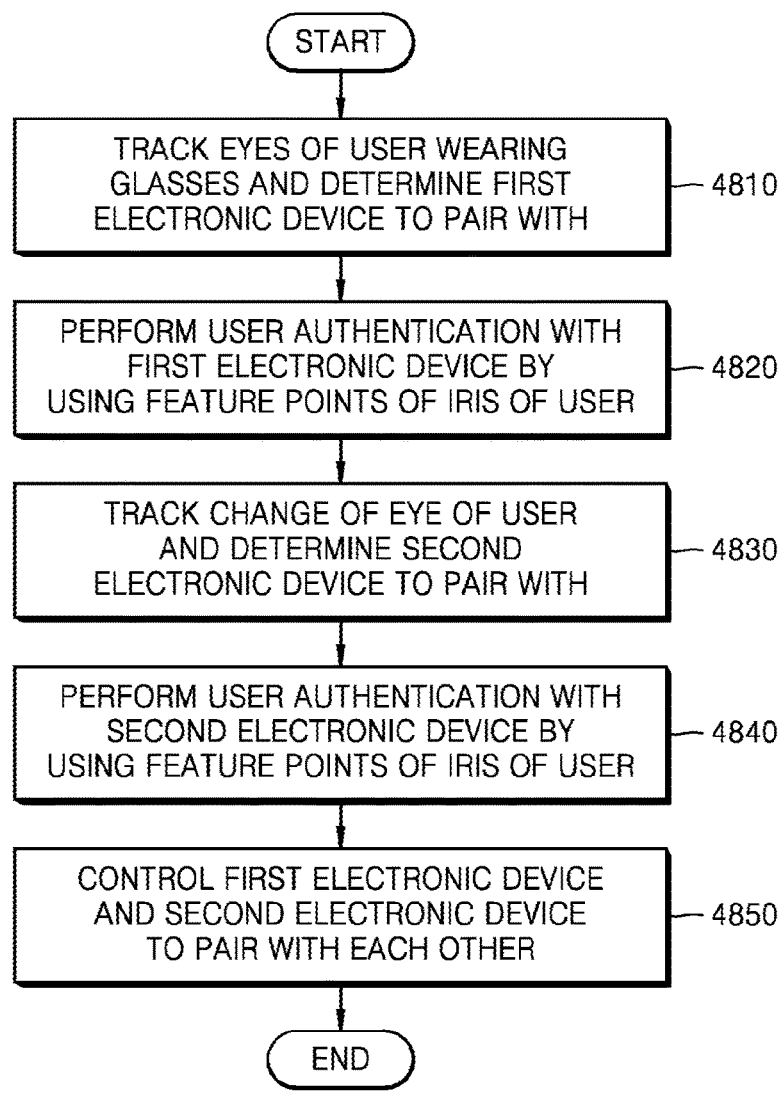
FIG. 48 is a flowchart illustrating a method of paring electronic devices, according to an embodiment of the present disclosure.

FIG. 48 is a flowchart illustrating a method for paring electronic devices, according to an embodiment of the present disclosure.

In operation 4810, the glasses 5000 track the eyes of a user wearing the glasses 5000, and determine a first electronic device to pair with.

In operation 4820, the glasses 5000 perform user authentication with the first electronic device by using feature points of irises of the user. If the user authentication is successful, the glasses 5000 control the first electronic device. For example, the glasses 5000 may control the first electronic device to play back moving pictures or music.

In operation 4830, the glasses 5000 track a change of the eyes of the user and determine a second electronic device to pair with. The second electronic device is an electronic device different from the first electronic device, and may be connected to a same network as the first electronic device.

In operation 4840, the glasses 5000 perform user authentication with the second electronic device by using the feature points of the irises of the user. If the user authentication is successful, the glasses 5000 control the second electronic device.

In operation 4850, the glasses 5000 control the first electronic device and the second electronic device, such that the first electronic device and the second electronic device pair with each other. The glasses 5000 may transmit device information regarding the first electronic device to the second electronic device. The second electronic device may attempt to pair with the first electronic device by using the device information regarding the first electronic device.

Figure 49:
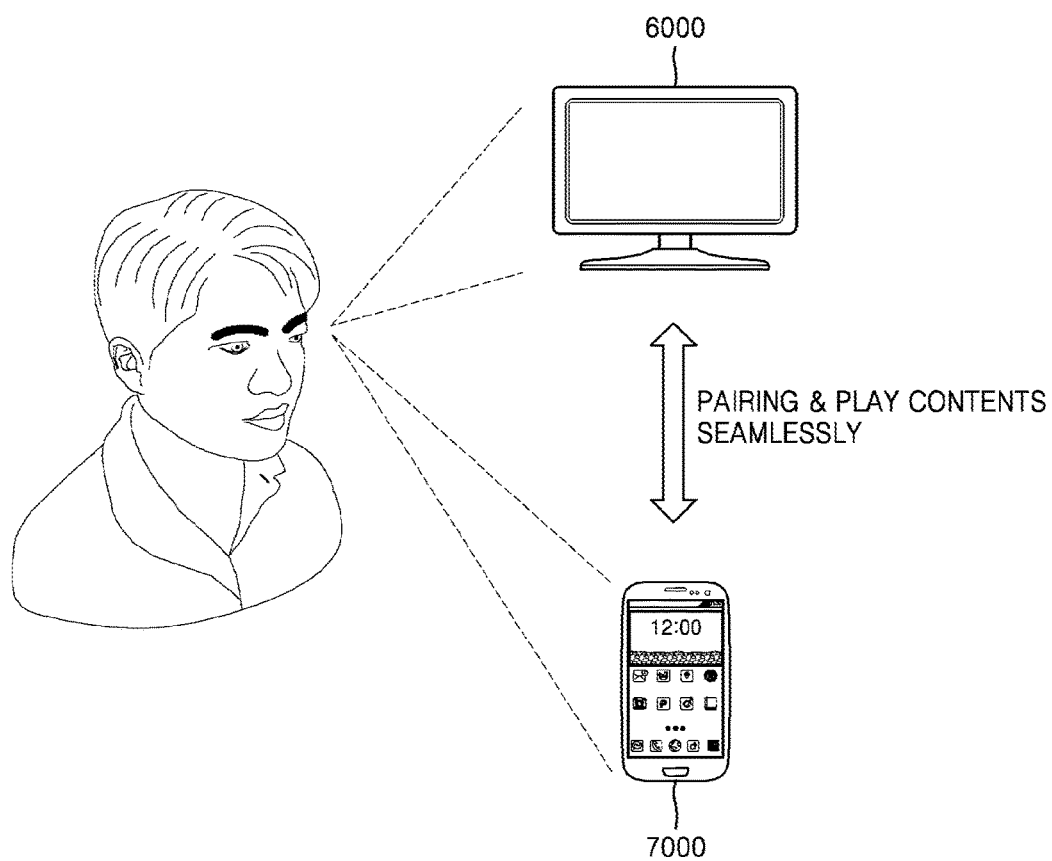
FIG. 49 is a diagram illustrating a pairing method and a seamless content playback method, according to an embodiment of the present disclosure.

FIG. 49 is a diagram illustrating a pairing method and a seamless content playback method, according to an embodiment of the present disclosure. Referring to FIG. 49, the smart phone 7000 may be paired with the TV 6000 by identifying irises of a user and tracking the eyes of the user. The smart phone 7000 may transmit content to the TV 6000. Furthermore, the TV 6000 may be paired with the smart phone 7000 by identifying irises of a user and tracking the eyes of the user. The TV 6000 may seamlessly play back content that is being played back at the smart phone 7000.

The smart phone 7000 may identify a user by identifying irises of the user. The smart phone 7000 may include an iris identifying unit, such as a camera, and may identify the irises of a user via the camera. The smart phone 7000 may extract an image of irises of a user by analyzing an image obtained by the camera. The smart phone 7000 may identify a user by comparing an extracted iris image to a stored iris image. The smart phone 7000 may store images of the irises of multiple users.

The smart phone 7000 may track the eyes of the user based on changes in images obtained by a camera. The smart phone 7000 may determine a direction viewed by a user by tracking eyes of the user and determine an electronic device located in the direction viewed by the user as an electronic device to pair with. For example, if a user stares at the TV 6000, the smart phone 7000 may determine the TV 6000 as an electronic device to pair with.

The TV 6000 may identify a user by identifying the irises of the user. The TV 6000 may include an iris identifying unit, such as a camera, and identify irises of a user via the camera. The TV 6000 may extract an image of irises of the user by analyzing an image obtained by the camera. The TV 6000 may identify a user by comparing an extracted iris image to a stored iris image. The TV 6000 may store images of the irises of multiple users.

The TV 6000 may track the eyes of the user based on an image obtained by a camera. The TV 6000 may determined whether the user is staring at the TV 6000 by tracking eyes of the user and, if the user is staring at the TV 6000, the TV 6000 may perform an iris authentication.

Furthermore, the TV 6000 may determine an electronic device previously used by the user. The TV 6000 transmits information regarding an identified user to nearby electronic devices and may receive data for pairing from an electronic device that authenticated the identified user from among the nearby electronic devices.

The TV 6000 may pair with a nearby electronic device by using data received from the nearby electronic device. For example, the TV 6000 may receive a MAC address and a device ID from a nearby electronic device, and may pair with the nearby electronic device. For example, if a user is staring at the TV 6000, the TV 6000 may broadcast user information or connection information to nearby electronic devices. The TV 6000 may receive device information from the smart phone 7000, and pair with the smart phone 7000 based on the received device information.

Figure 50:
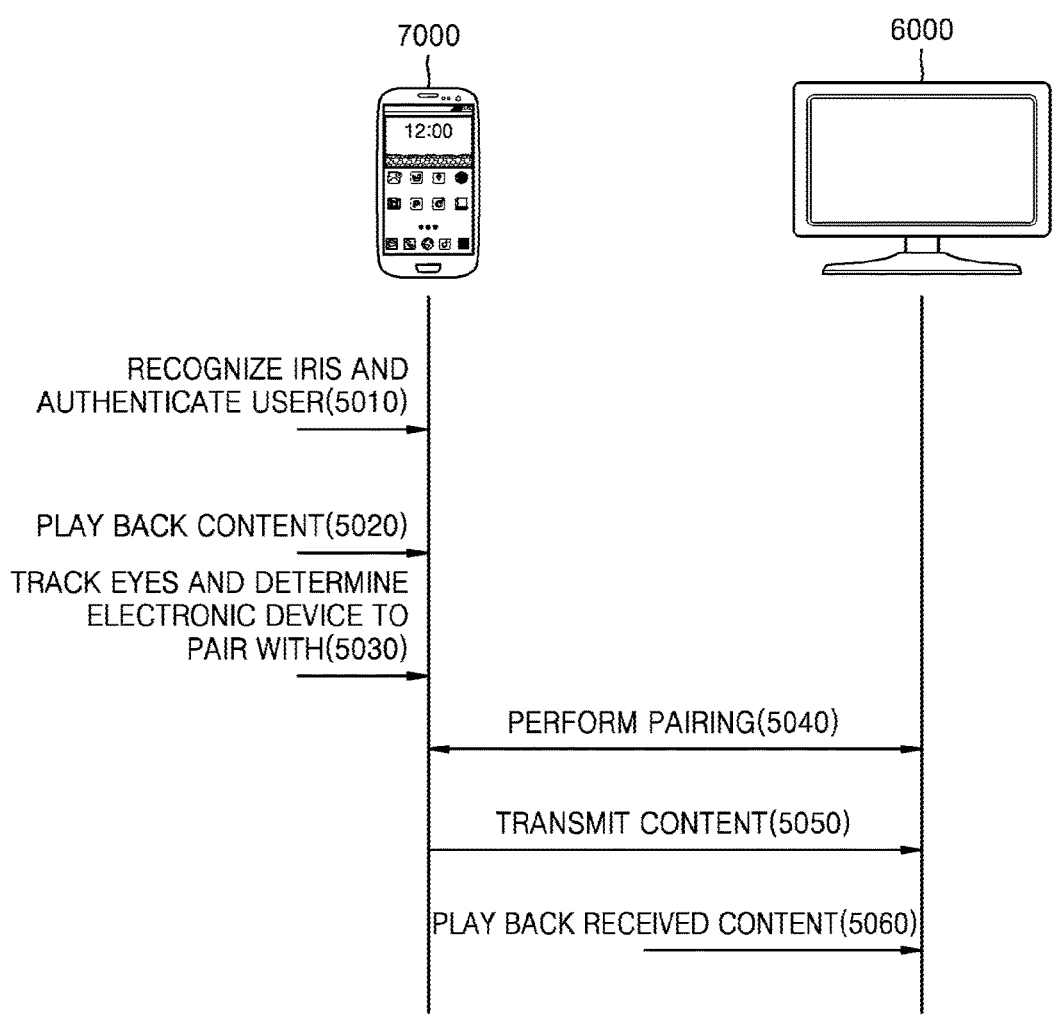
FIG. 50 is a flowchart illustrating a method in which the smart phone pairs with the TV and the smart phone transmits content to the TV, according to an embodiment of the present disclosure.

FIG. 50 is a flowchart illustrating a method in which a smart phone pairs with a TV, and the smart phone transmits content to the TV, according to an embodiment of the present disclosure. Referring to FIG. 50, the smart phone 7000 may track the eyes of a user and transmit content to the TV 6000.

In operation 5010, the smart phone 7000 performs identification of irises of the user and user authentication regarding the user. The smart phone 7000 may identify the irises of the user via a camera and may perform user authentication by using the identified irises.

In operation 5020, the smart phone 7000 plays back content. The smart phone 7000 may play back a movie, a drama, or a music based on an input from a user.

In operation 5030, the smart phone 7000 tracks the eyes of the user and determines an electronic device to pair with. The smart phone 7000 may track the eyes of the user via a camera. Based on a result of tracking the eyes of the user, the smart phone 7000 may determine an electronic device that the user is staring at as an electronic device to pair with. For example, the smart phone 7000 may determine the TV 6000 as an electronic device to pair with.

In operation 5040, the smart phone 7000 pairs with the TV 6000. The smart phone 7000 may broadcast connection information and iris information to the TV 6000. The TV 6000 may also identify irises of a user and determine whether the corresponding user is identical to the user authenticated by the smart phone 7000.

In operation 5050, the smart phone 7000 transmits content to the TV 6000. If the TV 6000 stores the same content, the smart phone 7000 may transmit information regarding the content to the TV 6000. The smart phone 7000 may transmit information regarding content that is being played back to the TV 6000 and receive information indicating whether the corresponding content is stored in the TV 6000 from the TV 6000. The smart phone 7000 may additionally transmit bookmark information to the TV 6000.

In operation 5060, the TV 6000 plays back the content received from the smart phone 7000. The TV 6000 may determine a point of playback of the content based on received bookmark information.

Therefore, the user may seamlessly watch the content via the smart phone 7000 and the TV 6000.

Figure 51A:
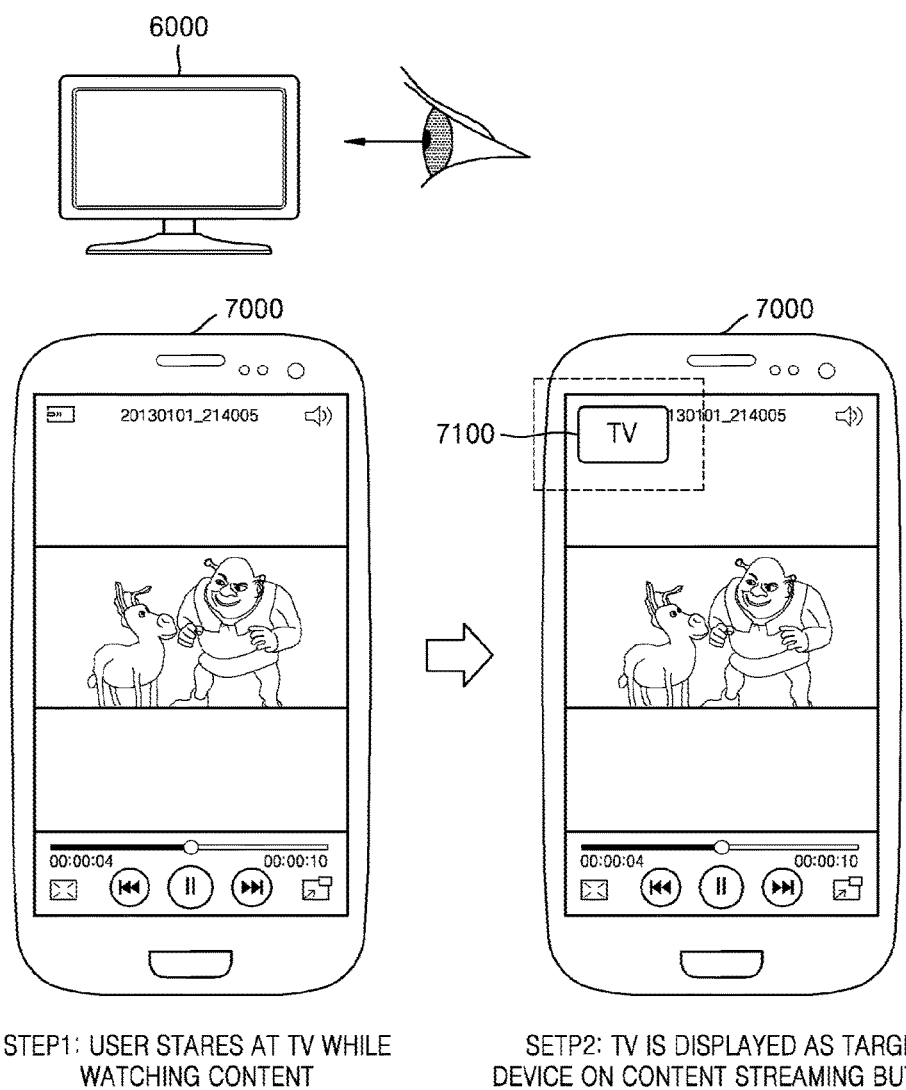
FIGS. 51A and 51B are diagrams illustrating a method of determining an electronic device to seamlessly play back content, according to an embodiment of the present disclosure.
Figure 51B:
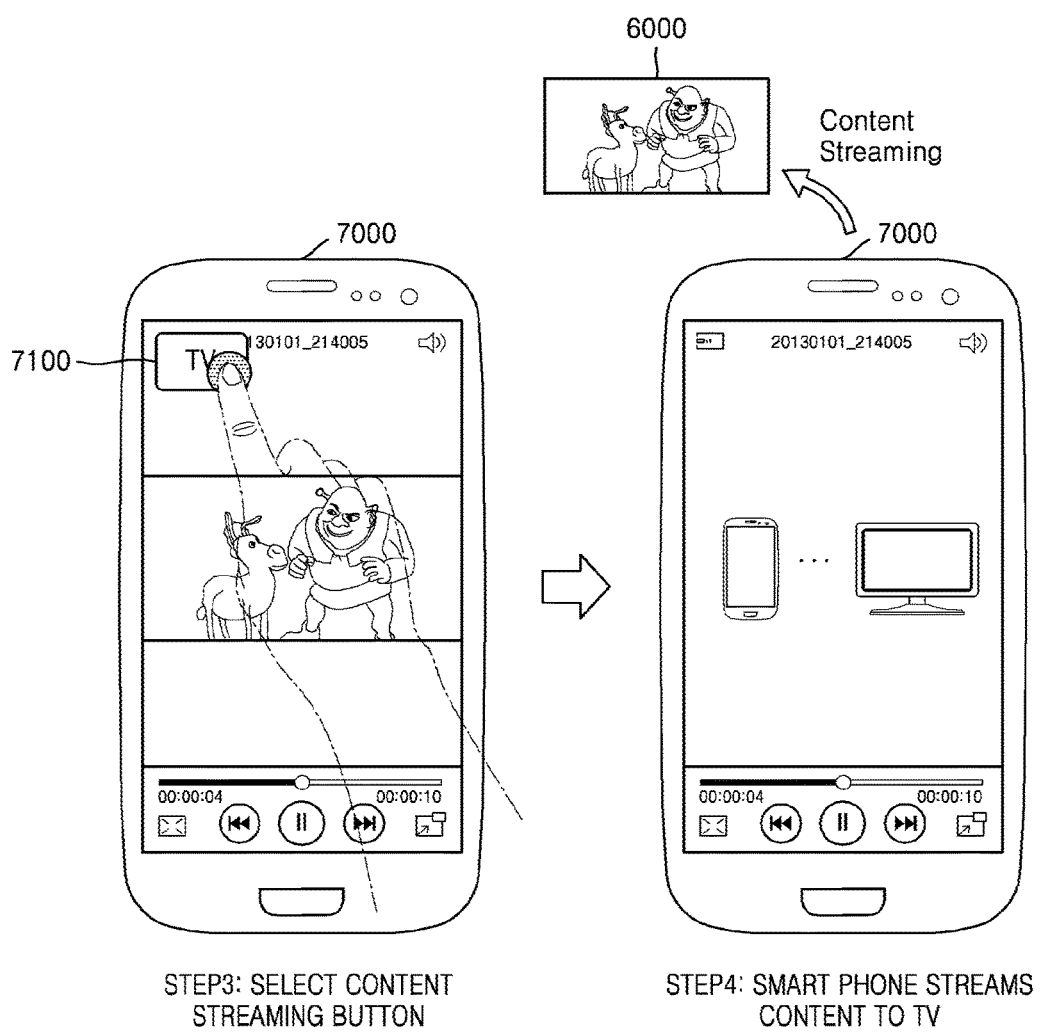

FIGS. 51A and 51B are diagrams illustrating a method of determining an electronic device to seamlessly play back content according to an embodiment of the present disclosure. Referring to FIGS. 51A and 51B, the smart phone 7000 may track the eyes of a user and may transmit content to the TV 6000 to seamlessly play back the content.

In a first operation, a user stares at the TV 6000 while the user is watching content via the smart phone 7000.

In a second operation, the smart phone 7000 displays a content streaming button. Since the user is staring at the TV 6000, the smart phone 7000 displays an icon corresponding to the TV 6000 as the content streaming button 7100. If there are a plurality of electronic devices in a direction viewed by the user, the smart phone 7000 may display content streaming buttons respectively indicating the plurality of electronic devices. The smart phone 7000 may either determine an electronic device to be displayed at the streaming button 7100 by directly tracking eyes of the user or display an electronic device at the streaming button 7100 that detected eyes of the user according to a request from the electronic device that detected the eyes of the user.

In a third operation, the smart phone 7000 receives an input from the user. The user may select an electronic device to stream content to by touching a button displayed at the smart phone 7000.

In a fourth operation, the smart phone 7000 streams content to the selected electronic device. For example, the smart phone 7000 may stream content to the TV 6000.

Figure 52A:
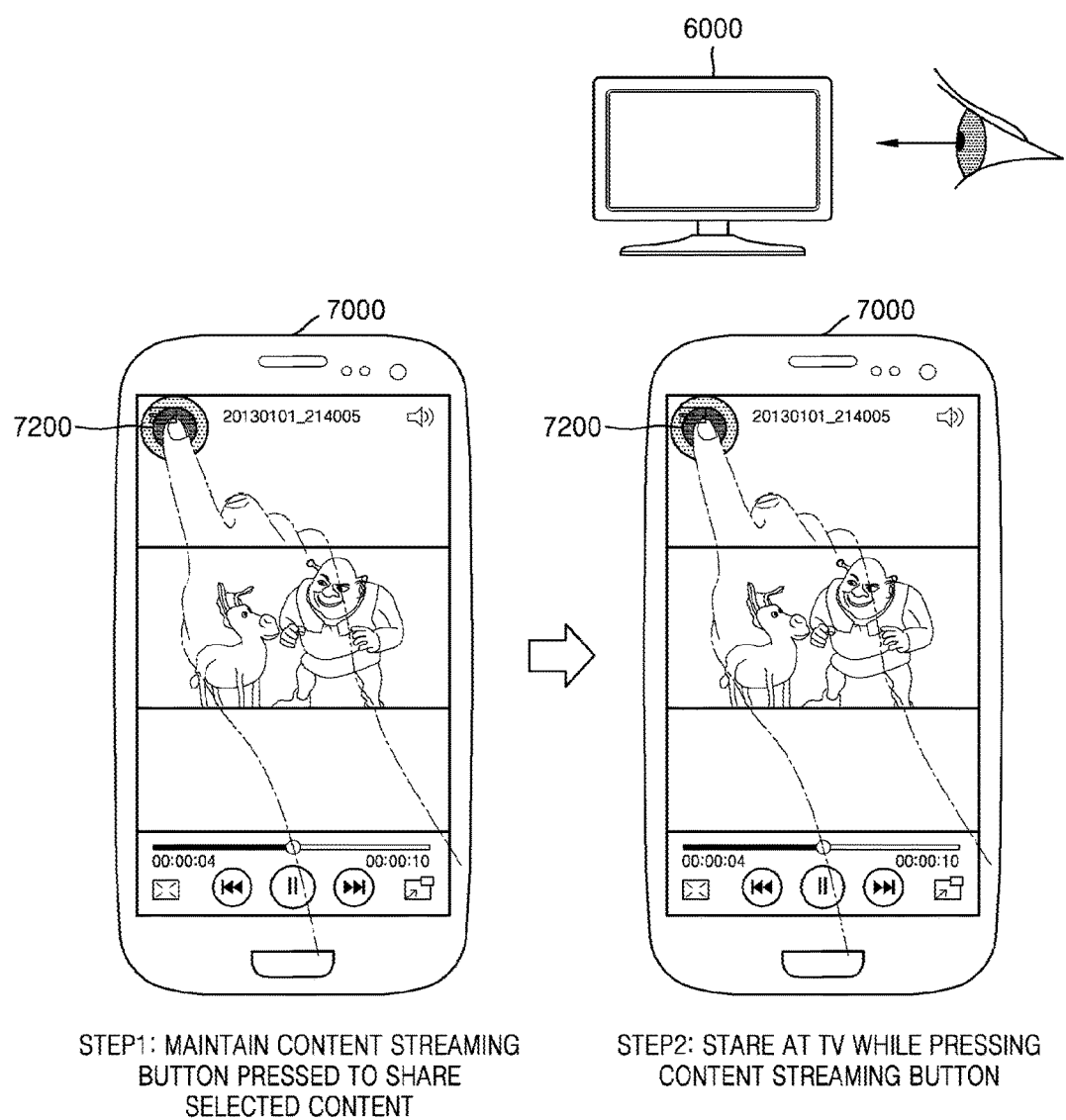
FIGS. 52A and 52B are diagrams illustrating a method of determining electronic devices to seamlessly play back content, according to an embodiment of the present disclosure.
Figure 52B:
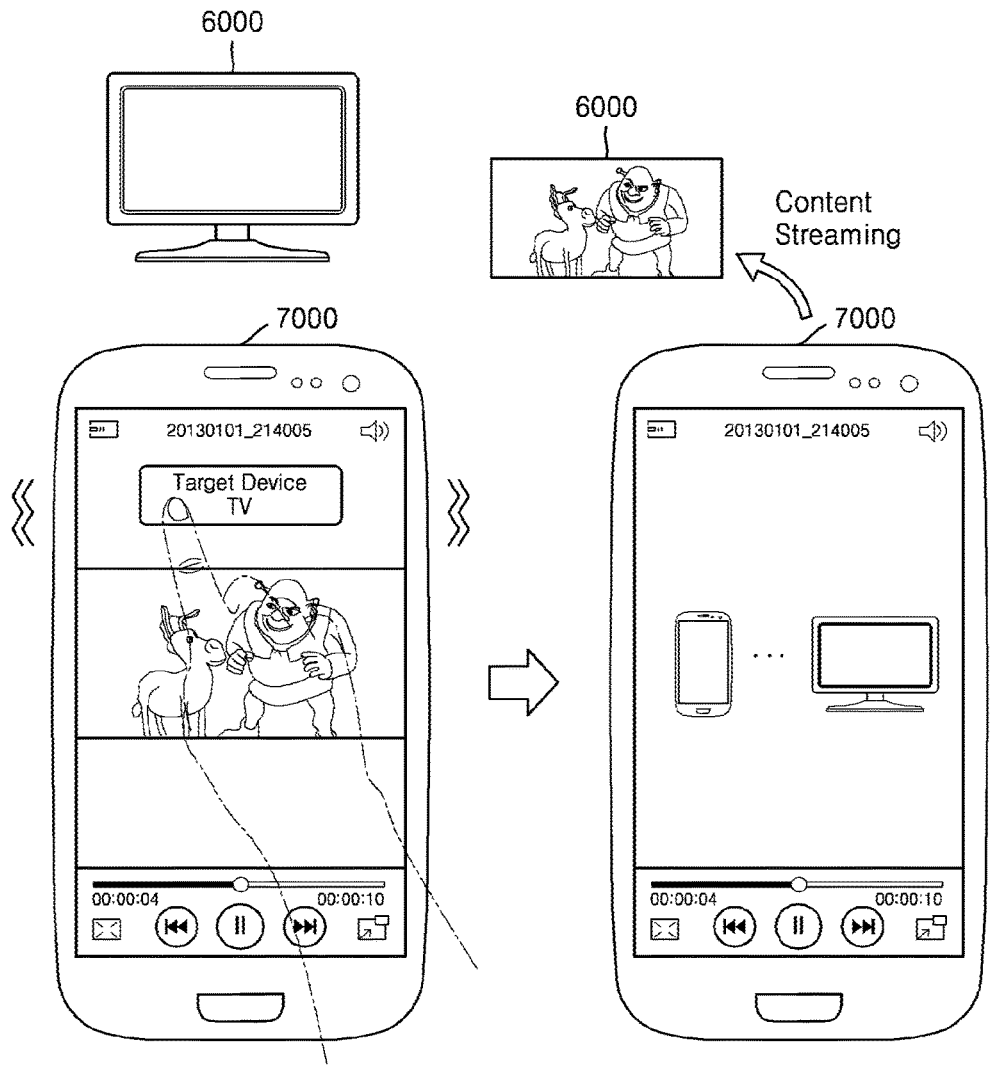

FIGS. 52A and 52B are diagrams illustrating a method of determining electronic devices to seamlessly play back content, according to an embodiment of the present disclosure.

In a first operation, the smart phone 7000 detects that a user performs a long-press on a button 7200. A user may long-press the button 7200 displayed on a touch screen of the smart phone 7000 to share content.

In a second operation, the smart phone 7000 tracks eyes of a user while the user is pressing the button 7200. The user stares at an electronic device to stream content to while the user is pressing the button 7200. For example, the user may stare at the TV 6000 while the user is pressing the button 7200 of the smart phone 7000. Alternatively, if the user keeps pressing the button 7200, the smart phone 7000 determines whether nearby electronic devices have detected the eyes of the user. In other words, if the nearby electronic devices detect the eyes of the user, the nearby electronic devices may transmit results of the detection to the smart phone 7000.

In a third operation, if the TV 6000 is determined as an electronic device to stream content to, the smart phone 7000 displays the TV 6000 on the touch screen and generates a vibration, thereby informing the user that an electronic device to stream content to is determined. The smart phone 7000 may provide feedback to a user not only via vibration, but also via sound or an image.

In a fourth operation, when the user finishes touching the button 7200, the smart phone 7000 streams content to the TV 6000. The TV 6000 plays back the streamed content.

Figure 53:
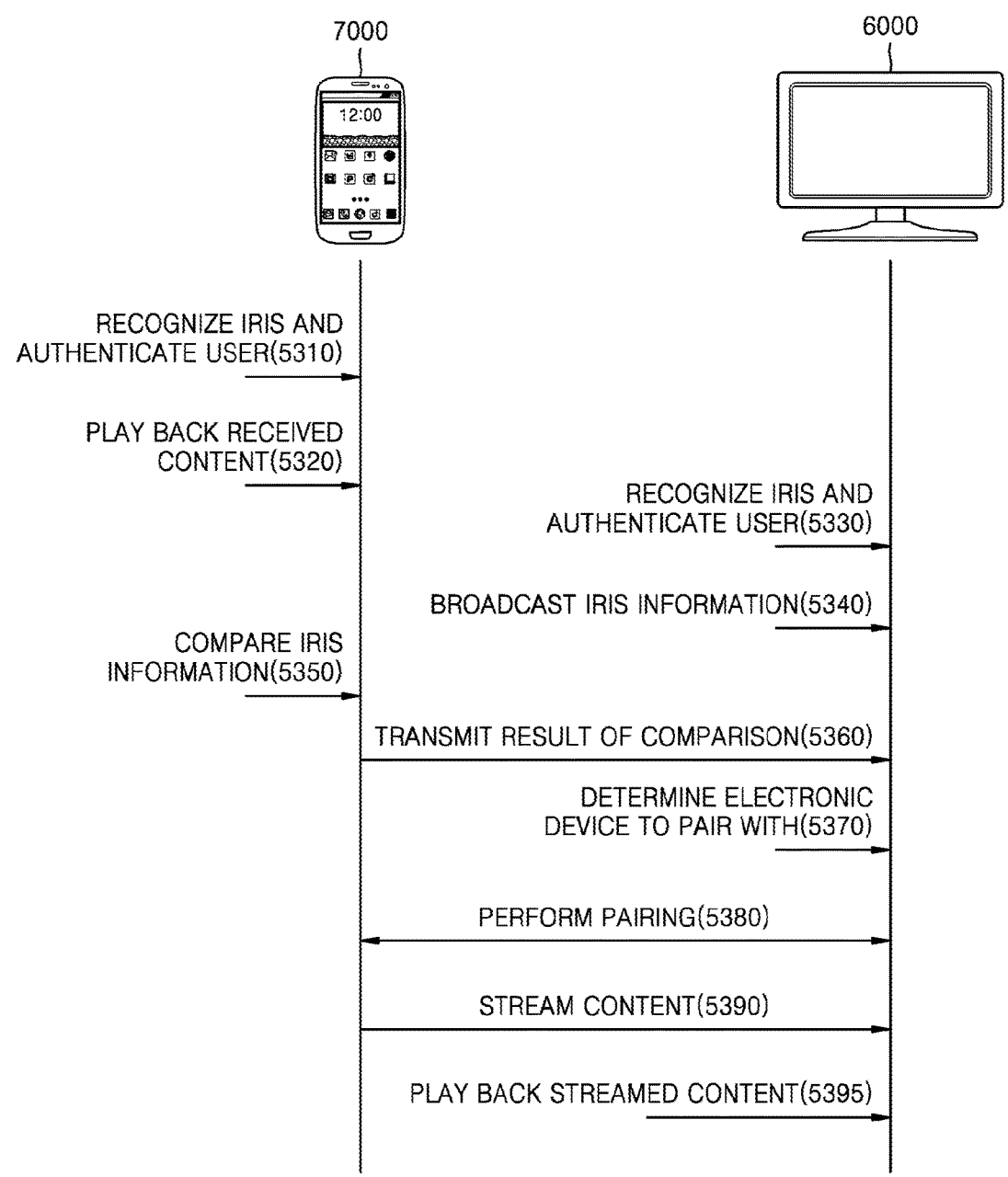
FIG. 53 is a flowchart illustrating a method that the smart phone pairs with the TV and the smart phone transmits content to the TV, according to an embodiment of the present disclosure.

FIG. 53 is a flowchart illustrating a method in which a smart phone pairs with a TV and the smart phone transmits content to the TV, according to an embodiment of the present disclosure. Referring to FIG. 53, the TV 6000 may detect the eyes of a user and receive content from the smart phone 7000.

In operation 5310, the smart phone 7000 performs identification of the irises of a user and user authentication regarding the user. The smart phone 7000 may identify the irises of the user via a camera and may perform user authentication by using the identified irises.

In operation 5320, the smart phone 7000 plays back content. The smart phone 7000 may play back a movie, a drama, or a music based on an input from a user.

In operation 5330, the TV 6000 identifies the irises of the user and performs user authentication regarding the user. The TV 6000 may identify the irises of the user via a camera and may perform user authentication by using the identified irises.

In operation 5340, the TV 6000 broadcasts information regarding identified irises to nearby electronic devices. The TV 6000 searches for an electronic device previously used by the user.

In operation 5350, the smart phone 7000 compares iris information received from the TV 6000 to iris information obtained via the camera. In other words, the smart phone 7000 determines whether iris information obtained by the smart phone 7000 is identical to iris information obtained by the TV 6000.

In operation 5360, the smart phone 7000 transmits a result of the comparison to the TV 6000. If irises of the same user are identified by the smart phone 7000 and the TV 6000, the smart phone 7000 may transmit device information for pairing to the TV 6000.

In operation 5370, the TV 6000 determines an electronic device to pair with. The TV 6000 determines an electronic device being used by the user as an electronic device to pair with. Since the user was watching content via the smart phone 7000, the TV 6000 determines the smart phone 7000 as the electronic device to pair with.

In operation 5380, the TV 6000 and the smart phone 7000 pair with each other.

In operation 5390, the smart phone 7000 streams content to the TV 6000. If it is not necessary for the smart phone 7000 to stream content, the smart phone 7000 may transmit only information regarding the content to the TV 6000.

In operation 5395, the TV 6000 plays back the streamed content. Alternatively, the TV 6000 may play back stored content or may play back drama or music.

Figure 54:
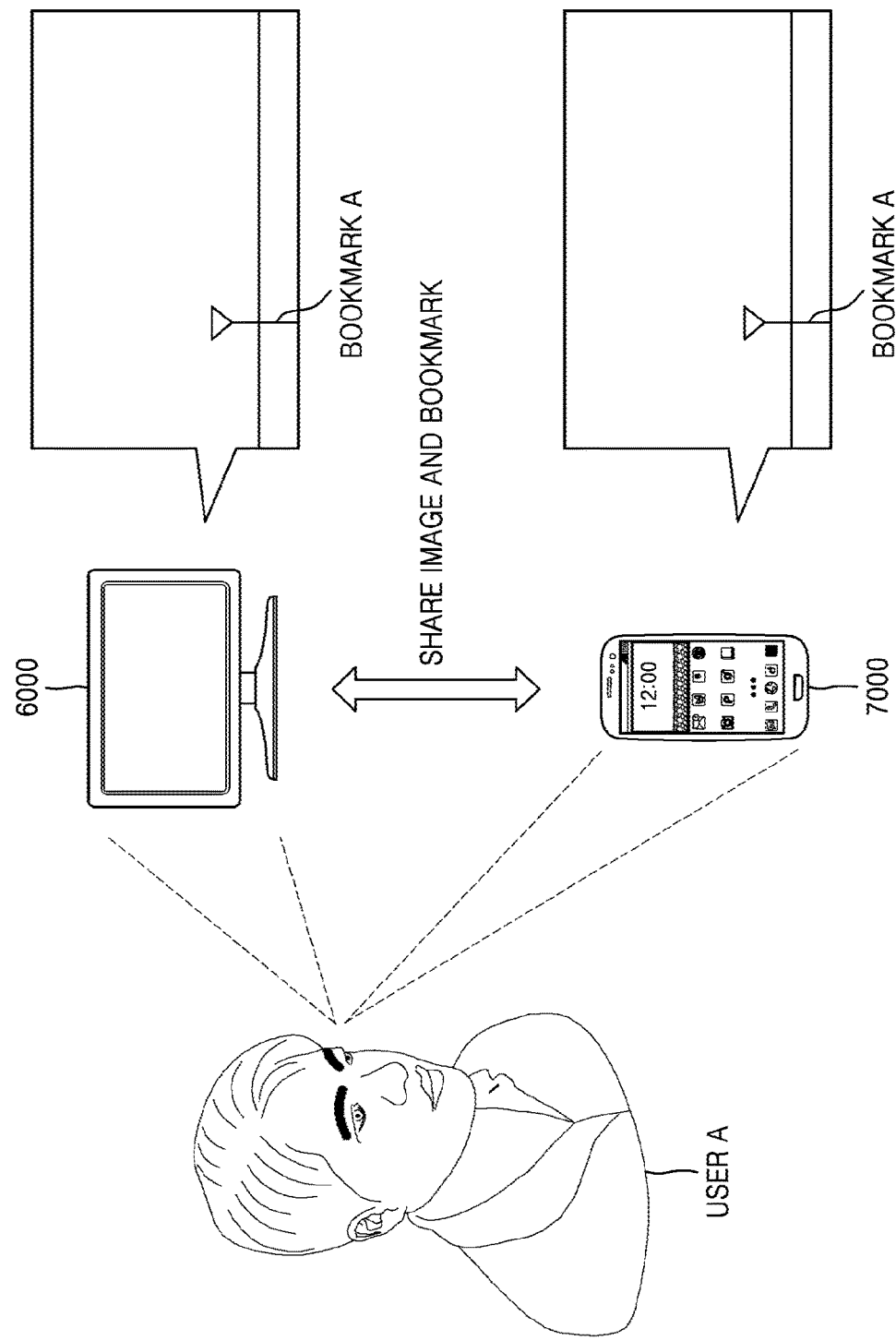
FIG. 54 is a diagram illustrating a seamless playback method using a bookmark, according to an embodiment of the present disclosure.

FIG. 54 is a diagram illustrating a seamless playback method using a bookmark, according to an embodiment of the present disclosure.

Referring to FIG. 54, the TV 6000 and the smart phone 7000 may seamlessly play back content by using bookmark information regarding a user. Even if a user is not wearing glasses, the TV 6000 and the smart phone 7000 may identify the irises or eyes of the user and seamlessly play back content.

The TV 6000 identifies the irises of the user and identifies the user watching the TV 6000. For example, a user A may be watching the TV 6000. The TV 6000 generates and stores a bookmark A regarding the user A. The bookmark A indicates a point of playback of content regarding the user A.

The TV 6000 tracks the eyes of the user A and determines whether the user A is continuously watching content. If it is determined that the user A is no longer watching the content, the TV 6000 stores the bookmark A regarding the user A and stops playback of the content. The TV 6000 generates the bookmark A indicating a point of playback where it is determined that the user A has discontinued watching the content. For example, if the eyes of the user A are not detected, the TV 6000 may determine that the user A is no longer watching the content.

If it is determined that the user A is watching the TV 6000 again, the TV 6000 plays back the content based on the bookmark A. The bookmark A includes information regarding content that the user A was watching, and information indicating the point of playback where the user A discontinued watching the content.

The smart phone 7000 may identify irises and eyes of the user A and seamlessly play back content that is being played back at the TV 6000. The smart phone 7000 tracks eyes of the user A and determine whether the user A intends to watch the smart phone 7000. The smart phone 7000 identifies irises of the user A and identifies the user A.

The smart phone 7000 pairs with the TV 6000. The smart phone 7000 may receive content from the TV 6000 and play back the content, play back content stored in the smart phone 7000, or receive content from a server and play back the content.

The smart phone 7000 additionally receives bookmark information from the TV 6000. The smart phone 7000 receives the bookmark A regarding the user A from the TV 6000, and determines a point of playback for the content. The smart phone 7000 may play back content based on determined point of playback.

Figure 55:
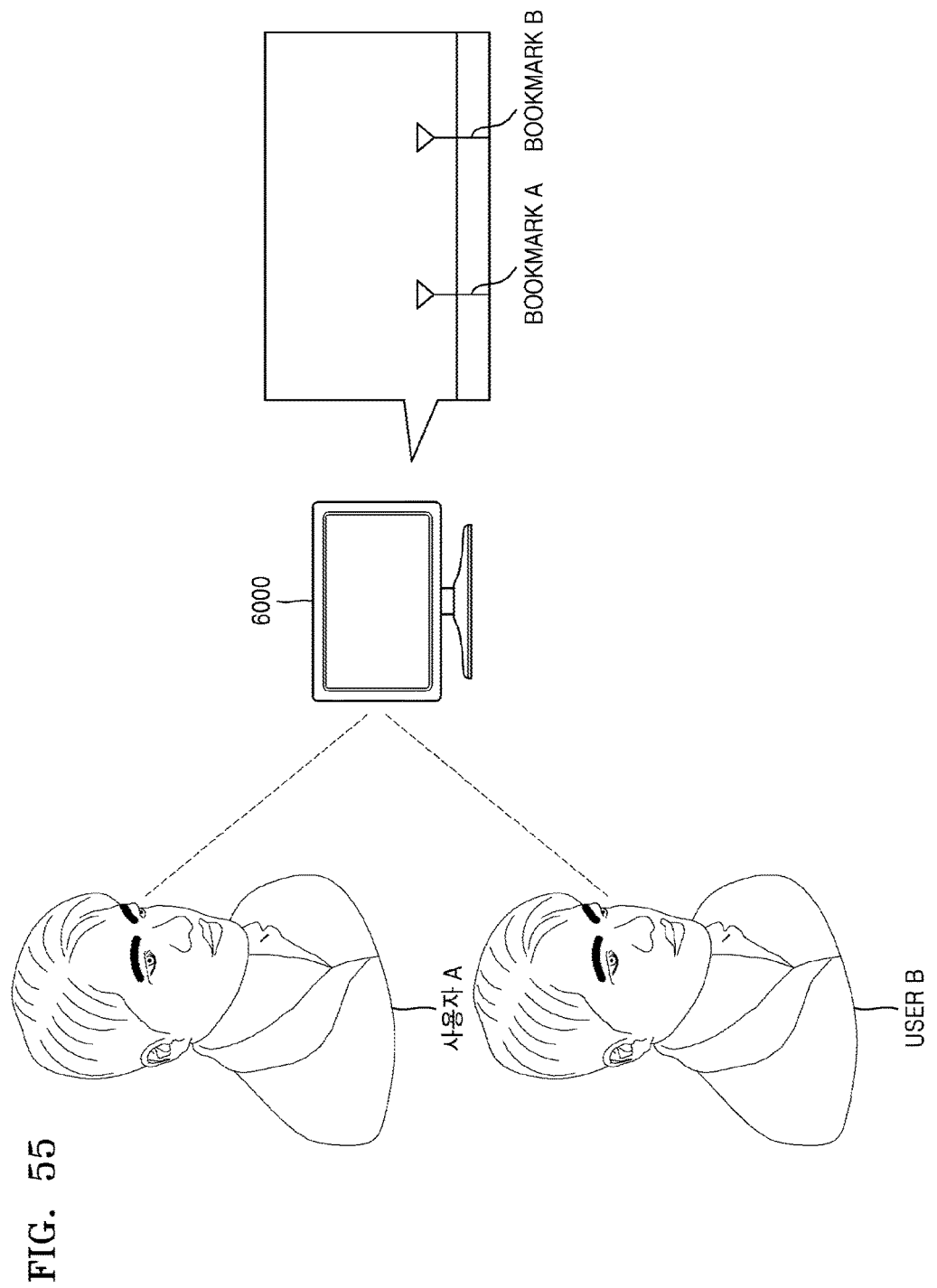
FIG. 55 is a diagram illustrating a seamless playback method with respect to a plurality of users, according to an embodiment of the present disclosure.

FIG. 55 is a diagram illustrating a seamless playback method with respect to a plurality of users.

The TV 6000 may track eyes of a plurality of users and generate respective bookmark information regarding the plurality of users. The TV 6000 continuously track eyes of a user A and a user B watching the TV 6000. If it is determined that the user A is no longer watching content, the TV 6000 generates a bookmark A including a point of playback at which it is determined that the user A no longer watches the content. The TV 6000 stores the bookmark A regarding the user A and, since the user B is continuously watching the content, continues to play back the content. If it is determined that the user B is no longer watching content, the TV 6000 generates a bookmark B including a point of playback at which it is determined that the user B no longer watches the content. If it is determined that both the user A and the user B are no longer watching the content, the TV 6000 may stop playback of the content.

When eyes of the user A are detected again, the TV 6000 plays back the content based on the bookmark A. Alternatively, when eyes of the user B are detected again, the TV 6000 plays back the content based on the bookmark B.

Even if the user A or the user B watches the content via an electronic device other than the TV 6000, the electronic device may receive the bookmark A or the bookmark B from the TV 6000 and seamlessly play back the content.

Figure 56:
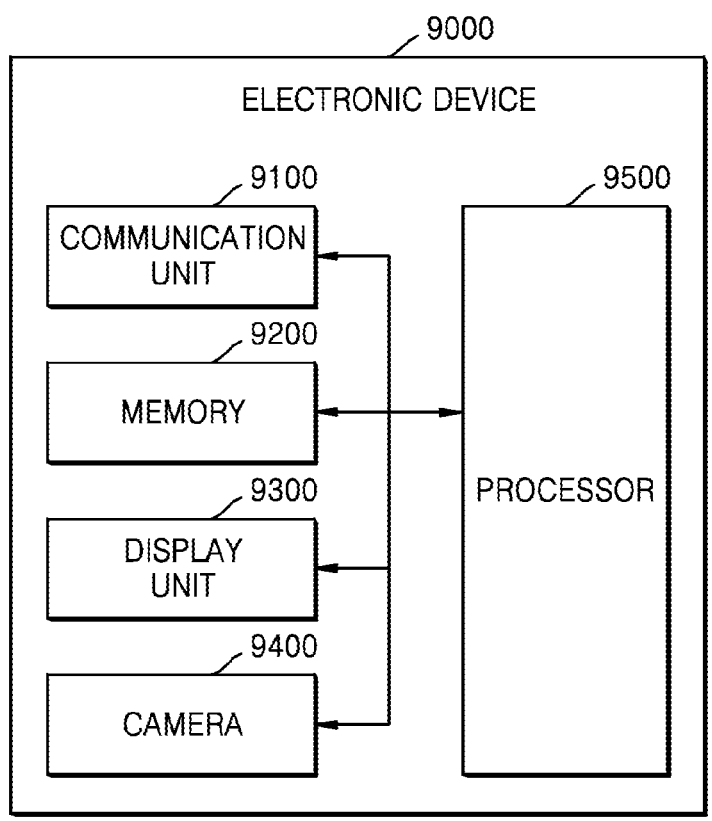
FIG. 56 is a diagram illustrating an electronic device which receives content from a nearby electronic device and plays back the content, according to an embodiment of the present disclosure.

FIG. 56 is a diagram illustrating an electronic device that receives content from a nearby electronic device and plays back the content, according to an embodiment of the present disclosure. Referring to FIG. 56, the electronic device 9000 includes a communication unit 9100, a memory 9200, a display unit 9300, a camera 9400, and a processor 9500.

The communication unit 9100 may receive iris information regarding a user or device information from a nearby electronic device.

The communication unit 9100 receives content and bookmark information regarding the content from a nearby electronic device. The content may be a media file, such as a music file, a video file, a text file, an image file, etc.

The memory 9200 stores iris information regarding at least one user. Furthermore, the memory 9200 may also store the content.

The display unit 9300 displays content under the control of the processor 9500. The display unit 9300 may display an electronic device to pair with or a content streaming button.

The processor 9500 obtains an image of the eyes of a user. The camera 9400 transmits the obtained image to the processor 9500.

The processor 9500 tracks the eyes of a user and extracts feature points of irises via the image obtained by the camera 9400. The processor 9500 performs user authentication based on iris information regarding a user.

The processor 9500 determines an electronic device to pair with. The processor 9500 may determine an electronic device to pair with by tracking the eyes of a user. Furthermore, when the eyes of a user are detected, the processor 9500 may broadcast a result of iris authentication to nearby electronic devices and determine an electronic device to pair with.

The processor 9500 may transmit content that is being played back to a nearby electronic device via the communication unit 9100. The processor 9500 transmits content to an electronic device that a user is staring at.

The processor 9500 may play back content received from a nearby electronic device. The processor 9500 may playback content based on received information regarding the content and received bookmark information.

The electronic device 9000, according to an embodiment of the present disclosure, may seamlessly play back content by tracking the eyes of a user.

The electronic device 9000, according to an embodiment of the present disclosure, may determine whether to seamlessly play back content via iris authentication.

As described above, according to the one or more embodiments of the present disclosure, a mobile device may identify an electronic device included in an input image and pair with the electronic device.

A mobile device, according to an embodiment of the present disclosure, may pair with another electronic device controlled by the identified electronic device.

A mobile device, according to an embodiment of the present disclosure, may track eyes of a user and select an electronic device to pair with.

A mobile device, according to an embodiment of the present disclosure, may select an electronic device to pair with from among a plurality of electronic devices included in an obtained image, based on a user's selection.

A mobile device, according to an embodiment of the present disclosure, may select an electronic device to pair with based on a gesture of a user.

The device described herein may comprise a processor, a memory for storing program data and executing it, a permanent storage unit such as a disk drive, a communications port for handling communications with external devices, and user interface devices, including a touch panel, keys, buttons, etc. When software modules or algorithms are involved, these software modules may be stored as program instructions or computer readable codes executable on a processor on a computer-readable medium. Examples of the computer readable recording medium include magnetic storage media (e.g., read only memory (ROM), floppy disks, hard disks, etc.), and optical recording media (e.g., compact disc ROMs (CD-ROMs), or digital versatile discs (DVDs)). The computer readable recording medium can also be distributed over network coupled computer systems so that the computer readable code is stored and executed in a distributed fashion. This media can be read by the computer, stored in the memory, and executed by the processor.

The present disclosure may be described in terms of functional block components and various processing steps. Such functional blocks may be realized by any number of hardware and/or software components configured to perform the specified functions. For example, the present disclosure may employ various integrated circuit (IC) components, e.g., memory elements, processing elements, logic elements, look-up tables, and the like, which may carry out a variety of functions under the control of one or more microprocessors or other control devices. Similarly, where the elements of the present disclosure are implemented using software programming or software elements, the present disclosure may be implemented with any programming or scripting language such as C, C++, Java, assembler, or the like, with the various algorithms being implemented with any combination of data structures, objects, processes, routines or other programming elements. Functional aspects may be implemented in algorithms that are executed on one or more processors. Furthermore, the present disclosure could employ any number of conventional techniques for electronics configuration, signal processing and/or control, data processing and the like. The words "mechanism", "element", "means", and "configuration" are used broadly and are not limited to mechanical or physical embodiments, but can include software routines in conjunction with processors, etc.

The particular implementations shown and described herein are illustrative examples of the present disclosure and are not intended to otherwise limit the scope of the present disclosure in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

The use of the terms "a" and "an" and "the" and similar referents in the context of describing the present disclosure (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. The present disclosure is not limited to the described order of the steps. The use of any and all examples, or exemplary language (e.g., "such as") provided herein, is intended merely to better illuminate the present disclosure and does not pose a limitation on the scope of the inventive concept unless otherwise claimed.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A method of pairing electronic devices by glasses, the method comprising:
   determining, by the glasses, a first electronic device to pair with by tracking eyes of a user of the glasses;
   performing, by the glasses, user authentication with the first electronic device based on feature points of irises of the user;
   determining, by the glasses, a second electronic device to pair with by tracking the eyes of the user;
   performing, by the glasses, user authentication with the second electronic device based on the feature points of the irises of the user; and
   controlling, by the glasses, the first electronic device and the second electronic device to pair with each other.

2. The method of claim 1, further comprising:
   obtaining an image of the first electronic device and an image of the second electronic device by the tracking of eyes of the user; and
   obtaining identification information of the first electronic device and identification information of the second electronic device by analyzing the image of the first electronic device and the image of the second electronic device, respectively,
   wherein the determining of the first electronic device to pair with and the determining of the second electronic device to pair with are performed based on the identification information of the first electronic device and the identification information of the second electronic device.

3. The method of claim 2, wherein the analyzing of the image of the first electronic device and the image of the second electronic device comprises:
   extracting at least one feature of the first electronic device from the image of the first electronic device and at least one feature of the second electronic device from the image of the second electronic device; and
   registering the at least one feature of the first electronic device as the identification information of the first electronic device and the at least one feature of the second electronic device as the identification information of the second electronic device.

4. The method of claim 1, wherein the controlling of the first electronic device and the second electronic device to pair comprises:
controlling the second electronic device to continue to reproduce content which is reproduced by the first electronic device prior to the pairing between the first electronic device and the second electronic device.

5. The method of claim 4, wherein the controlling of the first electronic device and the second electronic device to pair comprises:
controlling the second electronic device to receive information of the content from the first electronic device, and
wherein the continuing to reproduce the content is performed based on the received information of the content from the first electronic device.

6. The method of claim 5, wherein the information of the content comprises a bookmark indicating a point of content being reproduced.

7. The method of claim 6, wherein the bookmark comprises information of the user of the glasses.

8. The method of claim 6, wherein the controlling of the second electronic device to continue to reproduce the content comprises:
controlling the second electronic device to continue to reproduce the content from the point of the content indicated by the bookmark.

9. The method of claim 1, wherein the tracking of the eyes of the user of the glasses is performed by capturing the eyes of the user of the glasses.

10. The method of claim 9, further comprising:
extracting the features points of the irises of the user based on the capturing of the eyes of the user.

11. The method of claim 1, wherein the controlling of the first electronic device and the second electronic device to pair comprises:
transmitting device information of the first electronic device to the second electronic device; and
controlling the second electronic device to pair with the first electronic device based on the device information of the first electronic device.

12. Glasses comprising:
an eye-tracking camera configured to obtain an image of eyes of a user of the glasses; and
a processor configured to:
track eyes of the user and extract feature points of irises of the user based on the obtained image of the eyes of the user,
determine first and second electronic devices to pair with based on the eyes of the user,
perform user authentication with the first and second electronic devices based on the feature points of the irises, and
control the first electronic device and the second electronic devices to pair with each other.

13. The glasses of claim 12, further comprising:
a camera configured to obtain an image of the first electronic device and an image of the second electronic device based on the tracking of eyes of the user; and
wherein the processor is configured to obtain identification information of the first electronic device and identification information of the second electronic device by analyzing the image of the first electronic device and the image of the second electronic device, respectively, and
wherein the determining of the first electronic device to pair with and the determining of the second electronic device to pair with are performed based on the identification information of the first electronic device and the identification information of the second electronic device.

14. The glasses of claim 13, wherein the analyzing of the image of the first electronic device and the image of the second electronic device comprises:
extracting at least one feature of the first electronic device from the image of the first electronic device and at least one feature of the second electronic device from the image of the second electronic device; and
registering the at least one feature of the first electronic device as the identification information of the first electronic device and the at least one feature of the second electronic device as the identification information of the second electronic device.

15. The glasses of claim 12, wherein the controlling of the first electronic device and the second electronic device to pair comprises:
controlling the second electronic device to continue to reproduce content which is reproduced by the first electronic device prior to the pairing between the first electronic device and the second electronic device.

16. The glasses of claim 15, wherein the controlling of the first electronic device and the second electronic device to pair comprises:
controlling the second electronic device to receive information of the content from the first electronic device, and
wherein the continuing to reproduce the content is performed based on the received information of the content from the first electronic device.

17. The glasses of claim 16, wherein the information of the content comprises a bookmark indicating a point of content being reproduced.

18. The glasses of claim 17, wherein the controlling of the second electronic device to continue to reproduce the content comprises:
controlling the second electronic device to continue to reproduce the content from the point of the content indicated by the bookmark.

19. The glasses of claim 12, wherein the controlling of the first electronic device and the second electronic device to pair comprises:
transmitting device information of the first electronic device to the second electronic device; and
controlling the second electronic device to pair with the first electronic device based on the device information of the first electronic device.

20. A non-transitory computer-readable storage medium storing instructions thereon that, when executed, cause at least one processor to perform operations comprising:
determining a first electronic device to pair with by tracking eyes of a user of the glasses;
performing user authentication with the first electronic device based on feature points of irises of the user;
determining a second electronic device to pair with by tracking the eyes of the user;
performing user authentication with the second electronic device based on the feature points of the irises of the user; and
controlling the first electronic device and the second electronic device to pair with each other.

* * * * *